(12) United States Patent
Yamamoto et al.

(10) Patent No.: US 8,707,203 B2
(45) Date of Patent: Apr. 22, 2014

(54) OBJECT DISPLAY APPARATUS AND CONTROL METHOD THEREOF

(75) Inventors: Naoko Yamamoto, Yokohama (JP);
Shigeki Hirooka, Kawasaki (JP);
Keiichi Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 12/101,630

(22) Filed: Apr. 11, 2008

(65) Prior Publication Data

US 2008/0256492 A1    Oct. 16, 2008

(30) Foreign Application Priority Data

Apr. 12, 2007   (JP) ................ 2007-105248

(51) Int. Cl.
*G06F 3/048*   (2013.01)
*G06F 12/00*   (2006.01)
*G06F 17/30*   (2006.01)
*G09G 5/00*   (2006.01)
*G03F 3/08*   (2006.01)
*G06F 3/047*   (2006.01)

(52) U.S. Cl.
USPC ........... 715/799; 715/853; 715/854; 715/855; 715/856; 715/858; 715/860; 715/862; 707/821; 707/822; 707/823; 707/824; 707/826; 707/827; 707/828; 707/829; 707/830; 707/831; 345/1.1; 358/527

(58) Field of Classification Search
USPC ............. 715/799, 858, 860, 862, 853–856; 707/821–831; 345/1.1; 358/527
See application file for complete search history.

(56) References Cited

U.S. PATENT DOCUMENTS

| | | | | |
|---|---|---|---|---|
| 5,220,648 A | * | 6/1993 | Sato | 1/1 |
| 5,276,789 A | * | 1/1994 | Besaw et al. | 345/440 |
| 5,432,897 A | * | 7/1995 | Tatsumi et al. | 345/440 |
| 5,469,539 A | * | 11/1995 | Usuda | 715/841 |
| 5,479,268 A | * | 12/1995 | Young et al. | 386/291 |
| 5,555,357 A | * | 9/1996 | Fernandes et al. | 345/441 |
| 5,590,253 A | * | 12/1996 | Onishi et al. | 345/619 |
| 5,920,313 A | * | 7/1999 | Diedrichsen et al. | 715/767 |
| 5,977,974 A | * | 11/1999 | Hatori et al. | 715/839 |
| 6,028,603 A | * | 2/2000 | Wang et al. | 715/776 |
| 6,043,817 A | * | 3/2000 | Bolnick et al. | 715/788 |

(Continued)

FOREIGN PATENT DOCUMENTS

| | | | | |
|---|---|---|---|---|
| JP | 2005-071202 | 3/2005 | | G06F 15/00 |
| JP | 2005-174256 | 6/2005 | | G06F 12/00 |
| JP | 2005-216451 | 8/2005 | | G11B 27/34 |

OTHER PUBLICATIONS

Kustanowitz, et al., "Meaningful Presentations of Photo Libraries: Rationale and Applications of Bi-Level Radial Quantum Layouts," Proceedings of the 5th ACM/IEEE-CS Joint Conference on Digital Libraries, Jun. 7-11, 2005, pp. 188-196.*

*Primary Examiner* — Tadeese Hailu
*Assistant Examiner* — Eric J Bycer
(74) *Attorney, Agent, or Firm* — Fitzpatrick, Cella, Harper & Scinto

(57) ABSTRACT

An object display apparatus displays a plurality of object at respective display positions, and receive a designation to set one of the plurality of displayed object as an object of interest. Upon reception of an addition or deletion instruction of one or more objects with respect to the plurality of displayed objects, a display of the objects is updated by moving object other than the object of interest while keeping the display position of the designated object of interest.

10 Claims, 47 Drawing Sheets

(56) References Cited

U.S. PATENT DOCUMENTS

| | | | |
|---|---|---|---|
| 6,377,285 B1* | 4/2002 | Doan et al. | 715/764 |
| 6,426,761 B1* | 7/2002 | Kanevsky et al. | 715/788 |
| 7,053,914 B2* | 5/2006 | Saitou | 345/619 |
| 7,111,022 B1 | 9/2006 | Matsumoto et al. | 707/203 |
| 7,213,206 B2* | 5/2007 | Fogg | 715/706 |
| 7,447,999 B1* | 11/2008 | Robertson et al. | 715/835 |
| 7,589,750 B1* | 9/2009 | Stratton | 345/677 |
| 7,903,125 B1* | 3/2011 | Ayers et al. | 345/629 |
| 2001/0000667 A1* | 5/2001 | Okawa et al. | 345/339 |
| 2002/0122067 A1* | 9/2002 | Geigel et al. | 345/788 |
| 2002/0180734 A1* | 12/2002 | Endoh et al. | 345/428 |
| 2003/0112278 A1* | 6/2003 | Driskell | 345/788 |
| 2004/0104946 A1* | 6/2004 | Li | 345/853 |
| 2004/0177319 A1* | 9/2004 | Horn | 715/501.1 |
| 2005/0060665 A1* | 3/2005 | Rekimoto | 715/810 |
| 2005/0071783 A1* | 3/2005 | Atkins | 715/851 |
| 2005/0097472 A1* | 5/2005 | Machida | 715/736 |
| 2005/0138564 A1* | 6/2005 | Fogg | 715/745 |
| 2006/0036568 A1* | 2/2006 | Moore et al. | 707/1 |
| 2006/0150092 A1* | 7/2006 | Atkins | 715/517 |
| 2006/0277496 A1* | 12/2006 | Bier et al. | 715/810 |
| 2007/0192749 A1* | 8/2007 | Baudisch | 715/863 |
| 2008/0012859 A1* | 1/2008 | Saillet et al. | 345/440 |
| 2008/0238922 A1* | 10/2008 | Rhodes et al. | 345/440 |

* cited by examiner

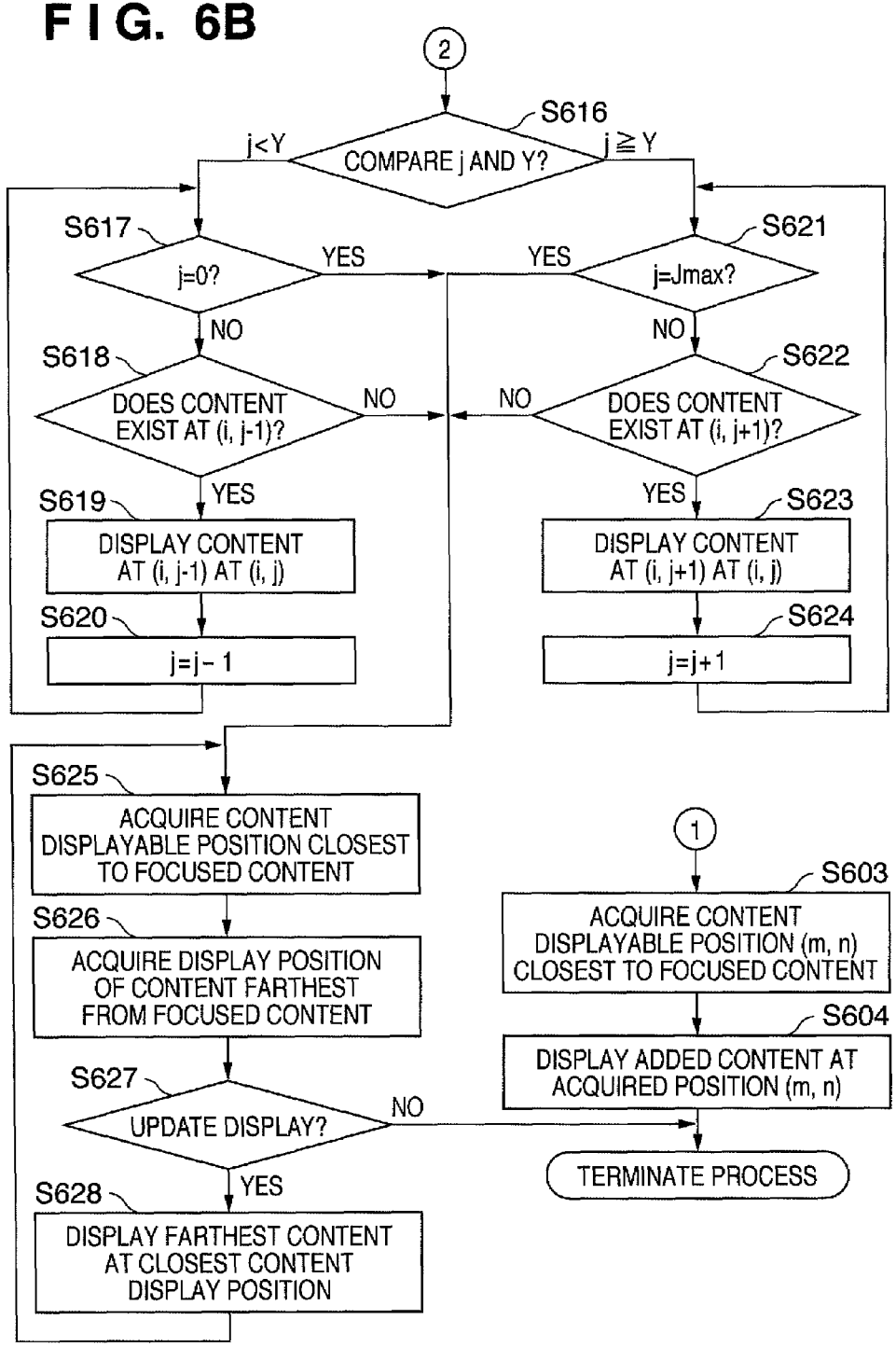

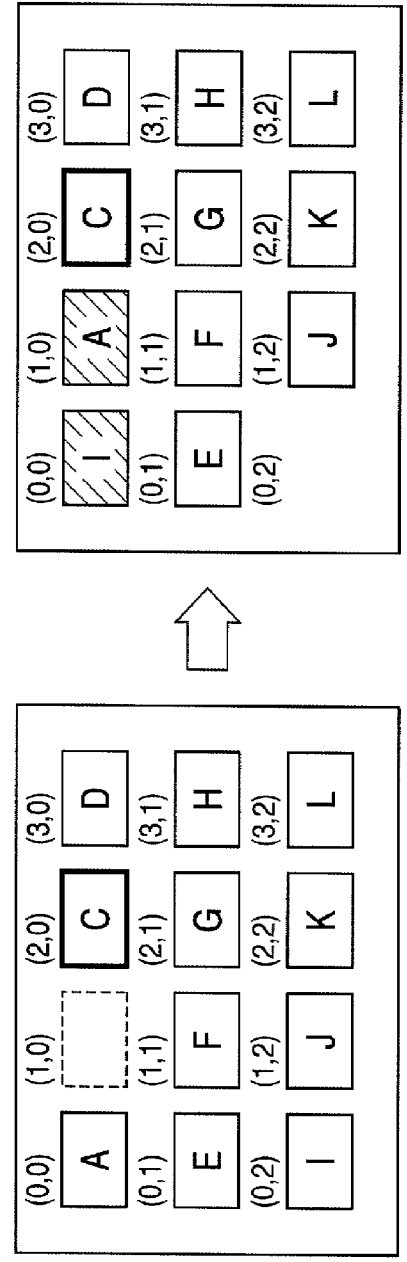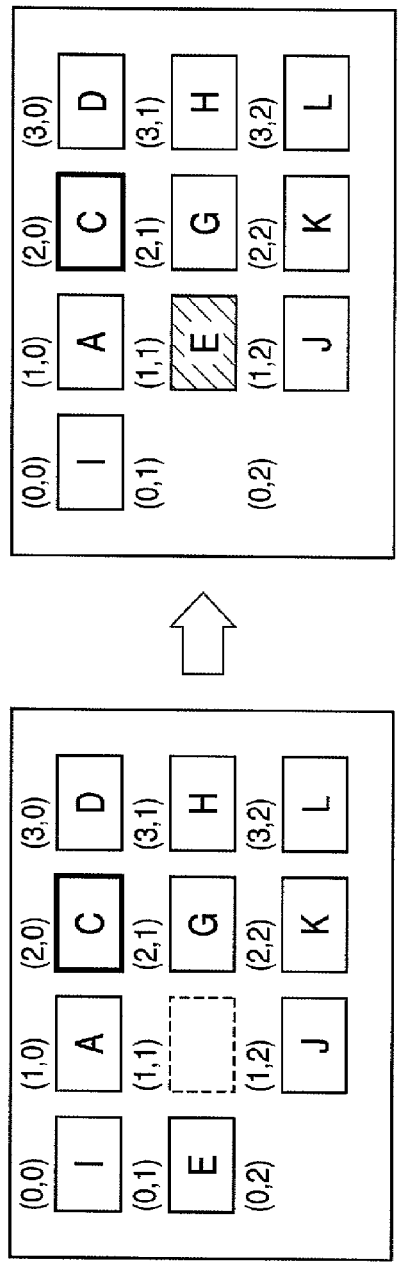

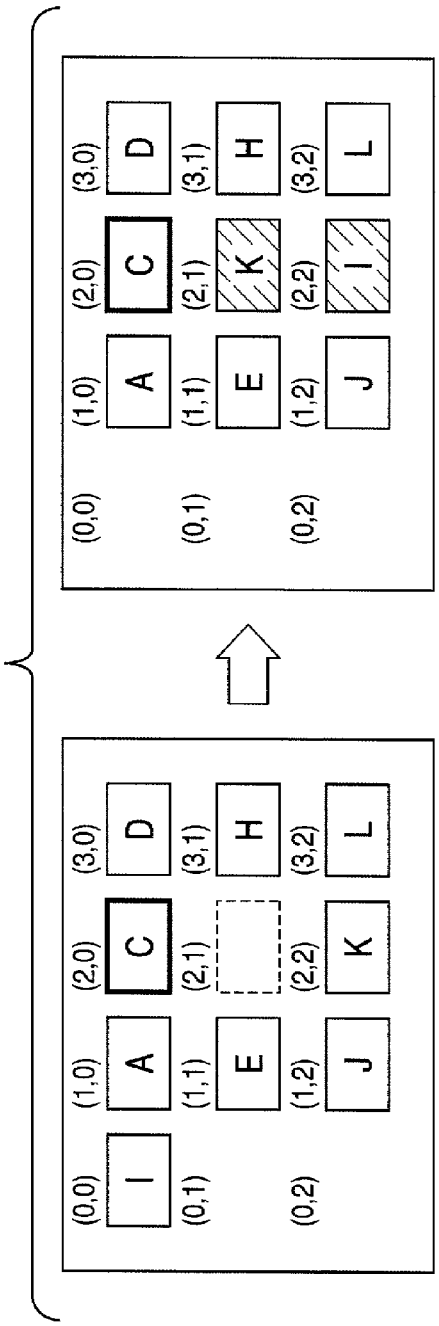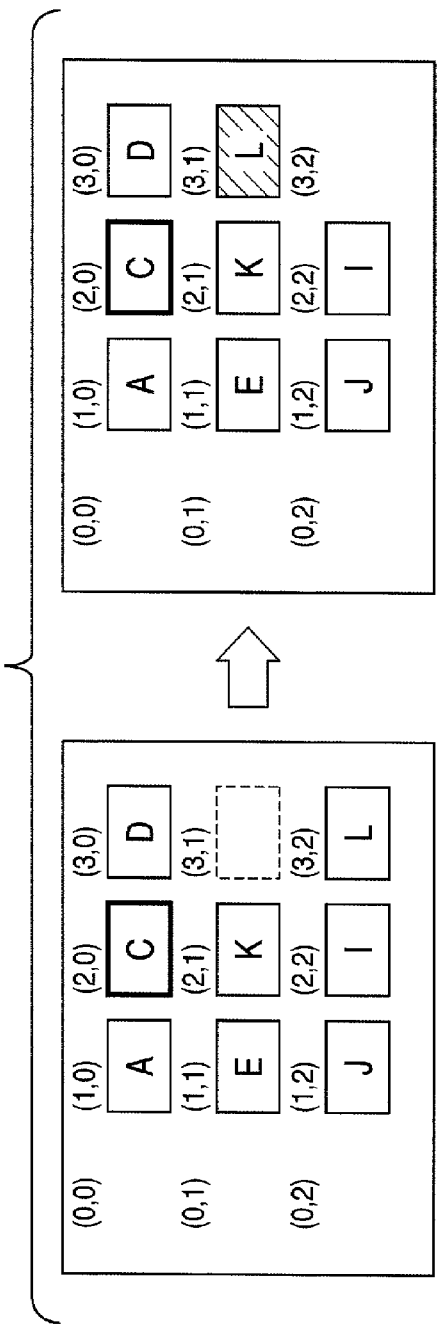

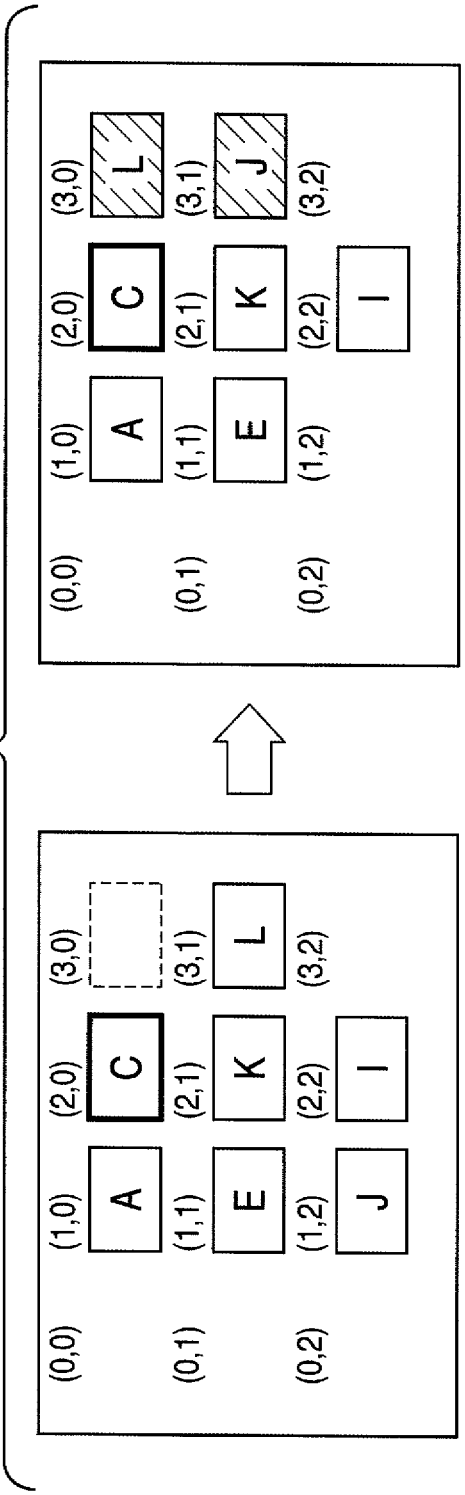

F I G. 11
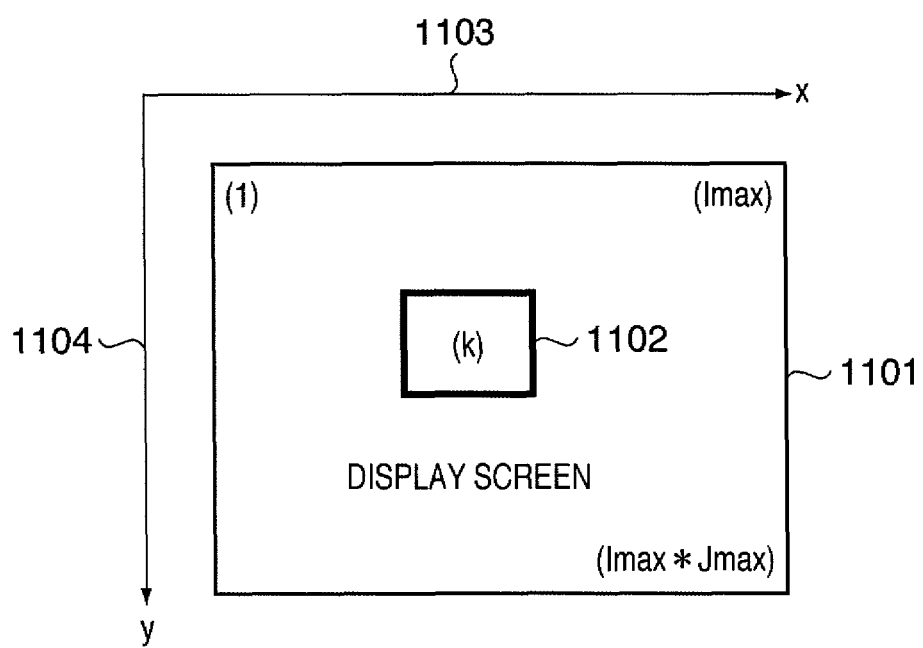

F I G. 13A
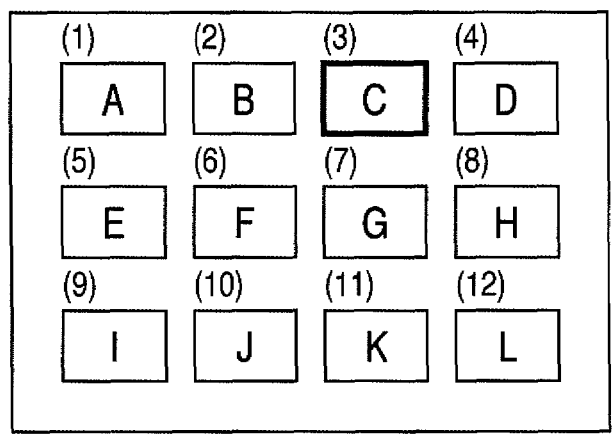
F I G. 13B
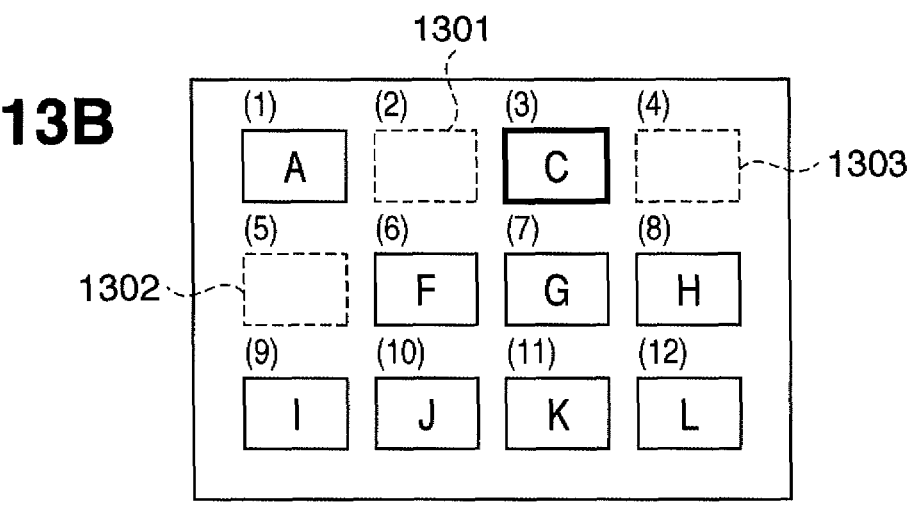
F I G. 13C
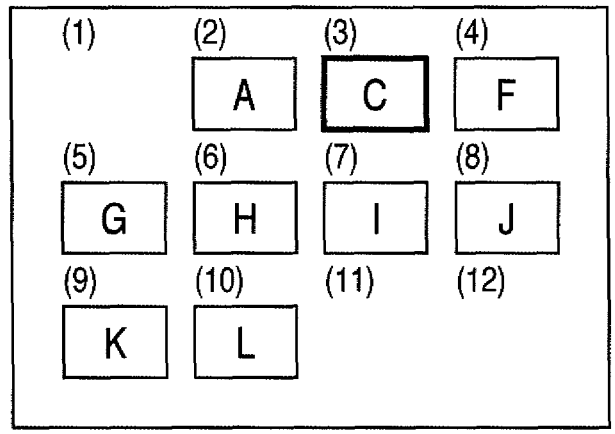

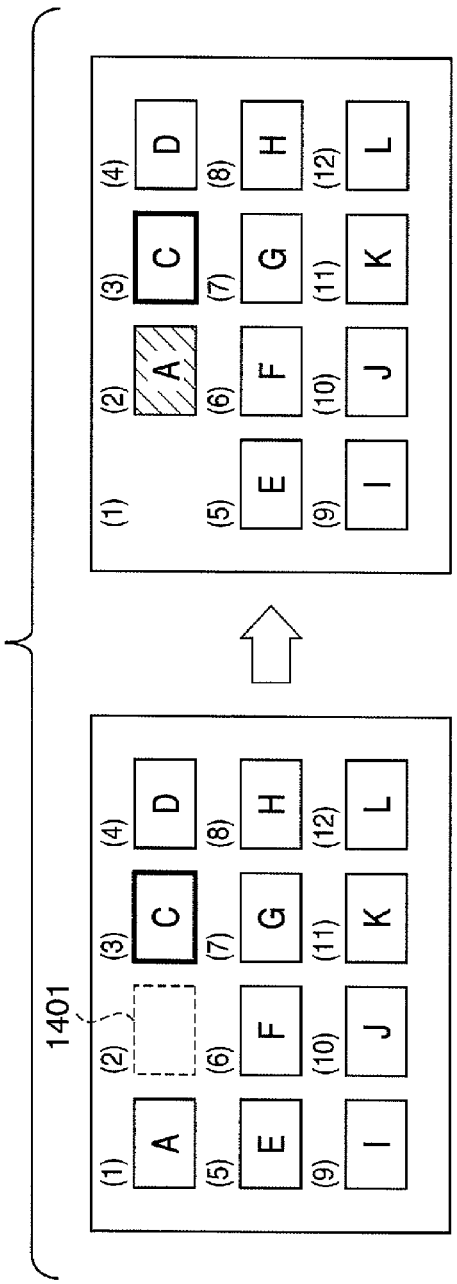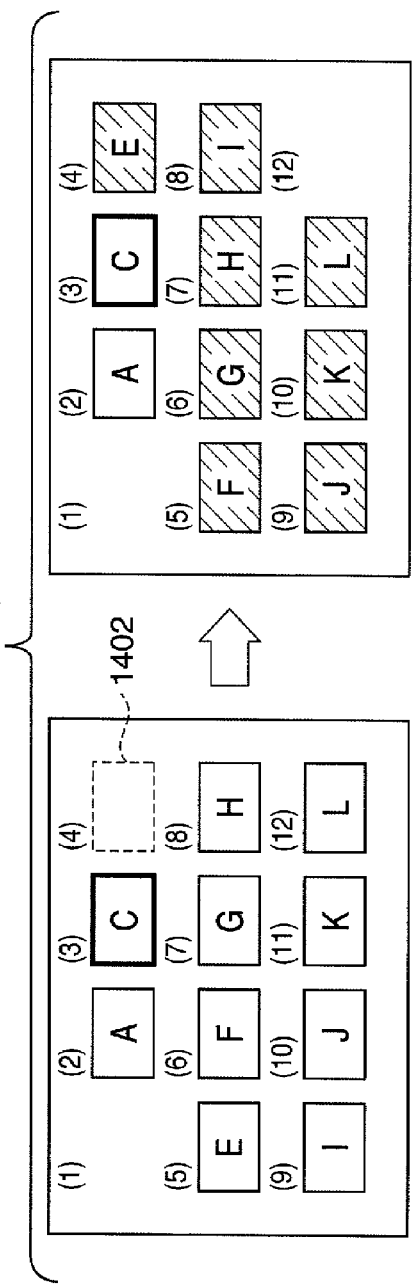

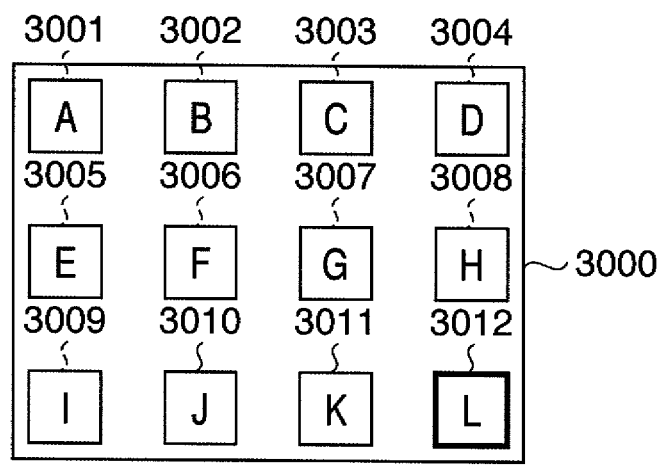
F I G. 30A
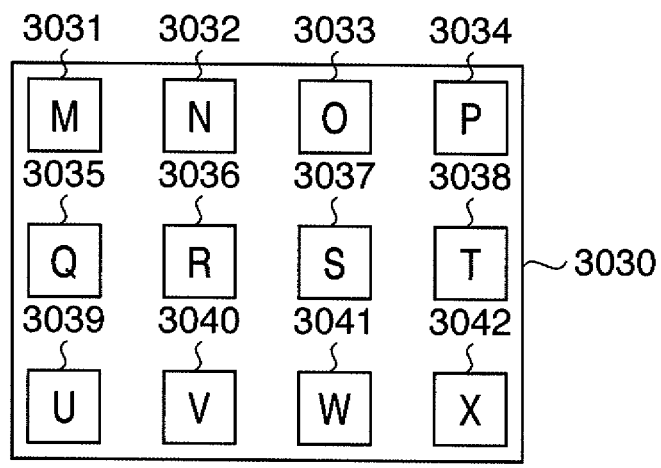
F I G. 30B

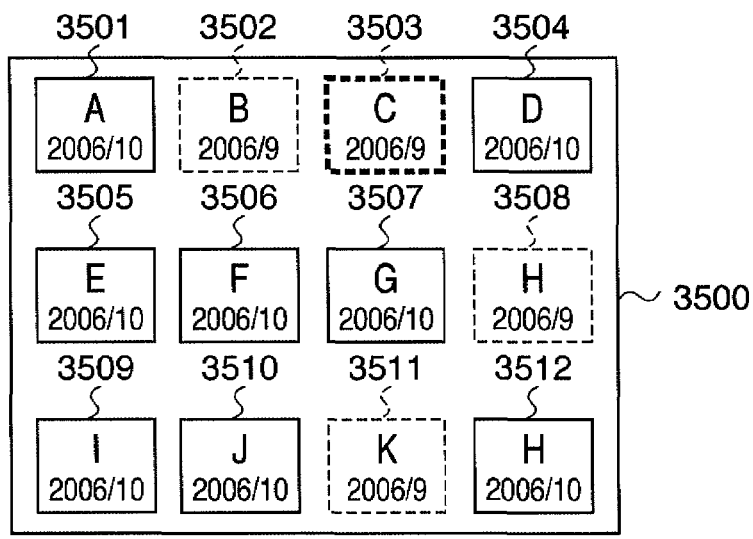
F I G. 42
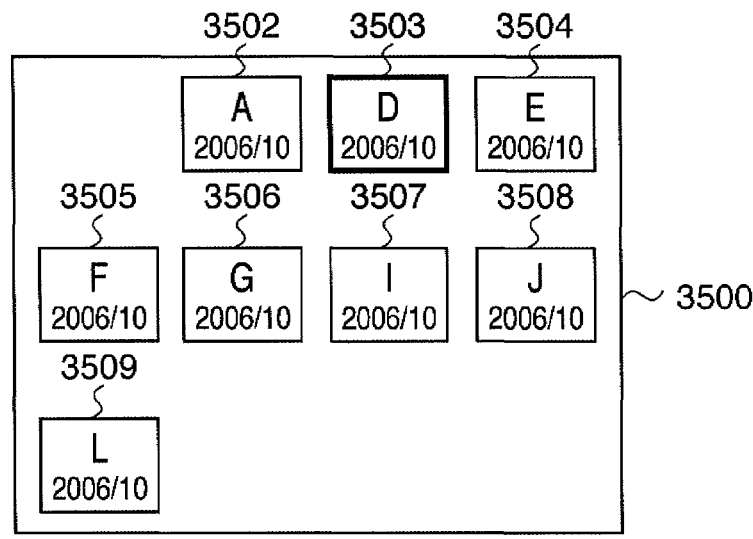
F I G. 43

F I G. 44
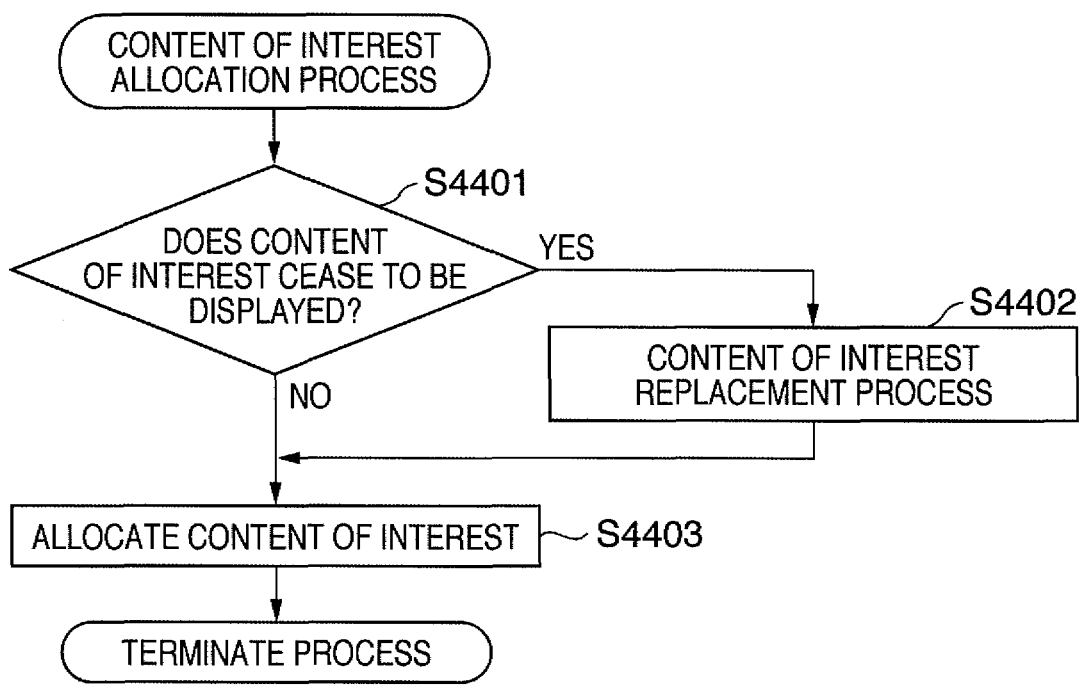

F I G. 45
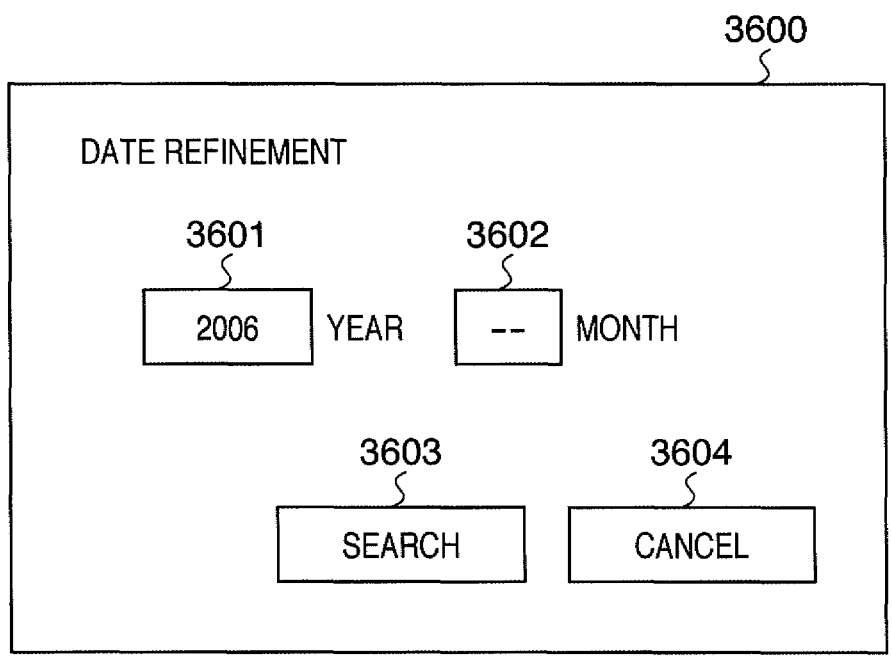

F I G. 46
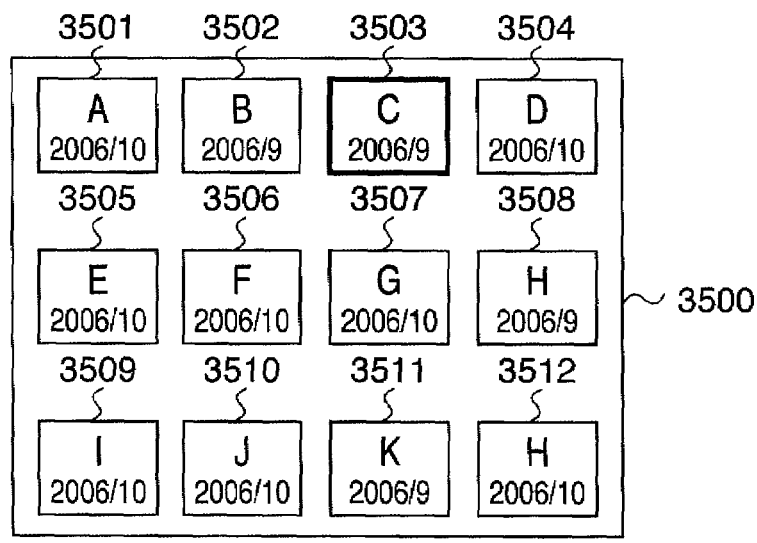
F I G. 47
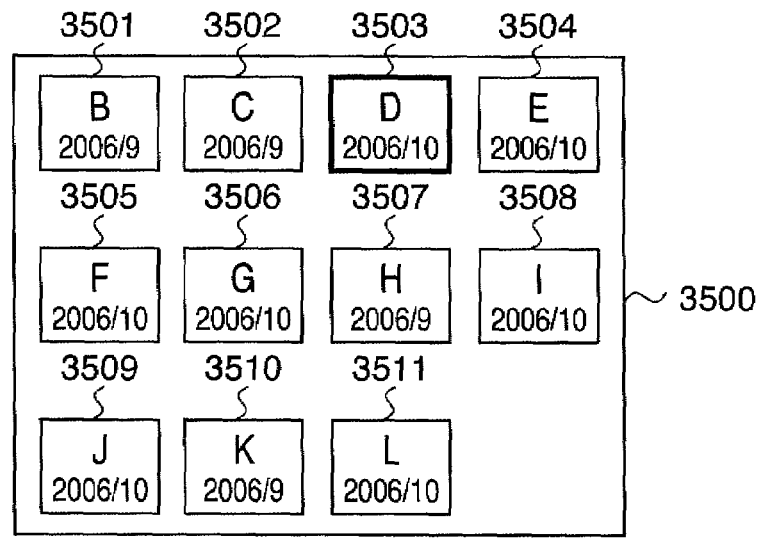

OBJECT DISPLAY APPARATUS AND CONTROL METHOD THEREOF

BACKGROUND OF THE INVENTION

1. Field of the Invention

The present invention relates to an object display method and apparatus for displaying a list of a plurality of objects.

2. Description of the Related Art

In general, it becomes popular for personal computers to refer to various contents held in other apparatuses connected via a network, and to display a list of reference information such as representative images of these contents in a specific order. With this list display, a list of various contents such as still pictures, moving pictures, music pieces, documents, and the like are displayed. Such list display will be referred to as an object list display or contents list display hereinafter. When the user issues an instruction to reference information (to be referred to as content information hereinafter) corresponding to an entity of a content in the contents list, an apparatus of this type allows the user to browse, edit, delete, and so forth the entity of the corresponding content.

In the aforementioned system, since a plurality of users may refer to an identical content group from different apparatuses, various problems are posed. For example, upon displaying a list of contents available in a certain environment, the user cannot often access a content currently displayed in the list display in practice depending on the display update timing. For example, assume a distributed environment in which a storage apparatus that holds contents and a contents list display apparatus that makes a list display of contents are connected via a network. Also, assume that the contents list display apparatus makes the list display including contents held in the storage apparatus in such a distributed environment. Under such circumstances, when the storage apparatus is disconnected from the network, the contents list display on the contents list display apparatus is no longer updated, and the contents list display apparatus displays an error only after the user is about to use a content.

The aforementioned problem occurs not only in the distributed environment. For example, when the user can manipulate available contents by a plurality of methods, he or she inadvertently deletes an arbitrary content by another method during the contents list display, thus posing a similar problem.

In order to avoid the aforementioned problem, Japanese Patent Laid-Open No. 2005-216451 has proposed a method of displaying information indicating inaccessibility for a content, that the user attempted to access once but failed to access, in a list display. According to the method described in this patent reference, since information indicating inaccessibility is displayed together with content information in the contents list display, the user can recognize inaccessibility of a certain content once that content is determined to be inaccessible.

As the contents list display method, a method of sequentially reflecting manipulation events of contents to the display is normally used. In this case, every time a manipulation event of a content occurs, the contents list display is updated. According to this method, since the conditions of contents can be recognized sequentially, accessible contents can be displayed at any time. For example, in the Explorer which runs on Windows® available from Microsoft Corporation, U.S.A., when another user deletes a shared file, that file ceases to display.

In general, in a list display which displays each content information using an icon or reduced-scale image (thumbnail), a certain content in which the user has an interest is expressed clearly by changing a display mode corresponding to that content in the list display. Note that a content in the contents list in which the user has an interest will be referred to as a content of interest hereinafter. As described above, in a system in which one content can be shared by a plurality of apparatuses, a certain user may delete a content of interest of another user. In order to avoid occurrence of such a situation, Japanese Patent Laid-Open No. 2005-071202 discloses a technique for displaying a content of interest of another user on the contents list.

However, even when the aforementioned technique is used, a phenomenon in which a content of interest in the contents list that a certain apparatus refers to becomes unreferable due to external causes or events cannot be avoided. The external events include manipulations such as deletion, movement, and the like of a content entity from another apparatus, disconnection of the network, power-OFF of an apparatus which holds that content, and the like.

As a method of updating the contents list upon occurrence of the phenomenon in which the content of interest becomes unreferable due to external events, a plurality of solutions have been proposed. For example, in Microsoft Windows®, content information corresponding to an unreferable content is deleted from the contents list, and the position where the deleted content information is turned to a vacant state. Also, the following method has been proposed. That is, when a content entity corresponding to a content of interest becomes unreferable, the display position of the content of interest disappears once, and when the user selects arbitrary content information, display of the content of interest is resumed.

In another example, after unreferable content information is deleted from the contents list, subsequent contents in the contents list move over in turn to the position where the deleted content information is allocated, thereby updating the display. In this case, in one method, when a content corresponding to content of interest becomes unreferable, content information which exists at a predetermined default position (e.g., a head position) is displayed as a new content of interest. In another method, the displayed position of the content of interest remains unmoved, and content information allocated at that position after updating the display is displayed as a new content of interest.

An addition/deletion of contents to be displayed on the list display is not limited to the above description. For example, upon acquiring contents that the user requires from those in large quantities, a technique for refining a search to retrieve contents that meet the use purposes and displaying retrieved contents is needed. To meet such needs, Japanese Patent Laid-Open No. 2005-174256 has proposed a method of searching for contents based on attribute information of user's choice, and displaying the search result as a new list display. This method finds, at last, contents that the user wants by repeating selection of attribute information and the list display of the result.

As a method of displaying a new list after a search, subsequent contents in the contents list move over in turn to the positions where contents which are excluded from those to be displayed as a result of the search were allocated, thereby updating the display. In this case, in one method, when a content corresponding to a content of interest is excluded from that to be displayed, content information which exists at a predetermined default position (e.g., a head position) is displayed as a new content of interest. In another method, the displayed position of the content of interest remains unmoved, and content information allocated at that position after updating the display is displayed as a new content of interest.

With the method proposed by Japanese Patent Laid-Open No. 2005-216451, whether or not there are available contents cannot be determined unless the user makes an access at least once. With the method of updating the display every time an event for a content occurs, a user's manipulation on a certain screen is often disturbed since the display of that screen is updated during the manipulation. Also, with the method of updating the display every time an event for a content occurs, when an add event of contents occurs, added contents spread across the screen, and the user may hardly manipulate on a large screen.

Furthermore, the aforementioned conventional contents list updating method suffers the following problems. In an apparatus having no pointing device such as a mouse, digitizer, or the like, if a content of interest is absent, it becomes difficult to select a content to be browsed or manipulated. Upon updating the contents list, when the position of a content of interest on the display has been changed, and particularly when the contents list has been updated due to an external event, the position of interest on the display suffers a change that the user did not intend, resulting in confusion. Upon keeping the position of a content of interest on the display, content information which happens to be allocated at that position after the display update is to be handled as a content of interest. For this reason, for example, when the user refers to contents in the order of the list, the content of interest in the contents list may largely deviate, and the user loses how far he or she has browsed, also resulting in confusion.

Furthermore, with the method proposed by Japanese Patent Laid-Open No. 2005-174256, the display is updated every time a contents search or refinement is conducted. In this way, a user's manipulation is often disturbed since the display of the screen on which he or she is manipulating is updated. More specifically, when the user loses a content of interest upon updating the list display, he or she needs to search for that content of interest. For this reason, when the user makes manipulations for contents in turn while refining contents, if the content of interest has changed, he or she cannot smoothly continue manipulations.

SUMMARY OF THE INVENTION

The present invention has been made in consideration of the aforementioned problems, and its exemplary embodiment provides an object display apparatus which can improve operability of an object display which is updated in accordance with an addition/deletion of objects.

According to one aspect of the present invention, there is provided an object display apparatus comprising:

an object display unit adapted to display a plurality of objects at respective display positions;

a designation unit adapted to designate one of the plurality of objects as an object of interest;

an instruction reception unit adapted to receive an addition or deletion instruction of one or more objects for the plurality of objects displayed by the object display unit; and an update unit adapted to update, when the instruction reception unit receives the instruction, a display by moving objects other than the object of interest while keeping a display position of the object of interest.

Further features of the present invention will become apparent from the following description of exemplary embodiments with reference to the attached drawings.

BRIEF DESCRIPTION OF THE DRAWINGS

FIGS. 6A and 6B are flowcharts showing an update process of a contents list display according to the first embodiment;

FIGS. 8A to 8E show display update states when contents are deleted on the contents list display screen according to the first embodiment;

FIG. 11 is a view for explaining a display area of a content according to the second embodiment;

FIGS. 13A to 13C show display examples when contents are deleted on a contents list display screen according to the second embodiment;

FIGS. 14A to 14C show display update states when contents are deleted on the contents list display screen according to the second embodiment;

FIGS. 30A and 30B show display examples of a contents list by a contents list apparatus according to the fifth embodiment;

FIG. 42 shows a contents list display example according to the eighth embodiment, and visually shows a state in which a content of interest itself ceases to display as a result of refinement;

FIG. 43 shows a contents list display example after the refinement according to the eighth embodiment;

FIG. 44 is an exemplary flowchart showing a content of interest allocation process upon refinement according to the eighth embodiment;

FIG. 45 shows an example of a dialog upon returning to a previous refinement condition according to the ninth embodiment;

FIG. 46 shows a contents list display example upon returning the refinement condition immediately after refinement according to the ninth embodiment;

FIG. 47 shows a contents list display example upon returning the refinement condition after a certain manipulation for contents after the refinement according to the ninth embodiment;

DESCRIPTION OF THE EMBODIMENTS

Exemplary embodiments of the present invention will now be described in detail in accordance with the accompanying drawings.

First Embodiment

The first and second embodiments will explain contents list display control which can continue smooth manipulations without confusing the user even when a contents list display is updated due to an external event in the list display of content information. According to such contents list, the operability of the contents list on a large screen can be improved, and the user can easily manipulate a plurality of contents.

Figure 1:
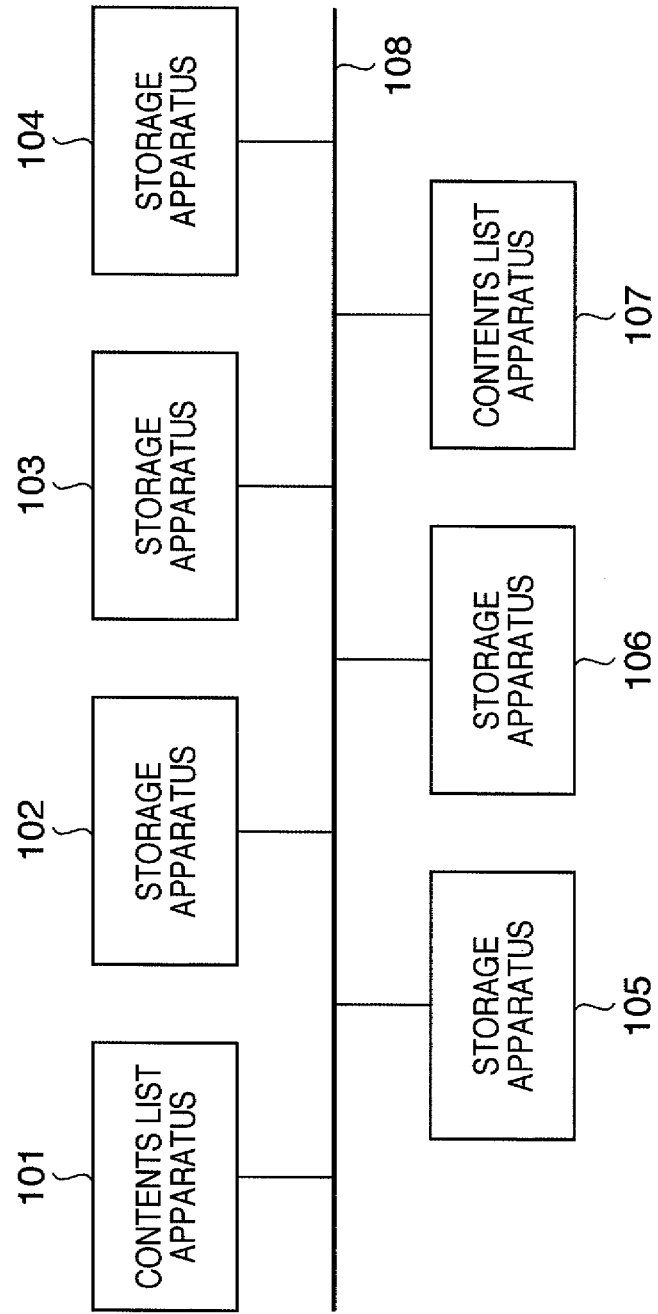
FIG. 1 is an exemplary diagram showing the arrangement of an information processing system according to the first embodiment.

FIG. 1 is an exemplary diagram showing the arrangement of an information processing system according to the first embodiment. As shown in FIG. 1, contents list apparatuses 101 and 107 are connected to a plurality of storage apparatuses 102 to 106 via a network 108. In this way, one or more contents list apparatuses and one or more storage apparatuses are connected on one network in the information processing system of this embodiment.

The storage apparatuses 102 to 106 hold entities of contents. Each of the contents list apparatuses 101 and 107 collects pieces of content information (pieces of meta information of contents) from the storage apparatuses 102 to 106, and generates and displays a contents list. In this embodiment, assume that content information displayed on a list is an icon or thumbnail. Each of the contents list apparatuses 101 and 107 updates the contents list in response to events from the storage apparatuses 102 to 106. Each of the contents list apparatuses 101 and 107 requires the storage apparatuses 102 to 106 to send notifications of connection/disconnection and content addition/deletion, and updates the contents list based on the notifications. Furthermore, each of the contents list apparatuses 101 and 107 instructs the storage apparatuses 102 to 106 to make manipulations such as deletion, movement, and the like to entities of contents based on user's instructions. Moreover, each of the contents list apparatuses 101 and 107 accesses a content and issues a manipulation request to the storage apparatuses 102 to 106 based on user's instructions.

Each of the storage apparatuses 102 to 106 notifies external apparatuses of status change events for contents such as addition, deletion, and the like of contents, and events of startup, termination, and the like of the apparatus. Also, each of the storage apparatuses 102 to 106 allow external apparatuses such as the contents list apparatuses 101 and 107 to access contents held in them, and to make manipulations such as addition, deletion, and the like of these contents. That is, each of the storage apparatuses 102 to 106 returns an entity and meta information of a content in response to a request from an external apparatus, and makes manipulations such as deletion, movement, and the like to entities of contents. Note that the network 108 connects the contents list apparatuses 101 and 107 and the storage devices 102 to 106, and makes them exchange manipulation requests, event notifications, and the like. Note that the contents list apparatus 101 will be described as a representative of the contents list apparatuses 101 and 107, and the storage apparatus 102 will be described as a representative of the storage apparatuses 102 to 106.

Figure 2:
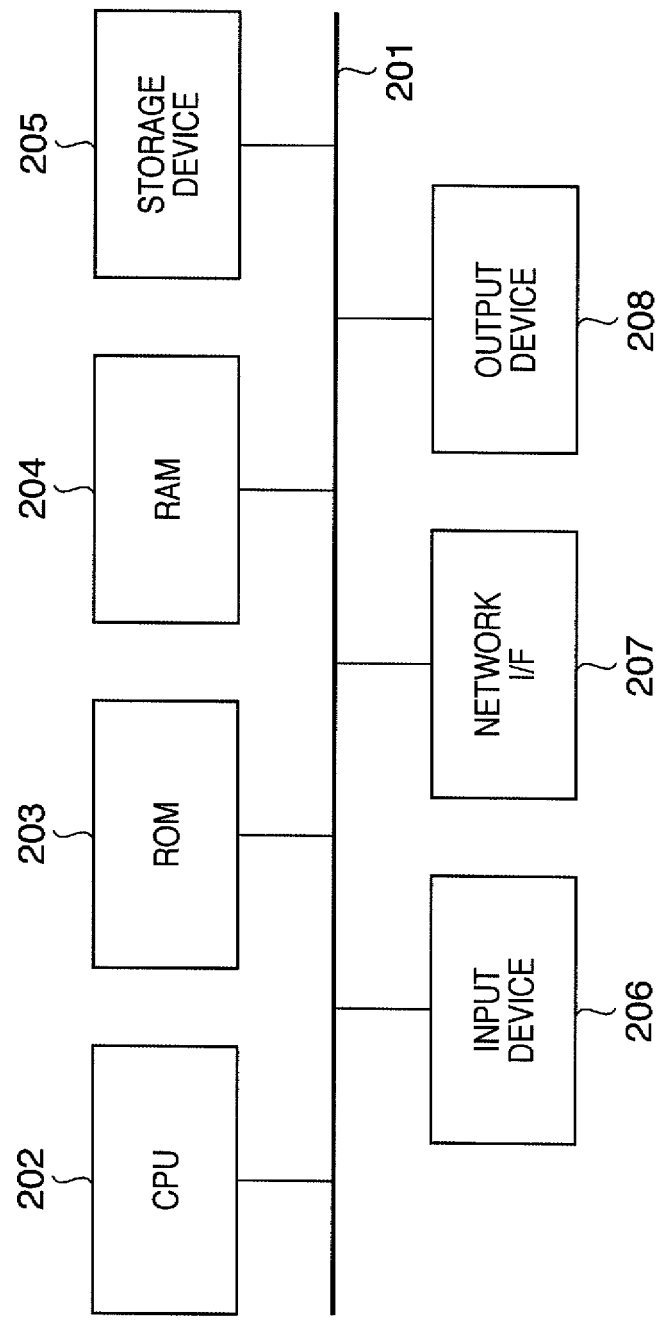
FIG. 2 is an exemplary block diagram showing the hardware arrangement of a contents list apparatus according to the first embodiment.

FIG. 2 is an exemplary block diagram showing the hardware arrangement of the contents list apparatus 101 and storage apparatus 102. Referring to FIG. 2, a CPU 202 makes arithmetic operations, logical decisions, and the like for various processes, and controls respective components connected to a bus 201. This apparatus comprises a memory including a program memory and data memory. The program memory stores control programs for making the CPU 202 execute processing sequences and the like shown in the flowcharts to be described later. Note that the program memory and data memory comprise a ROM 203 and RAM 204. The RAM 204 serves as the program memory when it loads programs to be executed from a storage device 205 and the like. The storage device 205 comprises a nonvolatile memory, hard disk, or the like used to store data and programs. Note that the storage device 205 is also used to hold contents.

An input device 206 comprises a mouse, touch panel, keyboard, and the like, and is used to input user's instructions. The user's instructions include a change instruction of a content of interest (to move a focus), and a delete instruction, move instruction, and the like of contents. An output device 208 outputs data and the like processed by the CPU 202. In this embodiment, a display device such as a CRT, liquid crystal display, or the like, which makes various displays under the control of the CPU 202, is used as the output device 208. The output device 208 may also comprise an audio output such as a loudspeaker or the like. In the contents list apparatus 101, the display device displays contents sorted in a prescribed order under the control of the CPU 202. A network I/F 207 realizes communications with other apparatuses connected via the network 108. The contents of communications via the network I/F 207 include reception of startup/termination notifications and content addition/deletion notifications from the storage apparatus 102, transmission of deletion/movement instructions of contents and the like to the storage apparatus 102, and so forth.

Figure 3:
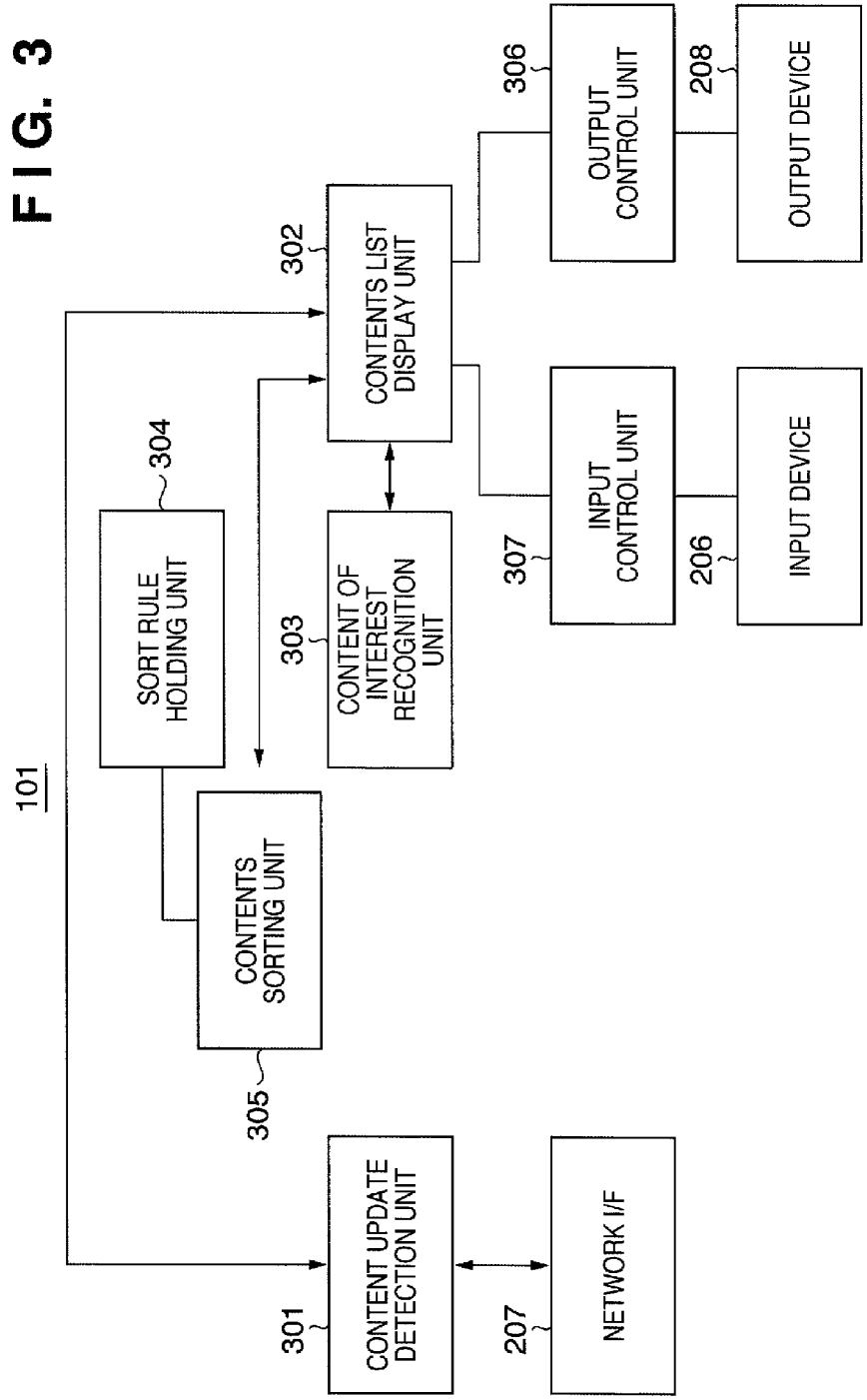
FIG. 3 is an exemplary block diagram showing the functional arrangement associated with a contents list display process according to the first embodiment.

FIG. 3 is an exemplary block diagram showing the functional arrangement of the contents list apparatus 101 according to the first embodiment.

A content update detection unit 301 receives event notifications such as addition and deletion of contents, startup and termination of the apparatus, and the like from the storage apparatus 102. Upon reception of an event notification, the content update detection unit 301 notifies a contents list display unit 302 of update information, thereby instructing it to update a contents list.

The contents list display unit 302 holds pieces of content information for all contents on the network, determines the display positions of the pieces of content information on the display device, and outputs the determined display positions to the output device 208 via an output control unit 306.

A content of interest recognition unit 303 manages a content (focused content) in which the user has an interest, and its display position. The content in which the user has an interest is a content which is selected by a selection which is made by the user using the input device 206 and is input via an input control unit 307. Therefore, such content of interest may be switched according to user's manipulations.

A sort rule holding unit 304 holds a sort rule for sorting pieces of content information to make a list display using, for example, the storage device 205. The sort rule includes, for example, a rule for sorting contents in an order of time of creation. The sort rule holding unit 304 holds one or more sort rules. A contents sorting unit 305 sorts contents according to the sort rule held in the sort rule holding unit 304. Upon reception of an update instruction of the contents list, the contents sorting unit 305 re-sorts the contents using the contents sort rule held by the sort rule holding unit 304, and makes the contents list display unit 302 update the list display.

Figure 4:
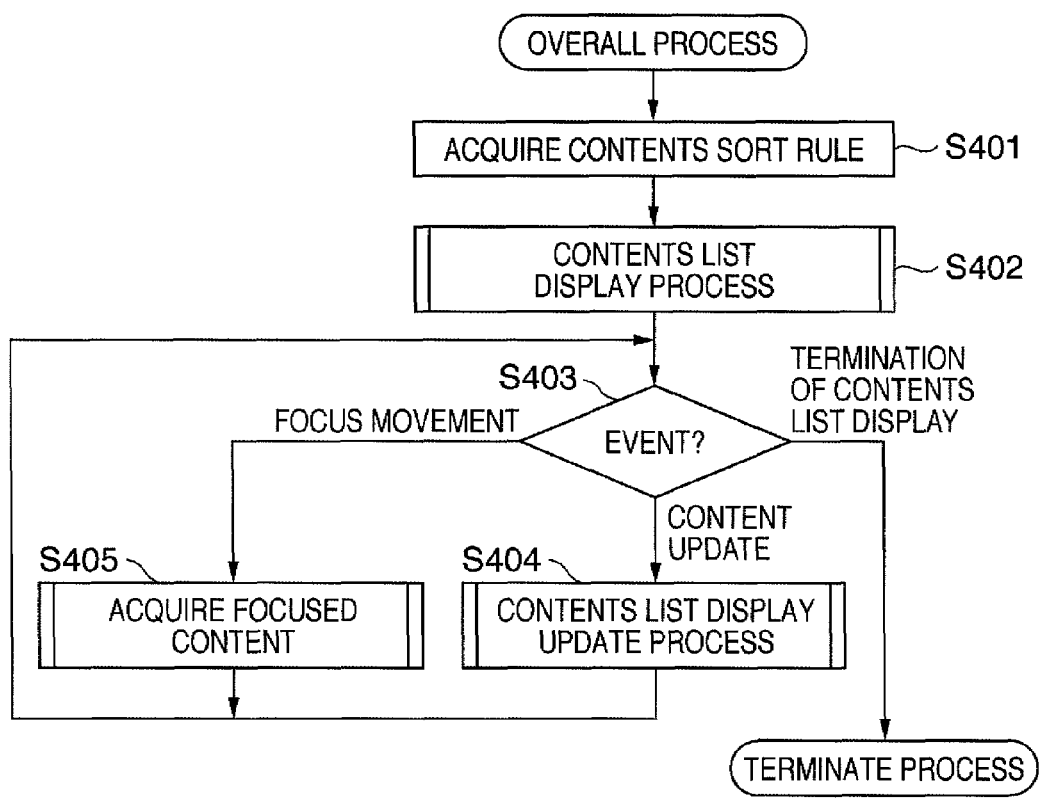
FIG. 4 is a flowchart showing the overall sequence of the contents list display process according to the first embodiment.

The overall processing of the contents list apparatus 101 according to the first embodiment with the aforementioned arrangement will be described below. FIG. 4 is a flowchart showing an overview of a list display process by the contents list apparatus according to the first embodiment.

Upon starting up the contents list apparatus 101, the contents list display unit 302 acquires a contents sort rule for the list display from the sort rule holding unit 304 in step S401. In step S402, the contents list display unit 302 acquires pieces of content information of all referable contents, and displays a list of contents according to the contents sort rule acquired in step S401. Assume that a content of interest is, for example, a head one of the sorted contents. If no contents sort rule is acquired, contents may be displayed in an order the pieces of content information are acquired. After that, the contents list display unit 302 enters an event waiting state in step S403.

If the user moves a focus (to change a content of interest (focused content)), the process advances to step S405. In step S405, contents list display unit 302 acquires content information of a new content of interest. If the content update detection unit 301 receives an event notification indicating that contents in the currently displayed contents list have been updated, the process advances to step S404. In step S404, the contents list display unit 302 executes a process for updating the contents list display based on the notification from the content update detection unit 301. If a termination instruction of the content information list display is input by, for example, a user's request, this process terminates.

Figure 5:
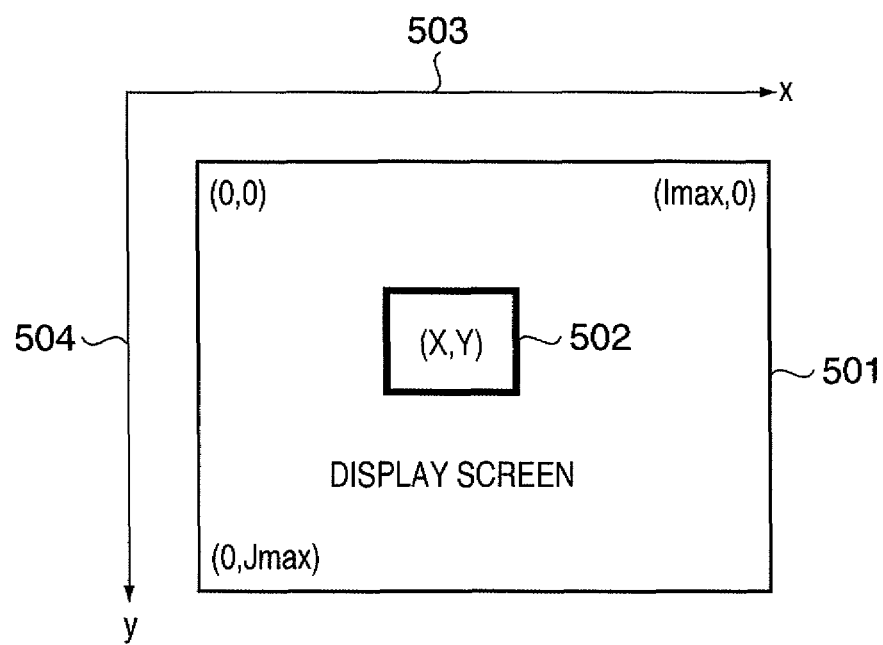
FIG. 5 is a view for explaining a display area of a content according to the first embodiment.

The process for the contents list display according to the first embodiment will be described below. FIG. 5 is a view for explaining a content display area according to the first embodiment. In the first embodiment, a representative image or icon of a content is displayed on a two-dimensional display area 502 of content information. A plurality of display areas 502 are displayed in a matrix pattern within a display area 501 which has a maximum value Imax in an x-axis direction 503 and a maximum value Jmax in a y-axis direction 504, and has an upper left content display position on the screen, which is defined by (0, 0), as will be described later using FIGS. 7A to 7C and the like. Therefore, a list of contents is displayed by two-dimensionally allocating a plurality of pieces of content information. Note that the position of an upper left content display area on the screen is specified by (0, 0), and that of an arbitrary display area 502 (to be referred to as a display position hereinafter) is defined by (X, Y). In this embodiment, an allocation interval in the x-axis direction of the display area 502 is set to be twice that in the y-axis direction. Therefore, for example, the distance between the display positions (2, 0) and (0, 0) is 4, and that between the display positions (2, 0) and (1, 2) is $\sqrt{8}$.

Figure 6A:
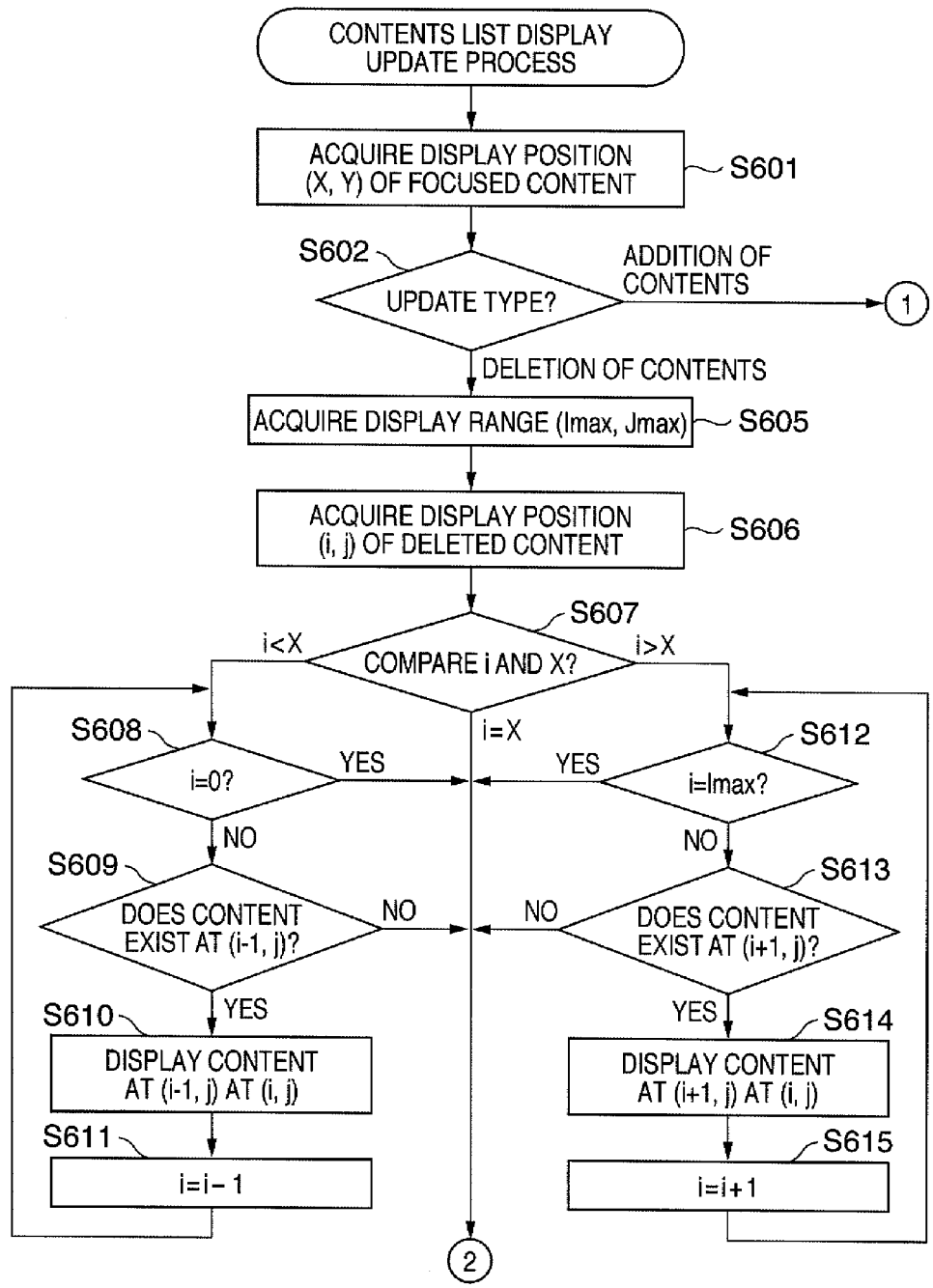
Figure 7A:
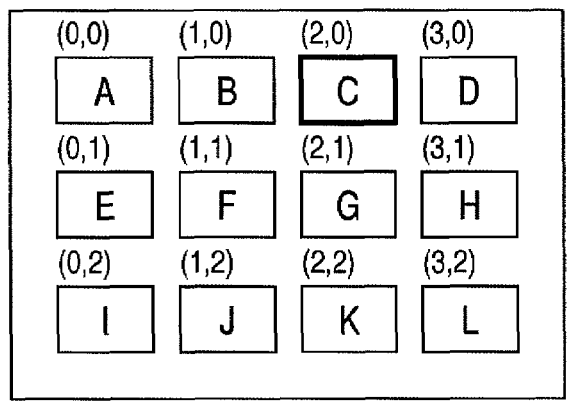
FIGS. 7A to 7C show display examples when contents are deleted on a contents list display screen according to the first embodiment.
Figure 7B:
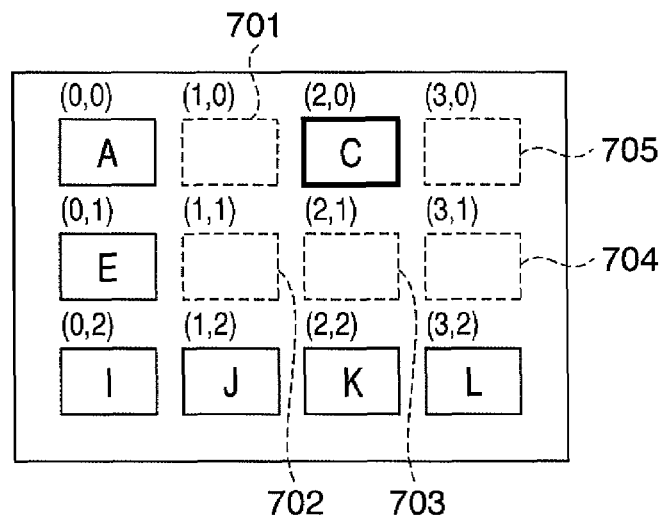
Figure 7C:
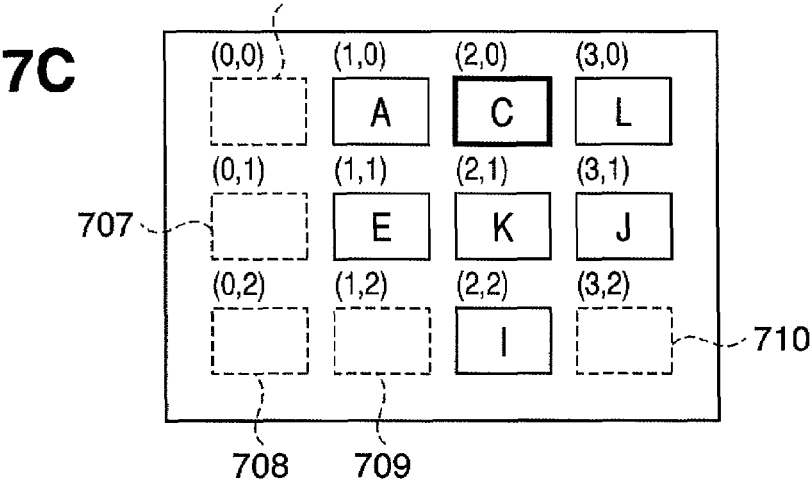

FIGS. 6A and 6B are flowcharts showing the contents list display update process (S404 in FIG. 4) according to the first embodiment. FIGS. 7A to 7C show operation examples of the contents list display update process according to the first embodiment. In the contents list display update process of this embodiment, as shown in FIGS. 7A to 7C, (1) the display position of a content of interest (the display area (2, 0) that displays content C in FIGS. 7A to 7C) is fixed, and (2) remaining displayed contents are moved to display areas (areas 701 to 705 in FIG. 7B) where deleted (cleared) contents were displayed, so that all contents are displayed within a range as narrow as possible to have the display position of the content of interest as the center.

In step S601, the contents list display unit 302 acquires the display position (X, Y) of a content in which the user currently has an interest (content of interest=focused content). Note that the display position of the content of interest is acquired from the content of interest recognition unit 303. In step S602, the contents list display unit 302 checks the type of content update event based on an event notification from the content update detection unit 301.

If the update event is associated with addition of a content, the process advances to step S603. In step S603, the contents list display unit 302 acquires a displayable position (m, n) closest to the content of interest. In step S604, the contents list display unit 302 displays a content added by the update event at the displayable position (m, n) acquired in step S603. In this way, the contents list display update process associated with addition of a content terminates.

On the other hand, if it is determined in step S602 that the type of update event indicates deletion of a content, the process advances to step S605. The contents list display unit 302 acquires a display range (Imax and Jmax) as a displayable range of pieces of content information in step S605, and acquires the display position (i, j) of the deleted content in step S606.

In step S607, the contents list display unit 302 compares the x-coordinate value X of the content of interest acquired in step S601 with the x-coordinate value i of the deleted content acquired in step S606. As a result of comparison, if i<X, the process advances to step S608; if i>X, the process advances to step S612; or if i=X, the process advances to step S616.

Under the assumption that the display area 502 in FIG. 5 is the display position of the content of interest, the processes in steps S608 to S611 executed when i<X are those when the display position of the deleted content is located on the left side of that of the content of interest. Likewise, the processes in steps S612 to S615 executed when i>X are those when the position of the deleted content is located on the right side of that of the content of interest. Also, i=X indicates that the display positions of the deleted content and content of interest exist on an identical line in the y-axis direction.

The contents list display unit 302 checks in step S608 if i=0. If i≠0, the contents list display unit 302 checks in step S609 if content information is displayed at a display position (i−1, j). If content information is already displayed at the display position (i−1, j), the process advances to step S610. In step S610, the contents list display unit 302 moves a display of the content information at the display position (i−1, j) to an area (i, j). In step S611, the contents list display unit 302 decrements i by 1, and the process returns to step S608. If i=0 in step S608, or if no content information is displayed at the display position (i−1, j) in step S609, the process advances to step S616 via a loop of steps S608 to S611. As described above, when a content of the display area on the left side of the content of interest is deleted, the contents list display unit 302 moves over a display of the display area on the left side of that of the deleted content in turn to the right side.

If i>X in step S607, the contents list display unit 302 checks in step S612 if i=Imax. If i≠Imax, the contents list display unit 302 checks in step S613 if a content is displayed at a display position (i+1, j). If a content is displayed at the display position (i+1, j), the process advances to step S614. In step S614, the contents list display unit 302 moves a display of content information at the display position (i+1, j) to the display position (i, j). In step S615, the contents list display unit 302 increments i by 1, and the process returns to step S612. If i=Imax in step S612, or if no content is displayed at the display position (i+1, j) in step S613, the process advances to step S616 via a loop of steps S612 to S615. As described above, when a content of the display area on the right side of the content of interest is deleted, the contents list display unit 302 moves over a display of the display area on the right side of that of the deleted content in turn to the left side.

If i=X in step S607, the process advances to step S616. In steps S616 to S624, the same processes as in steps S607 to S615 are executed in association with the y-axis direction.

In step S616, the contents list display unit 302 compares the y-coordinate value Y of the content of interest acquired in step S601 with the y-coordinate value j of the content deleted in step S606. As a result of comparison, if j<Y, the process advances to step S617; if j≥Y, the process advances to step S621.

Under the assumption that the display area 502 in FIG. 5 is the display position of the content of interest, the processes in steps S617 to S620 executed when j<Y are those when the display position of the deleted content is located on the upper side of that of the content of interest. Likewise, the processes in steps S621 to S624 executed when j≥Y are those when the display position of the deleted content is located at the same level as or on the lower side of that of the content of interest.

The contents list display unit 302 checks in step S617 if j=0. If j≠0, the contents list display unit 302 checks in step S618 if content information is displayed at a display position (i, j−1). If content information is displayed at the display position (i, j−1), the process advances to step S619. In step S619, the contents list display unit 302 moves a display of the content information located at the display position (i, j−1) to the display position (i, j). In step S620, the contents list display unit 302 decrements j by 1, and the process returns to step S617. If j=0 in step S617, or if no content is displayed at the display position (i, j−1) in step S618, the process advances to step S625 via a loop of steps S617 to S620. As described above, when a content corresponding to content information displayed on a display area on the upper side of the content of interest is deleted, the contents list display unit 302 moves over a display of the display area on the upper side of that of the deleted content in turn to the lower side.

If i≥Y in step S616, the contents list display unit 302 checks in step S621 if j=Jmax. If j≠Jmax, the contents list display unit 302 checks in step S622 if content information is displayed at a display position (i, j+1). If a content is displayed at the display position (i, j+1), the process advances to step S623. In step S623, the contents list display unit 302 moves a display of the content information at the display position (i, j+1) to the display position (i, j). In step S624, the contents list display unit 302 increments j by 1, and the process returns to step S621. If j=Jmax in step S621 or if no content is displayed at the display position (i, j+1) in step S622, the process advances to step S625 via a loop of steps S621 to S624. As described above, when a content displayed on a display area on the lower side of the content of interest is deleted, the contents list display unit 302 moves over a display of the display area on the lower side of that of the deleted content in turn to the upper side.

In step S625, the contents list display unit 302 acquires a vacant display position closest to the content of interest. In step S626, the contents list display unit 302 acquires a display position of an arbitrary content farthest from the content of interest. In step S627, the contents list display unit 302 compares the display positions acquired in steps S625 and S626. If the vacant display position closest to the content of interest is closer to the content of interest than the display position of an arbitrary content farthest from the content of interest, the contents list display unit 302 updates the list display. That is, the process advances from step S627 to step S628, and the contents list display unit 302 moves a display of content information which is displayed at a position farthest from the display position of the content of interest to the closest vacant display position. The contents list display unit 302 repeats the processes in steps S625 to S628 until NO is determined in step S627. If NO is determined in step S627, the contents list display unit 302 terminates the display update process.

The aforementioned contents list display update process will be further described using practical examples of FIGS. 7A to 7C and FIGS. 8A to 8E.

Assume that pieces of content information of contents A to L are respectively displayed at display positions (0, 0) to (3, 2), as shown in FIG. 7A. Note that the current content of interest of the user is content C, and its display position is defined by (2, 0). In this example, a content displayable display position on the display screen falls within a range from (0, 0) to (3, 2), and has the maximum value (Imax)=3 in the x-axis direction and the maximum value (Jmax)=2 in the y-axis direction.

In this state, when contents B, D, F, G, and H are deleted due to an external event, in this embodiment, displays of contents are cleared, and display areas 701 to 705 are turned to a vacant state, as shown in FIG. 7B. Then, remaining contents move to the vacant display areas 701 to 705. As shown in FIG. 7C, the list display is updated so that displays of the remaining pieces of content information get together to the display position of content of interest C, and contents cease to be displayed on display areas 706 to 710. This display update process will be described in more detail below.

FIGS. 8A to 8E show display update states when contents B, D, F, G, and H are deleted from the list display state shown in FIG. 7A. FIGS. 8A to 8E display update states step by step under the assumption that contents are deleted in the order of B→F→G→H→D.

FIG. 8A shows the list display update state when content B is deleted. Note that the display position of content of interest C is (X, Y) (2, 0), that of content B to be deleted is (i, j)=(1, 0), Imax=3, and Jmax=2.

Upon reception of an event notification indicating that content B is deleted, the contents list display unit 302 executes the contents list display update process shown in FIGS. 6A and 6B. The contents list display unit 302 acquires the display position (X, Y)=(2, 0) of focused content C (S601). Since the type of update event is "deletion of content", the contents list display unit 302 acquires the displayable range (Imax=3, Jmax=2), and the display position (i, j)=(1, 0) of deleted content B (S602, S605, S606).

At this time, since i=1, i<X and i≠0. Hence, the contents list display unit 302 checks if a content is displayed at the display position (i−1, j) (S607, S608). As shown in FIG. 8A, content A is displayed at the display position (0, 0). Therefore, the contents list display unit 302 clears a display of content B, and moves a display of content A at the display position (i−1, j)=(0, 0) to the display position (i, j)=(1, 0) (S609, S610). As a result, after the display update process, content A is displayed at the display position (1, 0). Since j=Y=0, the process advances from step S616 to S625. Since the display of content A has moved, the display position (0, 0) becomes a vacant area closest to content of interest C. A display position farthest from content of interest C is (0, 2) of content I, and this display position is farther from content of interest C than the display position (0, 0). Therefore, in the processes in steps S625 to S628, the contents list display unit 302 moves a display of content I to the display position (0, 0). As a result, contents are allocated, as shown in the right side of FIG. 8A.

Subsequently, the display update process in FIG. 8B will be described. FIG. 8B shows the display update state when content F is deleted. Note that the display position of content of interest C is (X, Y)=(2, 0), that of content F to be deleted is (i, j)=(1, 1), Imax=3, and Jmax=2. Like in deletion of content B, the contents list display update process starts in response to deletion of content F.

The contents list display unit 302 acquires the display position (X, Y)=(2, 0) of content of interest C (S601). Since the type of update event is "deletion of content", the contents list display unit 302 acquires the displayable range (Imax=3, Jmax=2), and the display position (i, j)=(1, 1) of deleted content F (S602, S605, S606). Since i<X and i≠0, and content E is displayed at the display position (i−1, j)=(0, 1), the contents list display unit 302 moves a display of content E to the display position (i, j)=(1, 1) (S607 to S610). As a result, after the display update process, content E is displayed at the display position (1, 1). Note that a vacant display position closest to the content of interest C is (0, 1), and the display position of an arbitrary content farthest from content of interest C is (1, 2) or (3, 2). Therefore, the display position change processes in steps S625 to S628 are not taken place.

Next, the display update process in FIG. 8C will be described below. FIG. 8C shows the display update state when content G is deleted. The display position of content G is (2, 1). In response to deletion of content G the content list display update process shown in FIGS. 6A and 6B starts.

The contents list display unit 302 acquires the display position (X, Y)=(2, 0) of content of interest C (S601). Since the type of update event is "deletion of content", the contents list display unit 302 acquires the displayable range (Imax=3, Jmax=2), and the display position (i, j)=(2, 1) of deleted content G (S602, S605, S606). Since i=X and j>Y, and content K is displayed at a display position (i, j+1)=(2, 2), the contents list display unit 302 moves content K to the display position (i, j)=(2, 1) and displays it (S607, S616, S621 to S623). After j is incremented in step S624, j=Jmax=2. Therefore, the process advances from step S621 to step S625.

The distance (2) to the vacant display position (2, 2) closest to content of interest C is shorter than the distance (4) to the display position (0, 0) of content I farthest from content of interest C. Hence, in steps S625 to S628, the contents list display unit 302 moves the farthest display of content I to the closest vacant display position. As a result, contents are displayed in a state of the right side of FIG. 8C. In this state, since there is no vacant display position closer than the display position of content J or L farthest from content of interest C, the contents list display update process terminates from step S627.

Subsequently, the display update process in FIG. 8D will be described below. FIG. 8D shows the display update state when content H is deleted. The display position of content H is (i, j)=(3, 1). In response to deletion of content H the content list display update process shown in FIGS. 6A and 6B starts.

The contents list display unit 302 acquires the display position (X, Y)=(2, 0) of content of interest C (S601). Since the type of update event is "deletion of content", the contents list display unit 302 acquires the displayable range (Imax=3, Jmax=2), and the display position (i, j)=(3, 1) of deleted content H (S602, S605, S606). Since i>X and i=Imax, the process advances to step S616 (S607, S612, S613). Since j>Y, j≠Jmax, and content L is displayed at a display position (i, j+1)=(3, 2), the contents list display unit 302 displays content L at the display position (i, j)=(3, 1) (S616, S621 to S623).

After j is incremented in step S624, j=Jmax=2, and the process advances from step S622 to step S625.

In this state, a vacant display position closest to content of interest C is (3, 2), and the display position of content J farthest from content of interest C is (1, 2). Both the distance between the display positions (2, 0) and (3, 2), and that between the display positions (2, 0) and (1, 2) are $\sqrt{8}$, and the display need not be updated. Therefore, the contents list display update process terminates from step S627. In this manner, after the display update process, content L is displayed at the display position (3, 1), and the display state on the right side of FIG. 8D is obtained.

Finally, the display update process in FIG. 8E will be described below. FIG. 8E shows the display update state when content D is deleted. The display position of content D is (3, 0). In response to deletion of content D, the content list display update process shown in FIGS. 6A and 6B starts.

The contents list display unit 302 acquires the display position (X, Y)=(2, 0) of content of interest C (S601). Since the type of update event is "deletion of content", the contents list display unit 302 acquires the displayable range (Imax=3, Jmax=2), and the display position (i, j)=(3, 0) of deleted content D (S602, S605, S606). Since i>X and i=Imax, the process advances to step S616. Since j>Y, j≠Jmax, and content L is displayed at a display position (i, j+1)=(3, 1), the contents list display unit 302 moves a display of content L to the display position (i, j)=(3, 0) (S616, S621 to S623). After j is incremented in step S624, j=Jmax 2, and the process advances from step S622 to step S625.

The distance ($\sqrt{5}$) to the vacant display position (3, 1) closest to content of interest C is shorter than the distance ($\sqrt{8}$) to the display position (1, 2) of content J farthest from content of interest C. Hence, in steps S625 to S628, the contents list display unit 302 moves the farthest display of content J to the closest vacant display position (3, 1). As a result, the display state on the right side of FIG. 8E is obtained.

The distance ($\sqrt{8}$) to the vacant display position (3, 2) closest to content of interest C is larger than the distance (2) to the display position (2, 2) of content I farthest from content of interest C. That is, there is no vacant display position closer than the display position of a content farthest from content of interest C, the contents list display update process terminates from step S627.

As described above, in the contents list display update process of the first embodiment, the following moving processes are executed. That is, to a vacant (non-display) display position which is generated due to disappearance or movement of a content, a content displayed at a display position which neighbors the vacant display position and is farther from that of a content of interest than the vacant display position is moved (first moving process), with the above process, a vacant display position is formed on the outer side of the displayable range, and after movement, when the distance to the farthest display position of an arbitrary content is larger than the distance to the closest vacant display position with reference to the display position of the content of interest, the content displayed at the farthest display position is moved to the closest vacant display position (second moving process).

With the above processes, when contents B, F, G, H, and D are deleted by external events, the display is updated so that the displays of remaining contents get together around the display position of content of interest C, as shown in FIG. 7C, in this embodiment.

Subsequently, a practical example of the screen update process upon adding contents by external events will be described below.

Figure 9A:
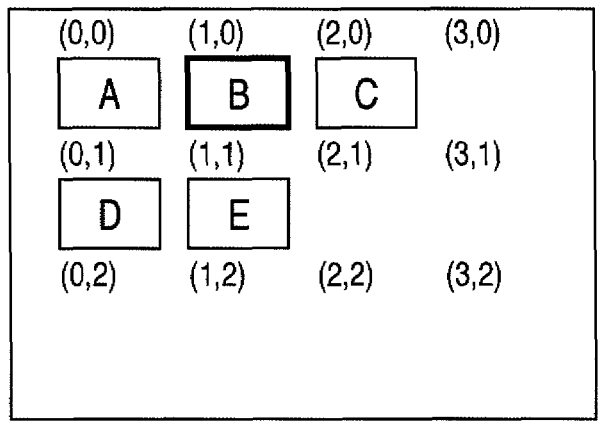
FIGS. 9A to 9C show display examples when contents are added on the contents list display screen according to the first embodiment.
Figure 9B:
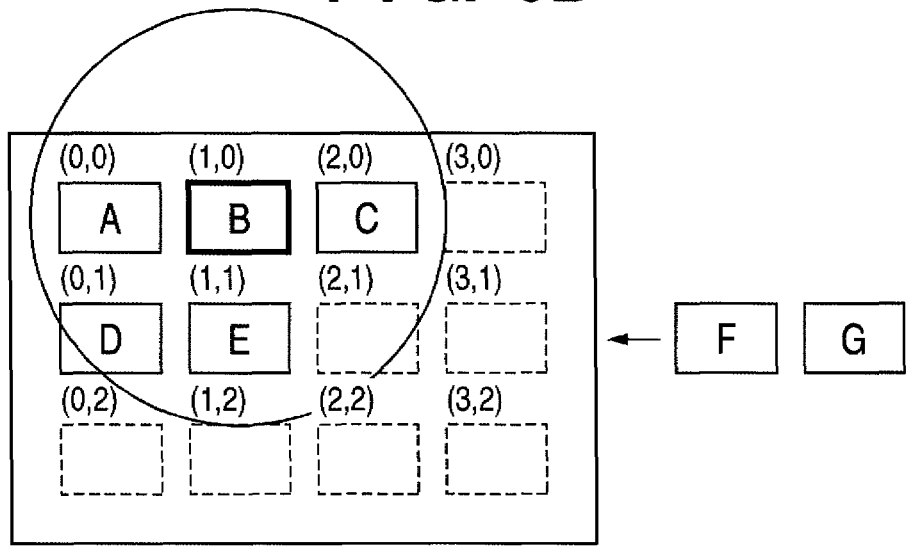
Figure 9C:
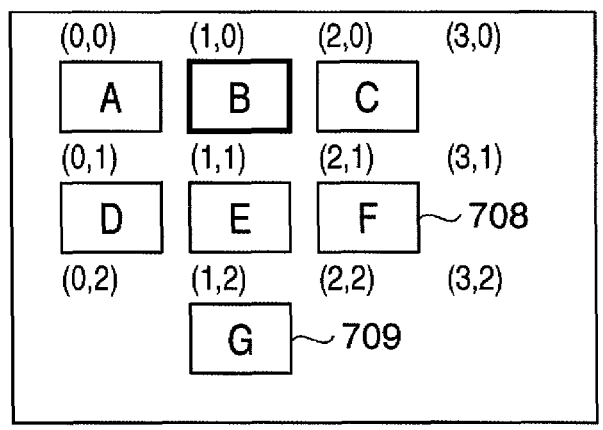

FIGS. 9A to 9C show examples of the screen update process according to the first embodiment. FIG. 9A shows a state in which contents A to E are displayed, and FIGS. 9B and 9C explain states in which contents F and G are additionally displayed.

In FIG. 9A, a content in which the user currently has an interest, that is, a content of interest, is content B, and its display position is (1, 0). In this state, when contents F and G are added by external events, as shown in FIG. 9B, the display is updated so as not to influence the display of content of interest B, as shown in FIG. 9C, in this embodiment. That is, the added contents are displayed so that the focus state and display position of the content of interest remain unchanged. Such display update process will be described in detail below. Note that the process will be explained under the assumption that contents are added in the order of F→G.

In response to addition of content F, the contents list display update process is called in step S404 in FIG. 4. In the contents list display update process shown in FIGS. 6A and 6B, the content of interest recognition unit 303 acquires the display position (X, Y) of content of interest B in step S601. In FIG. 9A, (X, Y)=(1, 0) is acquired. Subsequently, since the type of external update event is "addition of content", the process advances from step S602 to step S603. In step S603, the contents list display unit 302 acquires a content displayable position (m, n) closest to the position of the focused content acquired in step S601. In FIG. 9A, (m, n)=(2, 1) is acquired. In step S604, the contents list display unit 302 displays added content F at the closest content displayable position (in this example, a display area 708 at (m, n)=(2, 1)).

In response to addition of content G, steps S601 to S604 are executed, as described above. As a result, content G is displayed on a display area 709 at a content display position (m, n)=(1, 2) closest to the display position (X, Y)=(1, 0) of content of interest B. In this way, after the display update process, contents F and G are respectively displayed at the display positions (2, 1) and (1, 2).

Figure 10A:
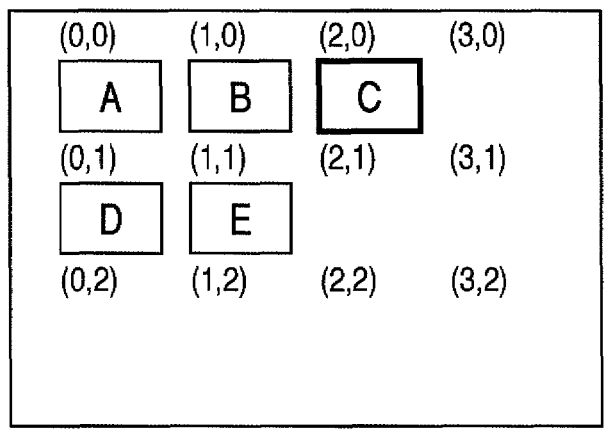
FIGS. 10A to 10C show display examples when contents are added on the contents list display screen according to the first embodiment.
Figure 10B:
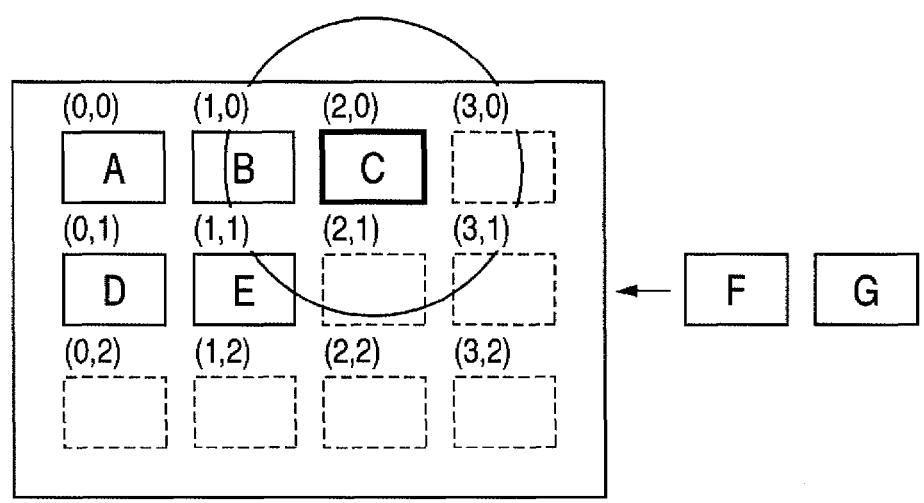
Figure 10C:
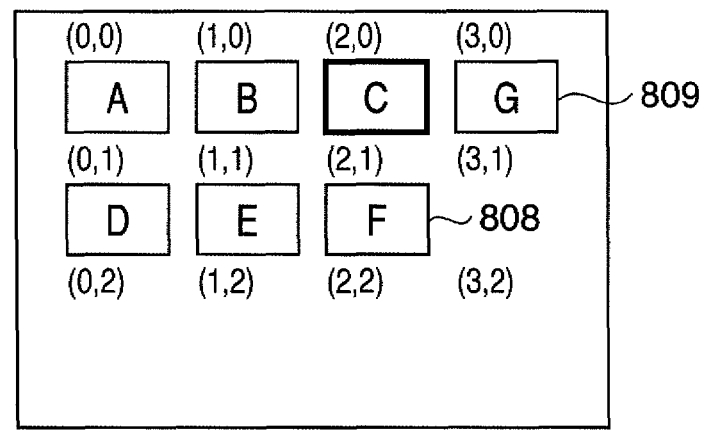

An example of the display update process upon adding contents will be further described with reference to FIGS. 10A to 10C. FIGS. 10A to 10C show an example of the screen update process in the first embodiment. Referring to FIGS. 10A to 10C, a content in which the user currently has an interest is content C. Assume that when contents A to E are displayed in a list, as shown in FIG. 10A, contents F and G are added by external events, as shown in FIG. 10B. In the first embodiment, as a result of the same process as described above, content F is displayed on a display area 808 at a display position (2, 1), and content G is displayed on a display area 809 at a display position (3, 0), as shown in FIG. 10C. Hence, as shown in FIG. 10C, the display is updated so that the displays of remaining contents get together around the display position of content of interest C.

As described above, according to the first embodiment, even when external events such as deletion and addition of contents have occurred, the display of a content in which the user has an interest is never updated. Hence, even when some contents are cleared by external events and the contents list is updated, the user can smoothly continue manipulations without any confusion. Since contents other than the content of interest are displayed together around the content of interest, the list display which is easy to display for the user can be provided even upon manipulating on a large screen.

Since the state of a content in which the user has an interest remains unchanged to an external event such as addition or deletion of contents, the user can smoothly continue manipulations. Furthermore, when the number of contents becomes small on a large screen, other contents get together around the content of interest of the user, thus improving operability.

Second Embodiment

The second embodiment will be described hereinafter. In the second embodiment, as in the first embodiment, when a vacant display position is generated due to deletion of a content, the display is updated so that other contents are displayed together around the content of interest without changing the display position of the content of interest.

FIG. 11 is a view for explaining a display area of a content according to the second embodiment. Referring to FIG. 11, a display screen 1101 indicates a region where displayable positions of respective contents exist. As in the first embodiment, the display screen 1101 has a maximum value Imax in an x-axis direction 1103 and a maximum value Jmax in a y-axis direction 1104, and contents can be displayed in a matrix pattern. In the second embodiment, contents are sorted under a predetermined sort condition such as date or the like, and are displayed in turn from the upper left corner of the screen in the x-axis direction and from the top to the bottom on the screen. For example, when there are 12 display positions on the screen, as shown in FIGS. 13A to 13C, displays of pieces of sorted content information are allocated in the order of display positions (1) to (12). Note that a content 1102 in FIG. 11 indicates the display position of a content sorted to the k-th position.

Figure 12:
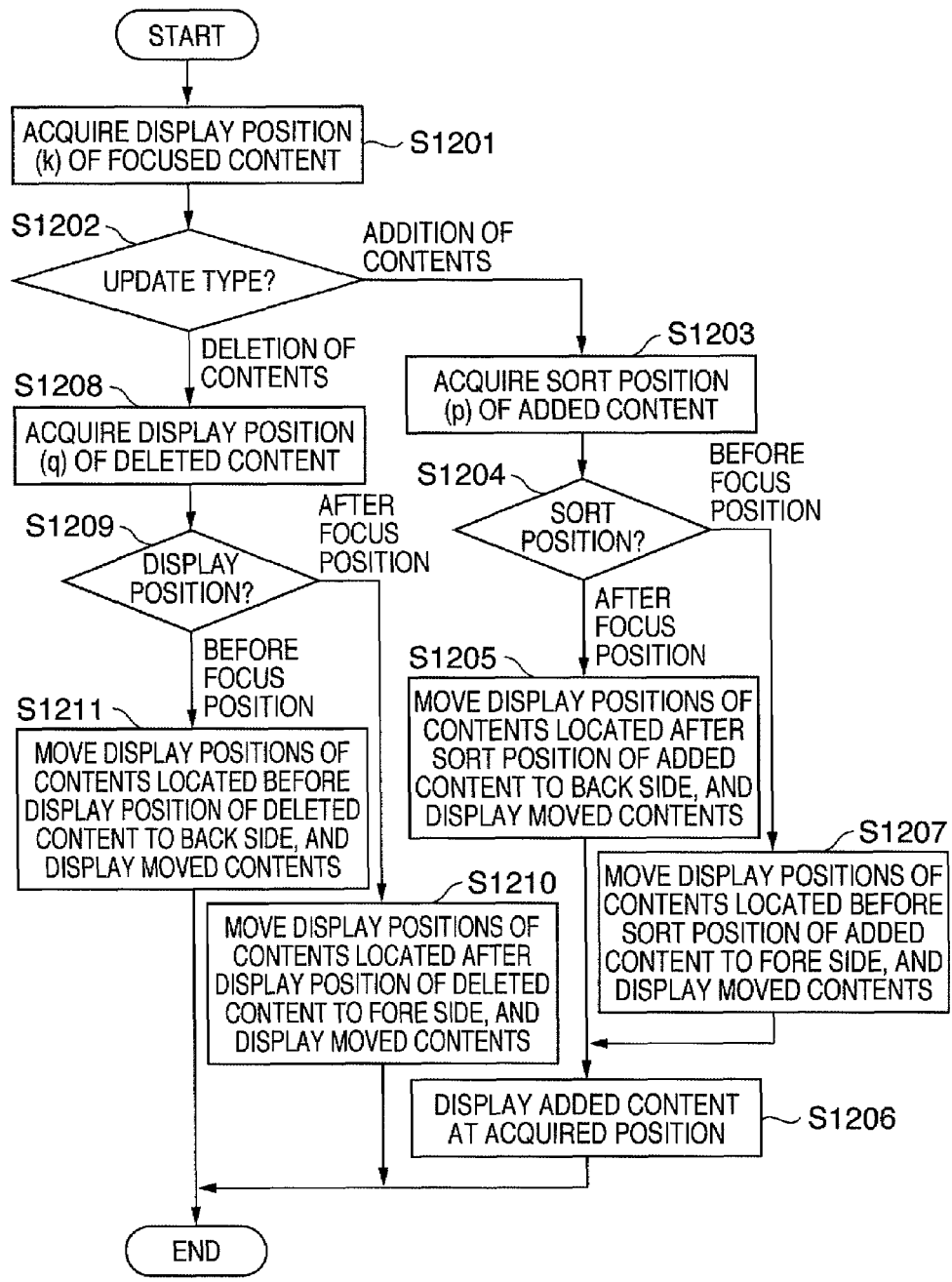
FIG. 12 is a flowchart showing an update process of a contents list display according to the second embodiment.

FIG. 12 is a flowchart showing the contents list display update process (S404 in FIG. 4) according to the second embodiment.

In step S1201, a content of interest recognition unit 303 acquires the display position (k) of a content of interest. In step S1202, the type of external update event is checked. If the update event is associated with addition of a content, the process advances to step S1203. In step S1203, a contents sorting unit 305 acquires a sort position (p) of an added content according to a sort condition held by a sort rule holding unit 304. A contents list display unit 302 checks in step S1204 if the sort position (p) acquired in step S1203 is located before or after the sort position of the content of interest.

If the sort position (p) is located after that of the content of interest, the process advances from step S1204 to step S1205. In step S1205, the contents list display unit 302 updates the display by shifting, one by one, the display positions of contents located after the sort position (p) of the added content to the back side, thus setting a display position corresponding to the sort position (p) in a vacant state. On the other hand, if the sort position (p) is located before that of the content of interest, the process advances from step S1204 to step S1207. In step S1207, the contents list display unit 302 updates the display by shifting, one by one, the display positions of contents located before the sort position (p) of the added content to the fore side, thus setting a display position corresponding to the sort position (p) in a vacant state. In step S1206, the contents list display unit 302 displays the added content at the vacant display position generated by the process in step S1205 or S1207.

If it is determined in step S1202 that the type of update event is associated with deletion of a content, the process advances to step S1208. In step S1208, the contents list display unit 302 acquires the display position (q) of a deleted content. The contents list display unit 302 checks in step S1209 if the display position (q) acquired in step S1208 is located before or after the display position (k) of the content of interest.

If the display position (q) of the deleted content is located after the display position (k) of the focused content, the process advances from step S1209 to step S1210. In step S1210, the contents list display unit 302 updates the display by shifting, one by one, the display positions of contents located after the display position (q) of the deleted content to the fore side. On the other hand, if the display position (q) of the deleted content is located before the display position (k) of the focused content, the process advances from step S1209 to step S1211. In step S1211, the contents list display unit 302 updates the display by shifting, one by one, the display positions of contents located before the display position (q) of the deleted content to the back side.

FIGS. 13A to 13C show an example of the screen update process when contents are deleted according to the second embodiment. As shown in FIG. 13A, contents A to L are displayed at respective display positions. In FIG. 13A, sort positions are (1) to (12) in the order of contents A to L, and contents A to L are respectively displayed at display positions (1) to (12). A content in which the user currently has an interest is C.

When contents B, D, and E are deleted by external events, vacant areas 1301, 1303, and 1302 are formed, as shown in FIG. 13B. In the second embodiment, according to the process (S1208 to S1211) described with reference to FIG. 12, the vacant areas are filled by moving over other contents toward the display position of content of interest C, as shown in FIG. 13C. That is, the display is updated so that other contents get together around content of interest C.

Figure 14C:
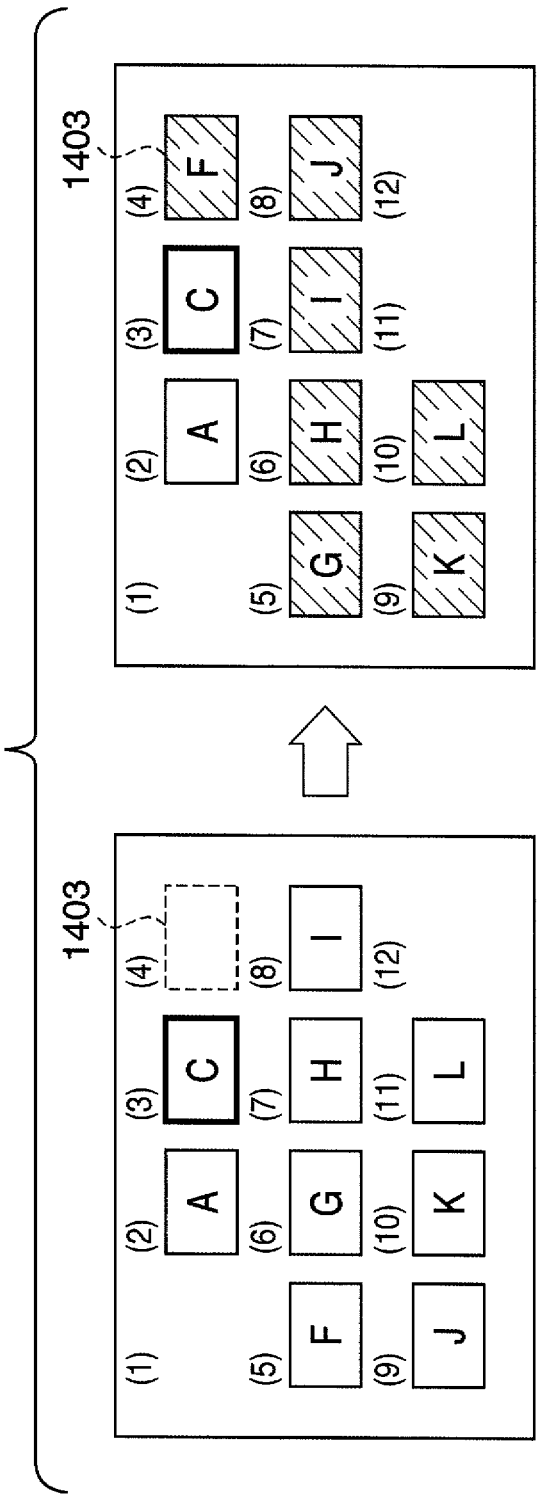

This display update process will be described in detail below with reference to FIGS. 14A to 14C. FIGS. 14A to 14C show, step by step, the contents list display update process executed when contents B, D, and F are deleted in the order of B→D→F, for the sake of easy understanding.

The display update process in FIG. 14A will be described below. FIG. 14A shows the display update process when content B is deleted. Upon deletion of content B, the contents list display update process (step S404 in FIG. 4) is called, and the process shown in FIG. 12 starts. The content of interest recognition unit 303 acquires the display position (k=3) of the focused content (S1201). Since the type of external update event is associated with deletion of a content, the process advances from step S1202 to step S1208. In step S1208, the contents list display unit 302 acquires the display position (q=2 in this example) of deleted content B, and compares k and q (step S1209). Since the display position (q=2) of deleted content B is located before the display position (k=3) of content of interest C (q<k), the contents list display unit 302 updates the display by shifting the display position of content A located before that of the deleted content to the back side (the right view of FIG. 14A).

The display update process in FIG. 14B will be described below. FIG. 14B shows the display update process when content D is deleted. Upon deletion of content D, the contents list display update process shown in FIG. 12 is executed, as described above. In case of FIG. 14B, the display position (q=4) of deleted content D is located after the display position (k=3) of content of interest C (q>k). Therefore, the contents list display unit 302 updates the display by shifting, one by one, the display positions of contents E to L located after deleted content D to the fore side. As a result, contents are displayed, as shown in the right view of FIG. 14B.

The display update process in FIG. 14C will be described below. FIG. 14C shows the display update process when content E is deleted. Upon deletion of content E, the contents list display update process shown in FIG. 12 is executed, as described above. In case of FIG. 14C, the display position (q=4) of deleted content E is located after the display position (k=3) of content of interest C (q>k). Therefore, the contents list display unit 302 updates the display by shifting, one by one, the display positions of contents F to L located after deleted content E to the fore side. As a result, contents are displayed, as shown in the right view of FIG. 14C.

According to the second embodiment, when contents are updated by external events, the display state of the content of interest remains unchanged, and other contents are re-sorted according to the sort rule and are displayed together around the content of interest. For this reason, the user can smoothly continue manipulations.

Figure 15A:
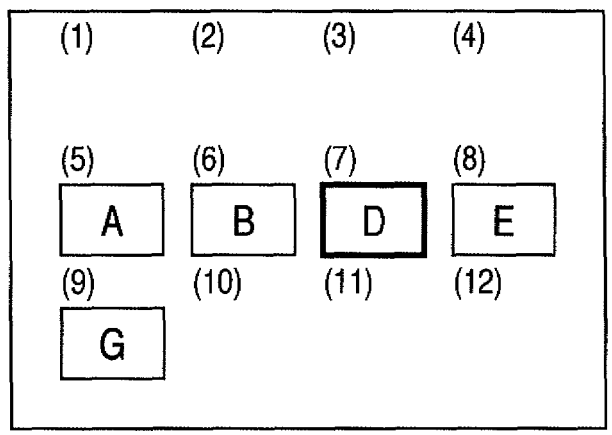
FIGS. 15A to 15C show display examples when contents are added on the contents list display screen according to the second embodiment.
Figure 15B:
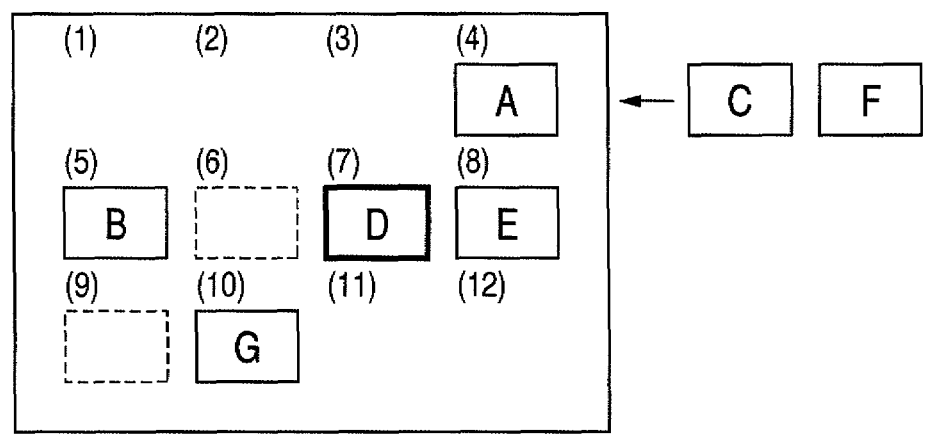
Figure 15C:
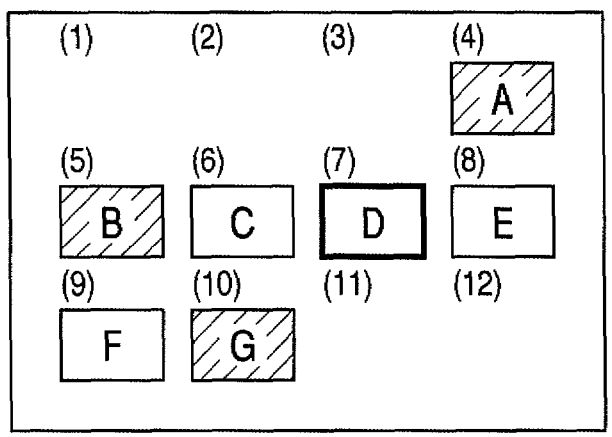

FIGS. 15A to 15C show an example of the screen update process upon adding contents. Assume that contents A to G are displayed at display positions (5) to (9), as shown in FIG. 15A. Also, a content in which the user currently has an interest is content D.

Assume that contents C and F are added by external events. The sort positions of contents C and D by the contents sorting unit 305 are given as A→B→C→D→E→F→G according to the sort condition held by the sort rule holding unit 304. Therefore, as shown in FIG. 15B, the contents list display unit 302 moves contents B and A to the fore side to set the display position (6) as a vacant display position, so as to display content C at the display position (6). Likewise, as shown in FIG. 15B, the contents list display unit 302 moves content G to the back side to set the display position (9) as a vacant display position, so as to display content F at the display position (9). After that, the contents list display unit 302 displays contents C and F at the display positions (6) and (9), thus obtaining the display shown in FIG. 15C. In this manner, when contents are added or deleted, the display is updated so as not to influence the display of content of interest D. The display update process upon addition of contents C and F will be described below under the assumption that contents are added in the order of C→F for the sake of easy understanding.

When content C is added, the contents list display update process (FIG. 12) is called in step S404 of FIG. 4. In the contents list display update process, the contents list display unit 302 acquires the display position (k=7) of the content of interest (S1201). Since the type of external update event is associated with addition of a content, the process advances from step S1202 to step S1203. The contents sorting unit 305 sorts currently displayed contents A, B, D, E, and G, and added content C according to the sort condition held by the sort rule holding unit 304 to obtain a sort position of added content C. As described above, since contents are sorted in the order of A→B→C→D→E→G, the sort position of the added content is (p=3). The contents list display unit 302 determines the display position of the added content so as to keep the relative positional relationship between the sort positions of the content of interest and added content. In case of content C, since the display position of content of interest D is (k=7), that of added content C is (6). Since the display position (6) of added content C is located before the display position (7) of content D, the contents list display unit 302 shifts the display positions of contents A and B located before the sort position of the added content one by one to the fore side, thus setting the display position (6) in a vacant state. Then, the contents list display unit 302 displays added content C at the display position (6), thus terminating the display update process about added content C.

When content F is added, the contents list display update process (FIG. 12) is called in the same as in the above case. In the contents list display update process, the contents list display unit 302 acquires the display position (k=7) of the content of interest (S1201) Since the type of external update event is associated with addition of a content, the process advances from step S1202 to step S1203. The contents sorting unit 305 sorts currently displayed contents A, B, C, D, E, and G, and added content F according to the sort condition held by the sort rule holding unit 304 to obtain a sort position of added content F. As described above, since contents are sorted in the order of A→B→C→D→E→F→G, the sort position of the added content is (p=6). The contents list display unit 302 determines the display position of the added content so as to keep the relative positional relationship between the sort positions of the content of interest and added content. In case of content F, since the display position of content of interest D is (k=7), that of added content F is (9). Since the display position (9) of added content F is located after the display position (7) of content D, the contents list display unit 302 shifts the display position of content G located after the sort position of added content F by one to the back side, thus setting the display position (9) in a vacant state. Then, the contents list display unit 302 displays added content F at the display position (9), thus terminating the display update process about added content F.

As described above, according to the second embodiment, when contents are updated by external events, contents are displayed around the content of interest while they ate re-sorted according to the sort rule. Hence, the user can smoothly continue manipulations. Also, since the state of a content in which the user has an interest remains unchanged to an external event such as addition or deletion of contents, the user can smoothly continue manipulations.

As described above, according to the first and second embodiments, even when contents are added or deleted by external events, the display associated with the content of interest is never updated (that is, the interest state and display position are kept). For this reason, even when the contents list display is updated due to addition or deletion of contents, the user can smoothly continue manipulations without any confusion.

In each of the above embodiments, display update requests to the output control may be issued together after the display positions of all contents are determined in all display update processes. A plurality of update processes based on external events may be notified together by combining them as a list structure. When a content to be added and that to be deleted are sorted side by side, a plurality of contents may be processed together as one group. Also, the user may have an interest in one or a plurality of contents.

Third Embodiment

The third embodiment will be described hereinafter. The first and second embodiments have not particularly explained processes executed when a content of interest is not deleted. The third embodiment will explain a case in which a content of interest is deleted by a content deletion event.

That is, the third embodiment can prevent the user from missing a position of interest and can keep continuity of processes by the user when an entity of a content corresponding to the content of interest becomes unreferable in a content list in which contents are sorted and displayed in a predetermined order. Note that the arrangement of an information processing system including a content list apparatus according to the third embodiment is the same as that of the first embodiment (FIG. 1). Also, the hardware arrangement of a content list apparatus 101 and storage apparatus 102 is the same as that of the first embodiment (FIG. 2).

Figure 16:
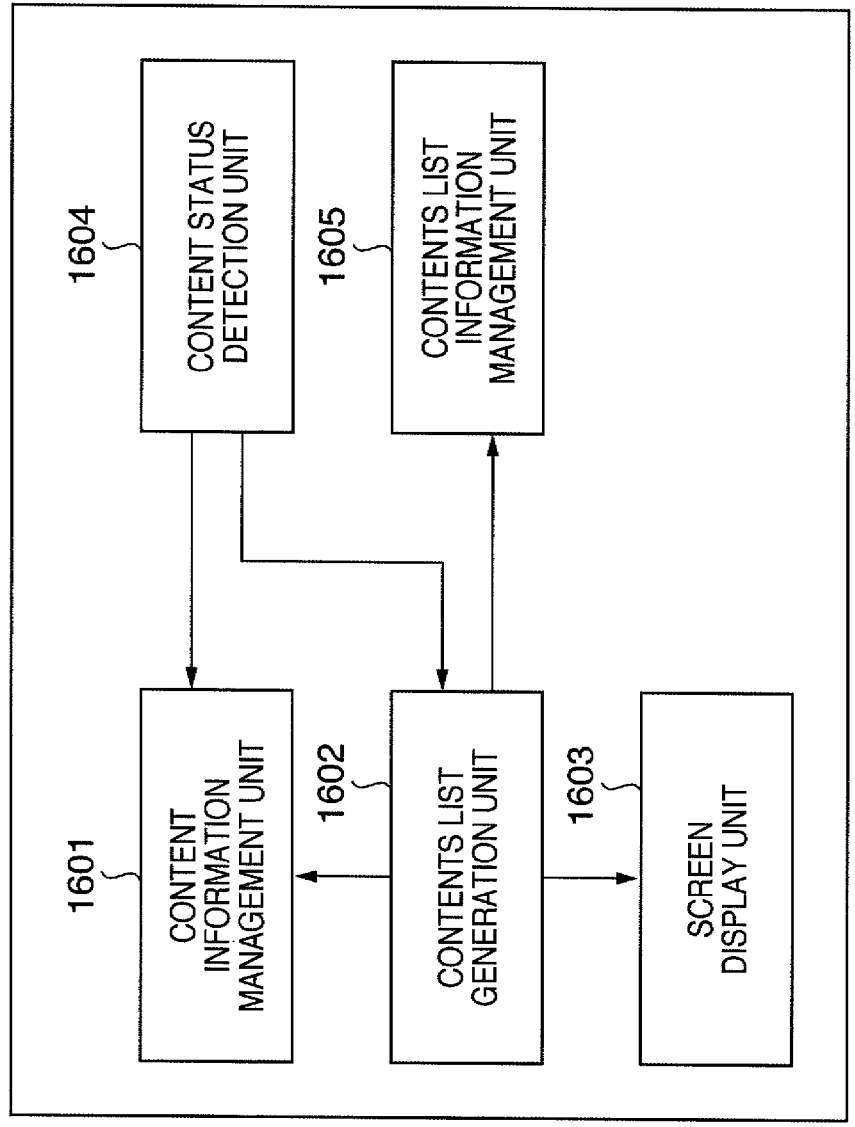
FIG. 16 is an exemplary block diagram showing the functional arrangement associated with a contents list display process according to the third embodiment.

FIG. 16 is an exemplary block diagram showing the functional arrangement of the content list apparatus 101 according to the third embodiment. Referring to FIG. 16, a content information management unit 1601 holds pieces of reference information for all contents on a network. The content information management unit 1601 acquires meta information, an entity, a thumbnail, and the like of a content from the storage apparatus 102 via a network I/F 207 in response to a request from another module. A contents list generation unit 1602 determines information of a content to be displayed and its position on a display device of an output device 208. A screen display unit 1603 executes a rendering process of rendering data on a rendering RAM of the output device 208. A content status detection unit 1604 receives deletion/movement notifications of contents, a termination notification, and the like from the storage apparatus 102 via the network I/F 207. The content status detection unit 1604 notifies the contents list generation unit 1602 of the received information, and instructs the contents list generation unit 1602 to update a contents list. A contents list information management unit 1605 saves information required to configure the contents list in a storage device 205 or reads out such information from the storage device 205. Note that the information required to configure the contents list (to be simply referred to as contents list information hereinafter) includes sort conditions of a contents list, and the displayed position and meta information of a content of interest.

Figure 17:
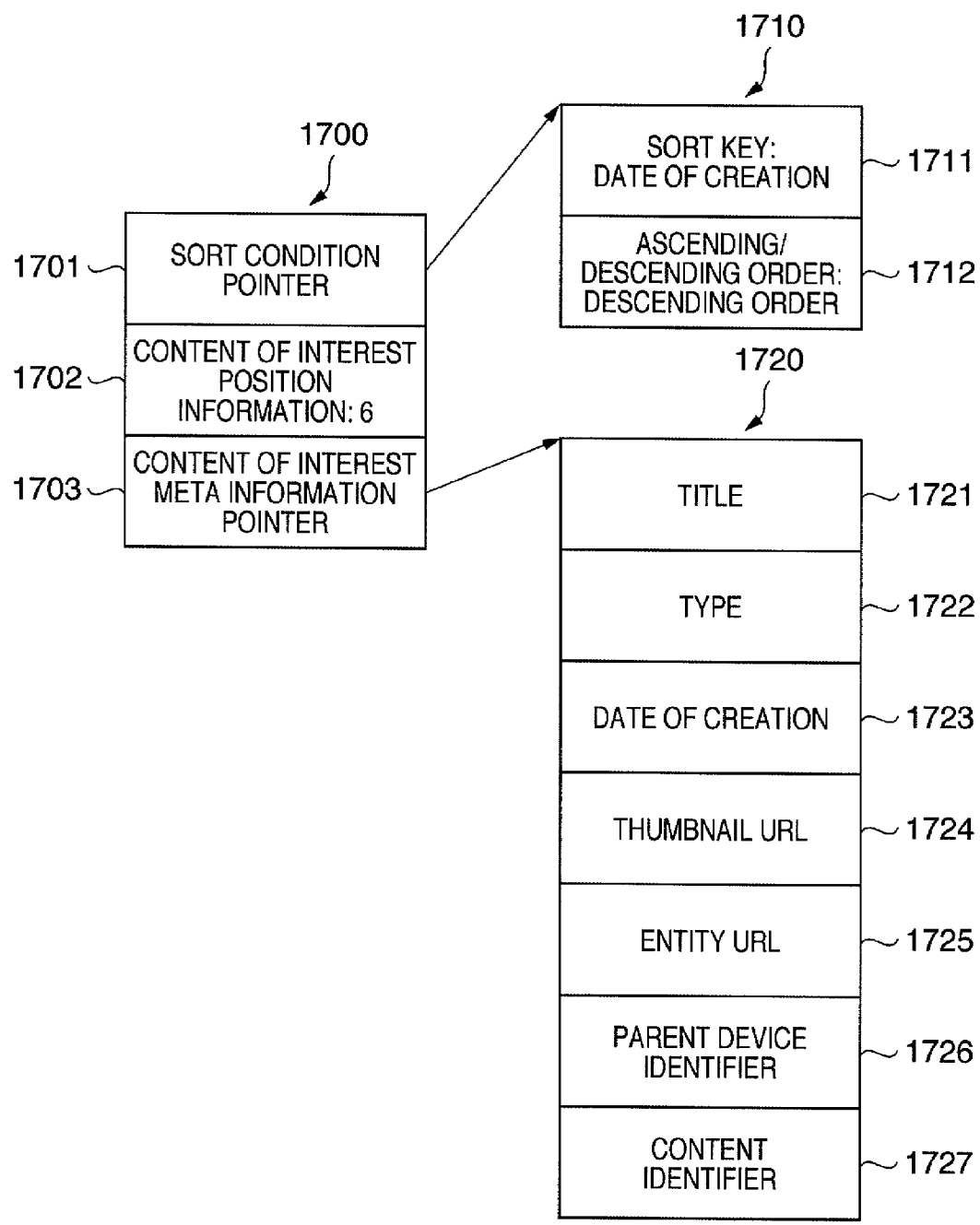
FIG. 17 shows an example of the data structure of contents list information according to the third embodiment.

FIG. 17 shows an example of the data structure of the contents list information according to the third embodiment. Referring to FIG. 17, reference numeral 1700 denotes the overall data structure of the contents list information. A sort condition pointer 1701 is a pointer which points to a sort condition 1710 of contents in the contents list. Content of interest position information 1702 indicates the displayed position of a content of interest. In the example of FIG. 17, the displayed position of the content of interest is "6". A content of interest meta information pointer 1703 is a pointer to meta information 1720 of the content of interest. The sort condition 1710 indicates a sort condition of contents in the contents list, and has a data structure including a sort key 1711 and ascending/descending order information 1712. The sort key 1711 indicates a key of sorting the contents list, that is, a criterion used to determine the sort order. In this example, the sort key is a date of creation of each content. The ascending/descending order information 1712 indicates an ascending or descending order as the sort order. In this example, the ascending/descending order information 1712 is "descending order". That is, the sort condition 1710 having the data structure exemplified in FIG. 17 is to "sort contents in descending order using the date of creation as the key". Note that the sort condition 1710 corresponds to the contents sort rule of the second embodiment. In this sense, the contents list information management unit 1605 includes the sort rule holding unit 304 of the second embodiment.

The meta information 1720 is that of a content corresponding to the content of interest, and has a data structure shown in FIG. 17. A title field 1721 holds a tile of the content of interest. A type field 1722 holds the type of content corresponding to the content of interest. A date of creation field 1723 holds the date of creation of a content corresponding to the content of interest. A thumbnail URL field 1724 holds the URL of a thumbnail of a content corresponding to the content of interest. An entity URL field 1725 holds the URL of an entity of a content corresponding to the content of interest. A parent device identifier field 1726 holds an identifier of a device which holds the entity of a content corresponding to the content of interest. A content identifier field 1727 holds an identifier of a content corresponding to the content of interest. The contents list information 1700 including these pieces of information is held in the storage device 205 and is updated as needed.

Figure 18:
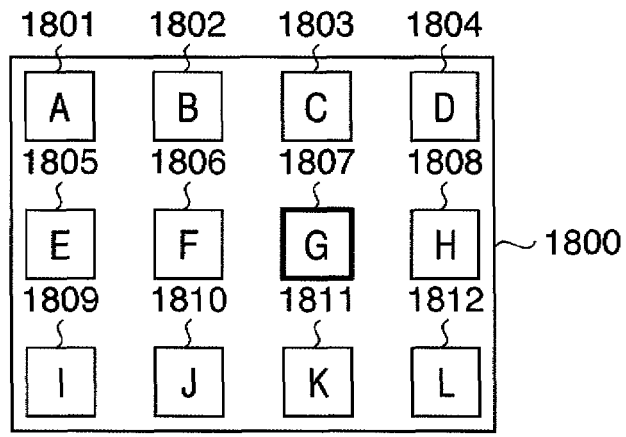
FIG. 18 shows a display example of a contents list according to the third embodiment.

FIG. 18 shows an example of the contents list according to the third embodiment. The contents list according to the third embodiment is displayed on the display device of the output device 208. Referring to FIG. 18, reference numeral 1800 denotes a whole contents list display region. Reference numerals 1801 to 1812 respectively denote display positions (i.e., display areas) of each piece of individual content information, that is, thumbnails of contents corresponding to respective pieces of content information in this example. The pieces of content information (thumbnails) of contents A to L are displayed at the display positions 1801 to 1812. As shown in FIG. 18, the respective pieces of content information are displayed at the predetermined display positions 1801 to 1812 in the display region in turn in accordance with the order of the contents list. The respective pieces of content information are allocated in turn from the first display position, that is, the display position 1801 where content A is allocated. When there is no content information corresponding to a certain display position, that display position is displayed as a vacant space. Content G at the display position 1807 is displayed with an outer frame unlike other pieces of content information on the display region, so as to indicate that content G is the content of interest. Assume that the display region must include one and only one content of interest G, as shown in FIG. 18. However, if there is no content whose content information is to be displayed, no content of interest exists.

Figure 19:
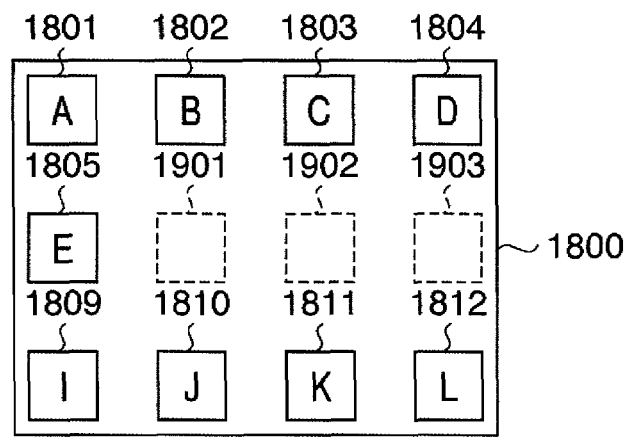
FIG. 19 is a view showing unreferable contents in a vacant state in the third embodiment.

FIG. 19 shows an example of the contents list upon receiving, from an external apparatus (storage apparatus 102), a notification indicating that a content becomes unreferable. FIG. 19 indicates which content information in FIG. 18 becomes unreferable. FIG. 19 shows a state in which contents F, G, and H displayed at the display positions 1806 to 1808 in FIG. 18 are deleted. Upon reception of a notification indicating that contents F, G, and H become unreferable due to external events such as deletion of contents or the like by another user from the external apparatus, the display areas where pieces of content information corresponding to these contents were displayed so far become vacant areas 1901 to 1903 where no contents are displayed. In FIG. 19, since content of interest G becomes unreferable, no content of interest exists.

Figure 20:
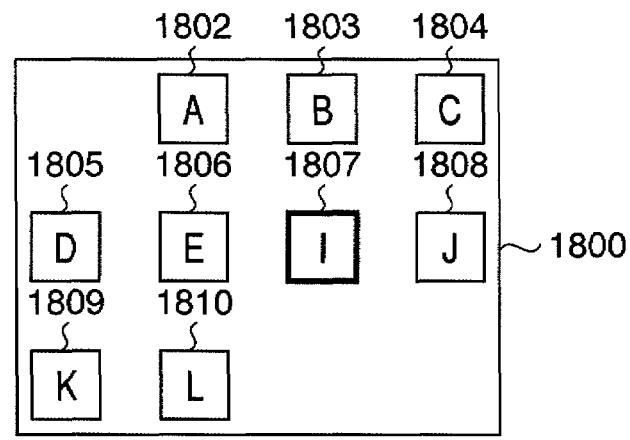
FIG. 20 is a view for explaining a list display update process in the contents list display process according to the third embodiment.

FIG. 20 shows an example of the display updated since contents become unreferable due to external events, as shown in FIG. 19, in the contents list display according to the third embodiment. FIG. 20 shows a display state after application of the display update process of this embodiment when some contents become unreferable, as shown in FIG. 19, from the display state shown in FIG. 18. Referring to FIG. 20, reference numeral 1800 denotes a full contents list display region. At the display position 1807, content I as a new content of interest is displayed. Since a content corresponding to content of interest G in FIG. 18 becomes unreferable, next content I, the entity of which is referable, in the order of the contents list is moved to the display position 1807 of the content of interest in FIG. 18. In FIG. 20, pieces of referable contents information before and after content of interest I are reallocated at the display positions 1802 to 1806 and 1808 to 1810 to have the display position 1807 of new content of interest I as an origin.

Figure 21:
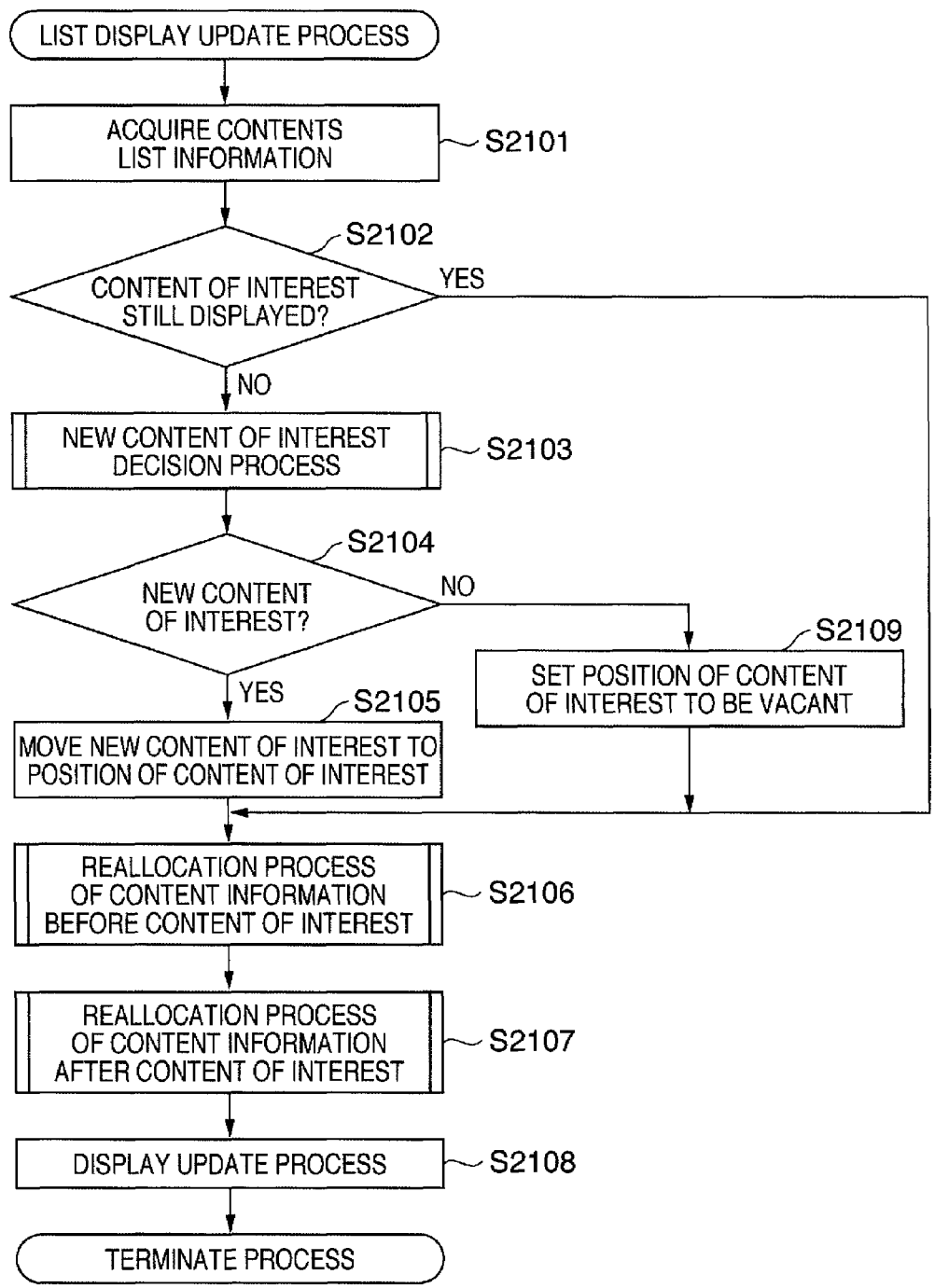
FIG. 21 is a flowchart showing the sequence of the list display update process according to the third embodiment.

FIG. 21 is a flowchart showing the list display update process according to the third embodiment. The contents list generation unit 1602 executes this process according to a contents list update instruction from the content status detection unit 1604. In step S2101, the contents list generation unit 1602 acquires from the contents list information management unit 1605 the contents list information 1700 held in the storage device 205. The contents list generation unit 1602 checks in step S2102 if a content of interest exists. More specifically, the contents list generation unit 1602 acquires the content identifier 1727 corresponding to the content of interest from the contents list information 1700 acquired in step S2101. Then, the contents list generation unit 1602 inquires the content information management unit 1601 based on the identifier as to whether or not a content of interest exists, thus determining the presence/absence of a content of interest.

If it is determined in step S2102 that no content of interest exists, the contents list generation unit 1602 determines a new content of interest in step S2103. The new content of interest determination process in step S2103 will be described later with reference to FIG. 22. The contents list generation unit 1602 checks in step S2104 if a new content of interest can be determined in step S2103. If the new content of interest is determined, that is, if the new content of interest exists, the process advances to step S2105. In step S2105, the contents list generation unit 1602 allocates the new content of interest at a position designated by the content of interest position information 1702 included in the contents list information 1700 acquired in step S2101. If it is determined in step S2104 that no new content of interest exists, the contents list generation unit 1602 makes the content of interest position information 1702 blank.

In step S2106, the contents list generation unit 1602 executes a reallocation process of content information located before the content of interest in the order of the contents list. Likewise, in step S2107 the contents list generation unit 1602 executes a reallocation process of content information located after the content of interest. The reallocation processes in steps S2106 and S2107 will be described later with reference to FIGS. 23 and 24.

The contents list generation unit 1602 then instructs the screen display unit 1603 to update the screen display based on the allocation obtained by the aforementioned processes, thus terminating this process. If it is determined in step S2102 that a content of interest exists, the process jumps from step S2102 to step S2106, and no new content of interest is determined.

Figure 22:
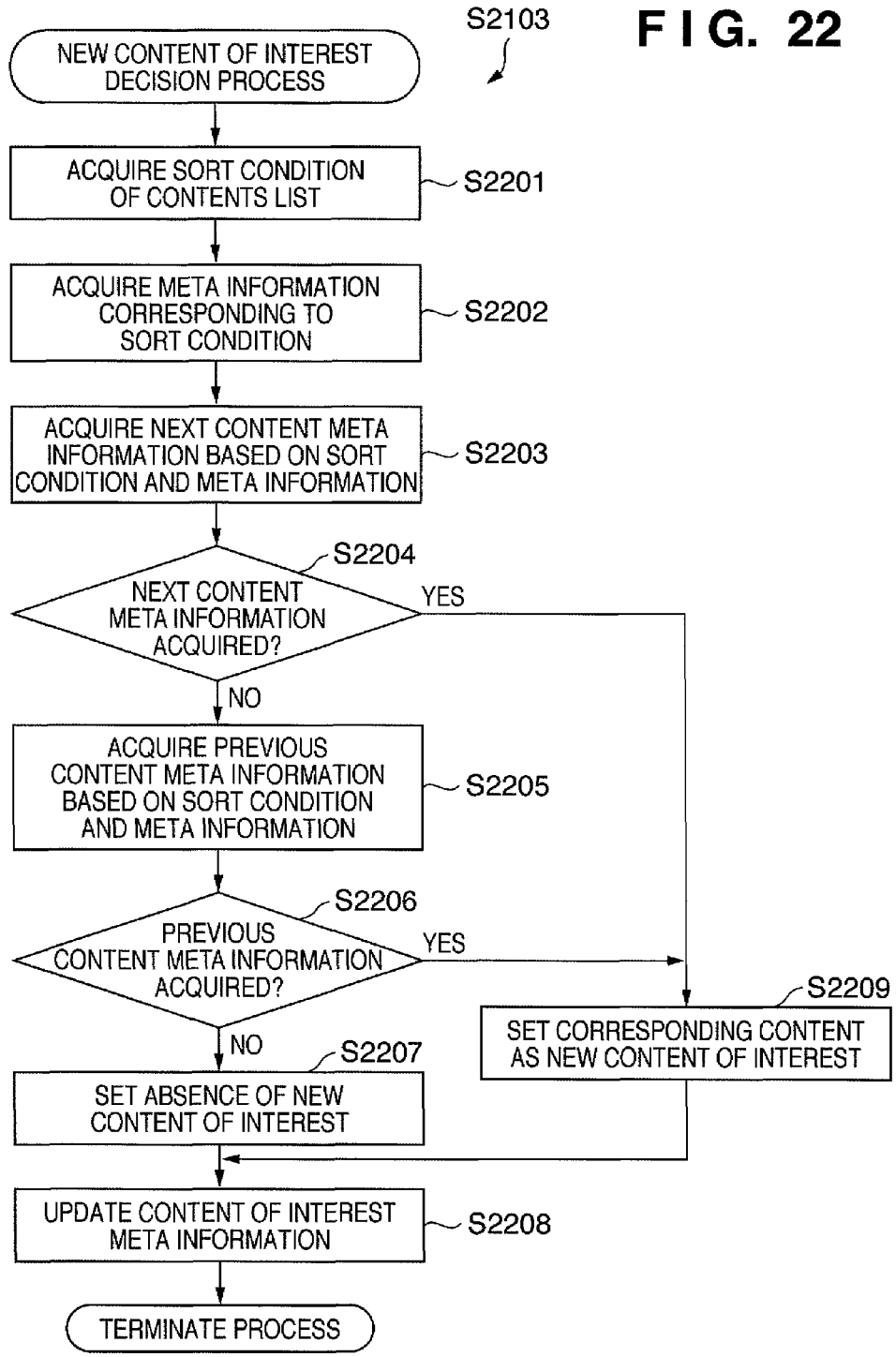
FIG. 22 is a flowchart showing a determination process of a new content of interest in a contents list apparatus according to the third embodiment.

The new content of interest determination process in step S2103 will be described below. FIG. 22 is a flowchart showing the new content of interest determination process in the contents list apparatus of the third embodiment.

In step S2201, the contents list generation unit 1602 acquires the sort condition 1710 of the contents list from the contents list information 1700 acquired in step S2101. In step S2202, the contents list generation unit 1602 acquires meta information of a content of interest corresponding to the sort key 1711 in the sort condition 1710 acquired in step S2201. In this example, since the sort key 1711 is a date of creation, the date of creation 1723 of a content as the corresponding meta information is acquired. In step S2203, the contents list generation unit 1602 acquires meta information of a content at the next turn based on the sort condition and meta information acquired in steps S2201 and S2202. More specifically, the contents list generation unit 1602 passes the acquired sort condition and meta information to the content information management unit 1601, and acquires meta information of a content next to the content of interest from the content information management unit 1601.

In the example of FIG. 17, the content information management unit 1601 receives the sort condition indicating the descending order based on the date of creation. Therefore, contents on the network are searched for a content having the date of creation next to that of the content of interest, and the meta information of the found content is returned to the content information management unit 1601.

The contents list generation unit 1602 checks in step S2204 if the meta information of the next content can be acquired as a result of the aforementioned process. This process is equivalent to seeing if a referable content after the content of interest in the order of the contents list is available.

As a result of checking, if the meta information of the next content cannot be acquired, that is, if no referable content after the content of interest in the order of the contents list is available, the process advances to step S2205. In step S2205, the contents list generation unit 1602 acquires meta information of a content before the content of interest in the order of the contents list based on the sort condition and the meta information of the content of interest acquired in steps S2201 and S2202. The contents list generation unit 1602 checks in step S2206 if meta information of a content before the content of interest can be acquired in step S2205. This process is equivalent to seeing if a referable content before the content of interest in the order of the contents list is available.

As a result of checking in step S2206, if no meta information can be acquired, the process advances to step S2207. In step S2207, the contents list generation unit 1602 sets the absence of a new content of interest as the result of this process. In step S2208, the contents list generation unit 1602 instructs the contents list information management unit 1605 to update the meta information 1720 of the content of interest held in the storage device 205, thus terminating this process. On the other hand, if the meta information of a content can be acquired in step S2204 or S2206, this means that a referable content after or before the content of interest in the order of the contents list is available. In this case, the process advances to step S2209, and the contents list generation unit 1602 sets a content corresponding to the acquired meta information as a new content of interest, thus terminating this process.

As described above, in this embodiment, a content closest to the content of interest before deletion in the sorted order according to the sort condition, of the remaining ones except for the deleted content of a plurality of contents, is set as a new content of interest. Upon completion of the new content of interest determination process shown in FIG. 22, the process advances to step S2104 in FIG. 21.

Figure 23:
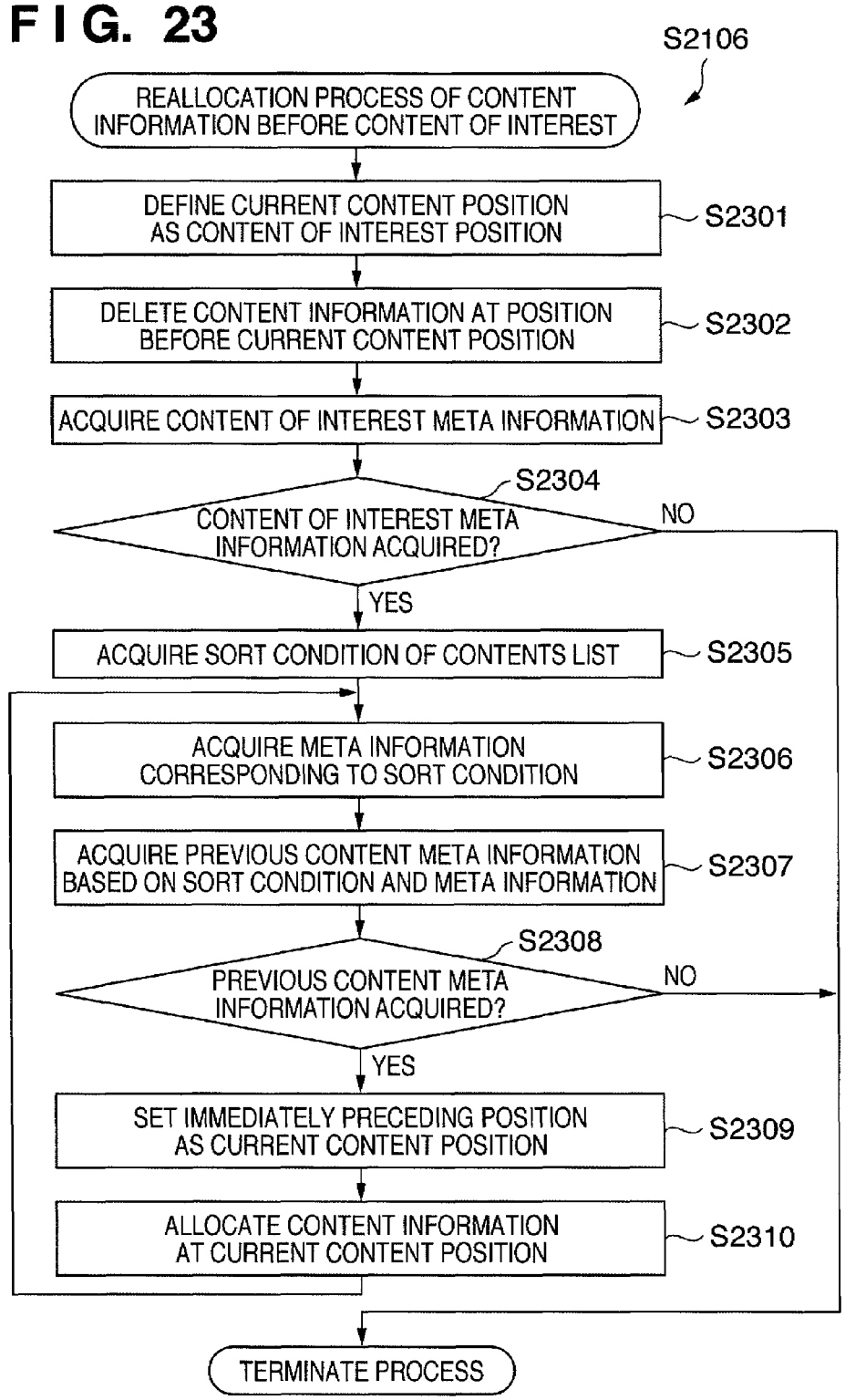
FIG. 23 is a flowchart showing a reallocation process of content information before a content of interest according to the third embodiment.

The reallocation process of content information before the content of interest in step S2106 will be described below. FIG. 23 is a flowchart showing the reallocation process of content information before the content of interest.

In step S2301, the contents list generation unit 1602 acquires the content of interest position information 1702 indicating the displayed position of the content of interest from the contents list information management unit 1605, and sets this position as the current content position. In the example of FIG. 17, the current content position is "6" to have "0" as an origin (the display position 1807 in FIG. 18). In step S2302, the contents list generation unit 1602 deletes all pieces of content information allocated at positions before the current content position in the order of the contents list. In this embodiment, since thumbnails are allocated at respective content positions, as shown in FIG. 18, all thumbnails other than that at the current content position are deleted.

In step S2303, the contents list generation unit 1602 acquires the meta information 1720 of the content of interest from the contents list information management unit 1605. The contents list generation unit 1602 checks in step S2304 if the meta information can be acquired in step S2303. This process is equivalent to checking if a content of interest exists.

If it is determined in step S2304 that no meta information can be acquired, that is, if no content of interest exists, this process terminates.

If it is determined in step S2304 that the meta information can be acquired, that is, if a content of interest exists, the process advances to step S2305. In step S2305, the contents list generation unit 1602 acquires the sort condition 1710 of the contents list from the contents list information management unit 1605. In step S2306, the contents list generation unit 1602 acquires meta information corresponding to the sort key 1711 of a content corresponding to the current content position. In the example of FIG. 17, the date of creation 1723 of the content as the meta information corresponding to the date of creation as the sort key 1711 is acquired. In step S2307, the contents list generation unit 1602 acquires meta information of a content sorted before the content at the current content position based on the sort condition and meta information acquired in steps S2305 and S2306. More specifically, the contents list generation unit 1602 passes the sort condition and meta information to the content information management unit 1601, and acquires the meta information of the content sorted before the content at the current content position from the content information management unit 1601. In the example of FIG. 17, the sort condition is the descending order based on the date of creation. Therefore, the content information management unit 1601 searches contents on the network for a content having the date of creation before that of the content at the current position, and sends obtained meta information to the contents list generation unit 1602.

The contents list generation unit 1602 checks in step S2308 if the meta information can be acquired in step S2307. This process is equivalent to checking if a referable content exists before the designated content (that at the current position) in the order of the contents list.

If no meta information is acquired in step S2307, that is, if no referable content exists before the designated content in the order of the contents list, this process terminates from step S2308. On the other hand, if the meta information can be acquired in step S2307, that is, a referable content exists before the designated content in the order of the contents list, the process advances to step S2309. In step S2309, the contents list generation unit 1602 sets an immediately preceding position as the current content position. In step S2310, the contents list generation unit 1602 acquires content information (thumbnail in this example) from the meta information of the content, and allocates it at the current content position. After that, the process returns to step S2306 to repeat the processes in steps S2306 to S2310.

Figure 24:
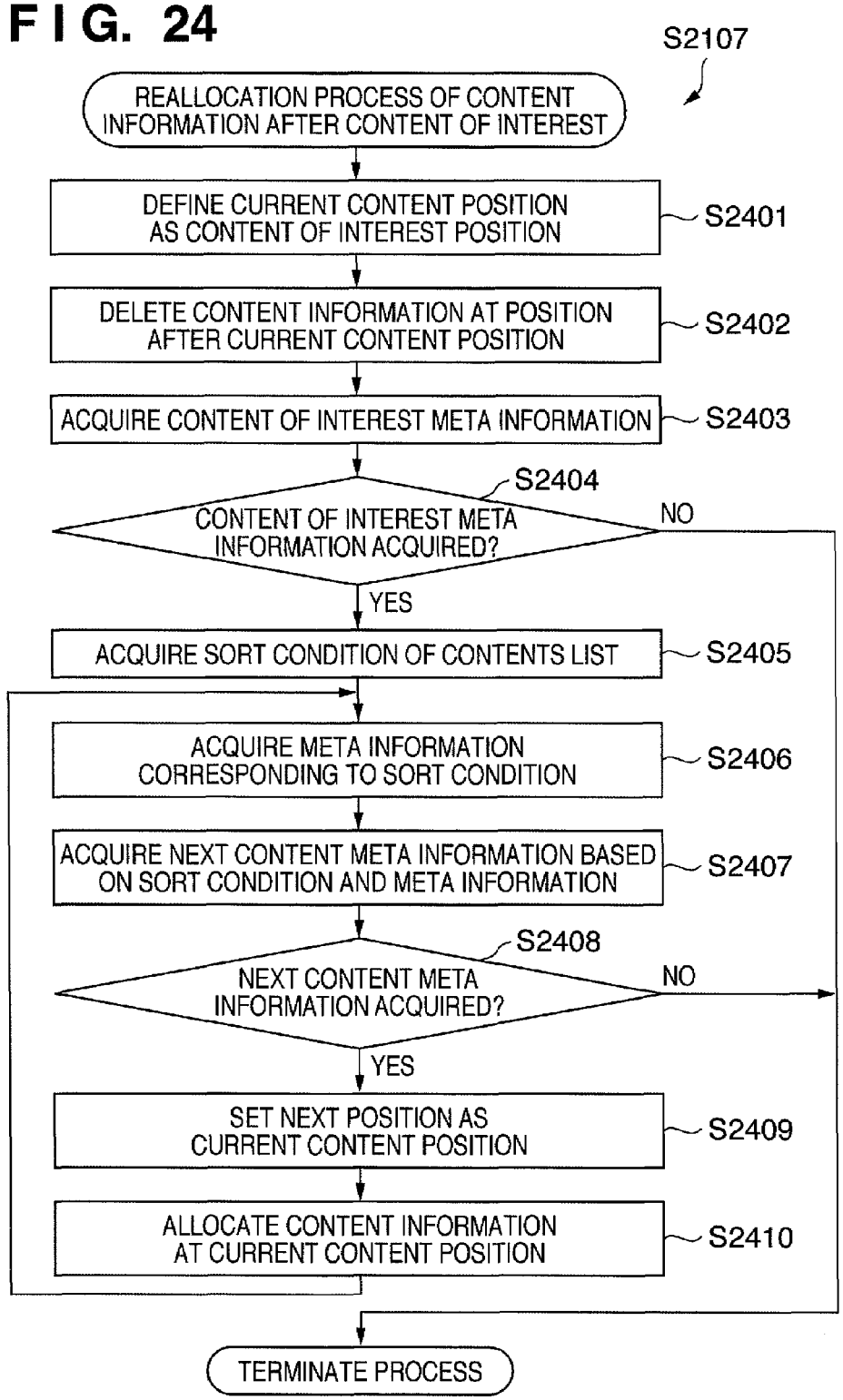
FIG. 24 is a flowchart showing a reallocation process of content information after a content of interest according to the third embodiment.

FIG. 24 is a flowchart showing the reallocation process of content information next to the content of interest according to the third embodiment. FIG. 24 is a flowchart showing the reallocation process of content information after the content of interest according to the third embodiment.

In step S2401, the contents list generation unit 1602 acquires the displayed position of the content of interest (content of interest position information 1702) from the contents list information management unit 1605, and sets that position as the current content position. In this example, the current content position is "6" to have "0" as an origin. In step S2402, the contents list information management unit 1605 deletes all pieces of content information allocated at positions after the current content position in the order of the contents list. As described above, in this embodiment, all thumbnails other than that at the current content position are deleted.

In step S2403, the contents list generation unit 1602 acquires the meta information 1720 of the content of interest from the contents list information management unit 1605.

The contents list generation unit 1602 checks in step S2404 if the meta information can be acquired in step S2403, that is, if the content of interest exists.

If it is determined that no meta information can be acquired in step S2403, that is, if no content of interest exists, this process terminates from step S2403. On the other hand, if the meta information can be acquired in step S2403, that is, if the content of interest exists, the process advances to step S2405.

In step S2405, the contents list generation unit 1602 acquires the sort condition 1710 of the contents list from the contents list information management unit 1605. In step S2406, the contents list generation unit 1602 acquires meta information corresponding to the sort key 1711 of a content corresponding to the current content position. In the example of FIG. 17, since the sort key 1711 is a date of creation, the date of creation is acquired from the meta information of the content corresponding to the current content position. In step S2407, the contents list generation unit 1602 acquires meta information of a next content based on the sort condition and meta information respectively acquired in steps S2405 and S2406. More specifically, the contents list generation unit 1602 passes the sort condition and meta information to the content information management unit 1601, and acquires the meta information of the next content from the content information management unit 1601. In this example, since the sort condition is the descending order based on the date of creation, the content information management unit 1601 searches contents on the network for a content having the date of creation next to that passed from the contents list generation unit 1602. Then, the content information management unit 1601 passes that meta information to the contents list generation unit 1602.

The contents list generation unit 1602 checks in step S2408 if the meta information of the next content can be acquired as a result of the process in step S2407. This process is equivalent to checking if a referable content next to the designated content in the order of the contents list exists. If no meta information of the next content can be acquired in step S2407, that is, if no referable content next to the designated content in the order of the contents list exists, this process terminates from step S2408.

If the meta information of the next content can be acquired in step S2407, that is, a referable content after the designated content in the order of the contents list exists, the process advances from step S2408 to step S2409. In step S2409, the contents list generation unit 1602 sets a next position as the current content position. The contents list generation unit 1602 then acquires content information (thumbnail in this example) from the meta information of the content acquired in step S2407, and allocates it at the current content position. After that, the process returns to step S2406.

As described above, according to the contents list apparatus according to the third embodiment, even when a content of interest is deleted by an external event, the display position of the content of interest is kept. As a new content of interest, a content closest to the old content of interest in the applied sort condition is selected. For this reason, the user can be avoided from losing a position of interest, and the continuity of the processes can be kept. Furthermore, even when a content is deleted, since no space is formed between pieces of adjacent content information in the contents list, the user can trace pieces of content information in turn.

Fourth Embodiment

The first to third embodiments do not consider any display mode of the contents list which extends over a plurality of pages. The fourth embodiment can eliminate an unnatural list display upon moving pages when the contents list including a plurality of pages is updated by external events. That is, the fourth embodiment will explain a contents list apparatus which recovers an unnatural display due to updating of the contents list described in the above embodiments to a natural form at an appropriate timing when the contents list includes a plurality of pages. Note that the arrangement of a contents list apparatus of the fourth embodiment is the same as that described using FIG. 2. The functional arrangement is also as has been described in the third embodiment (FIG. 16).

Figure 25:
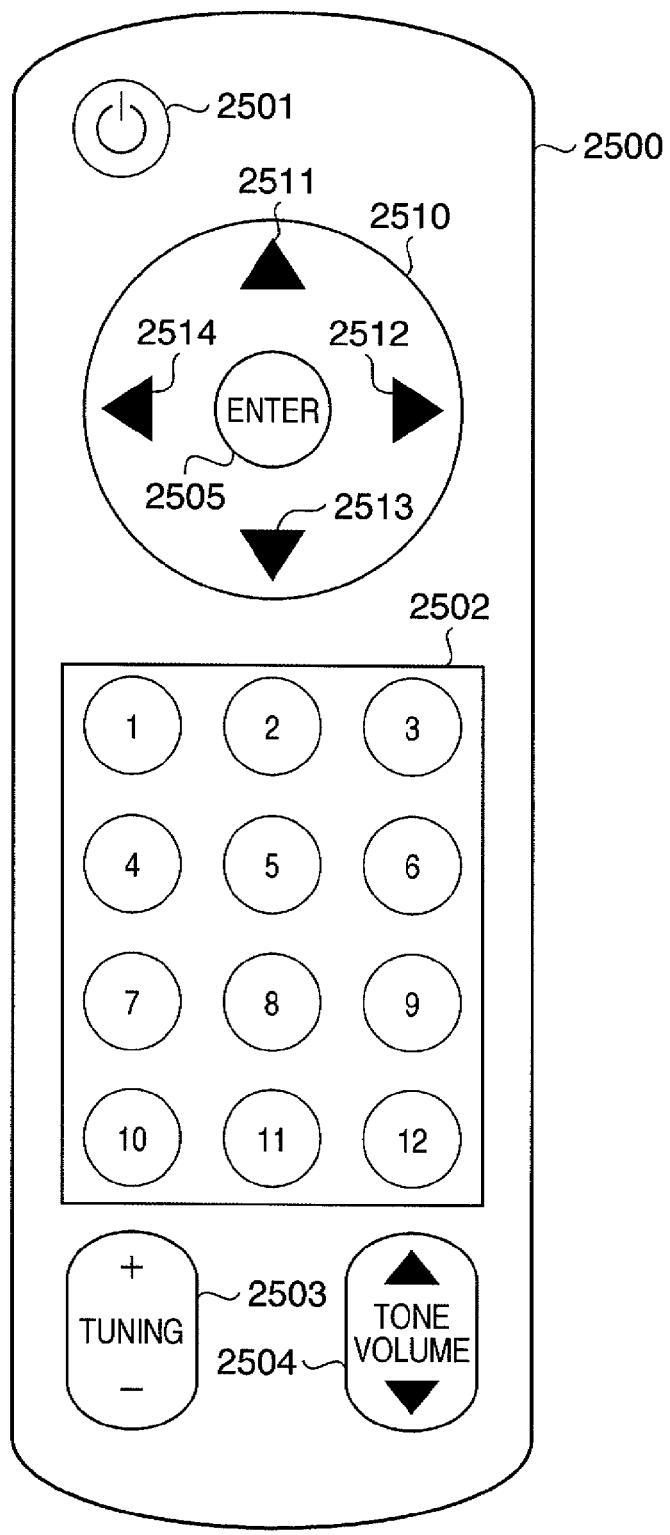
FIG. 25 is an exemplary view of an input device of a contents list apparatus according to the fourth embodiment.

FIG. 25 shows an example of an input device 206 in the contents list apparatus according to the fourth embodiment. Referring to FIG. 25, a remote controller 2500 forms a part of the input device 206, and imparts user's instructions to the contents list apparatus. The remote controller 2500 imparts user's instructions to the contents list apparatus using an infrared generation device (not shown)

Reference numeral 2501 denotes a power button, which is used to give the instruction to turn on/off the power supply of the contents list apparatus. Reference numeral 2502 denotes channel select buttons. Each of the buttons with 1 to 12 enclosed in circles in FIG. 25 is used to give the instruction to directly switch a display to a specific channel. Reference numeral 2503 denotes a tuning button. The tuning button 2503 includes independent buttons which are indicated by "+", and "−" symbols, and are used to respectively select channels next to and before the currently selected channel. Reference numeral 2504 denotes a tone volume control button including independent buttons which are indicated by marks "▲" and "▼", and are used to increase and decrease the current tone volume by a unit amount. Reference numeral 2505 denotes an "enter" button which is used to give the instruction for execution of processing upon selection of a playback content, menu selection, and the like. Reference numeral 2510 denotes an arrow key pad, which includes keys 2511 to 2514 used to respectively give the instruction to move a point of interest in the up, right, down, and left directions. In the contents list, the key 2512 is used to give the instruction to change the current content of interest to a next content in the order of the contents list. Likewise, the key 2514 is used to give the instruction to change the content of interest to a content before the current content of interest in the order of the contents list.

Figure 26:
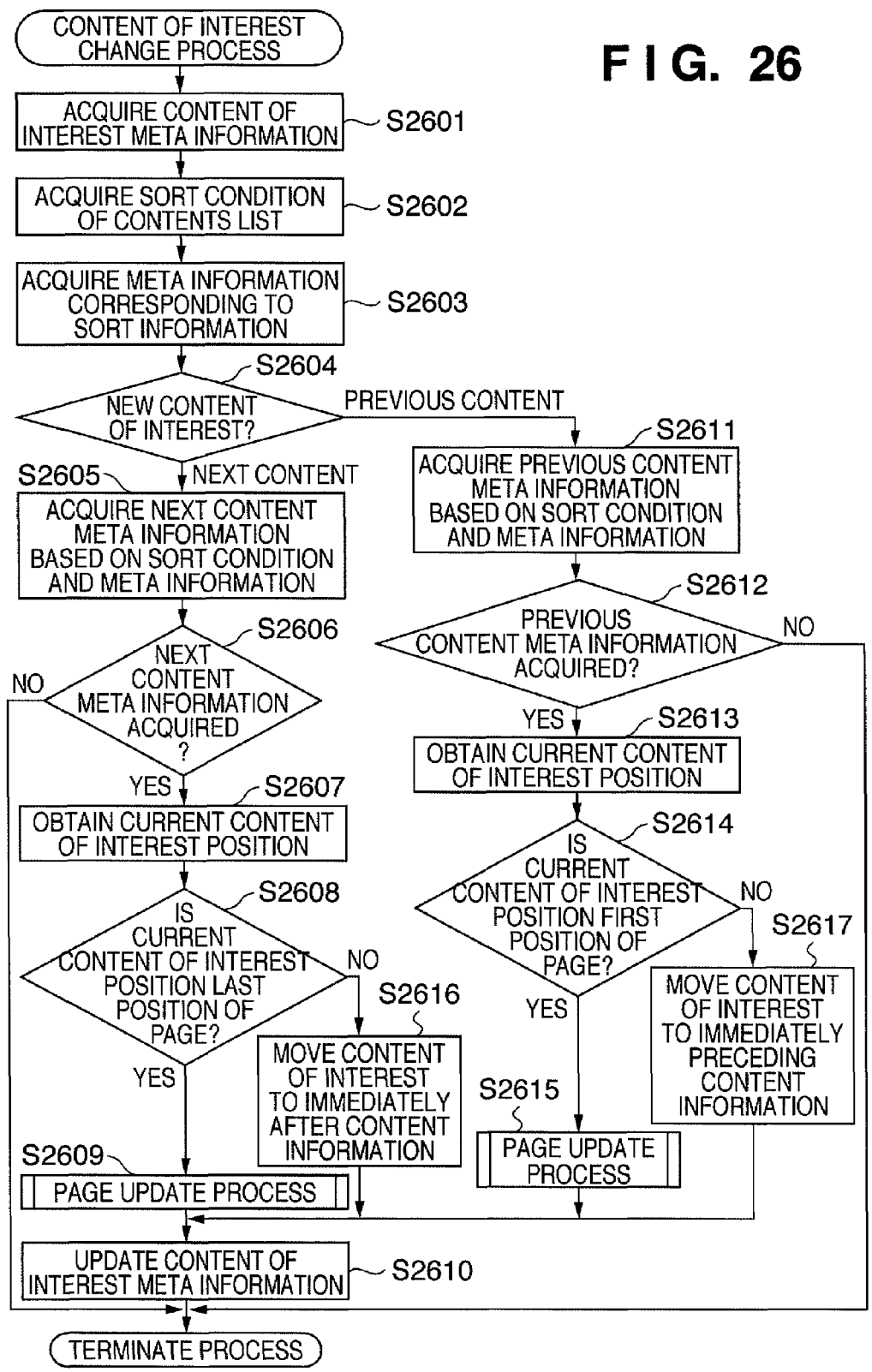
FIG. 26 is a flowchart showing the sequence of a content of interest change process in the contents list apparatus according to the fourth embodiment.

FIG. 26 is a flowchart for explaining the content of interest change process by the contents list apparatus which displays the contents list divided into a plurality of pages.

In step S2601, a contents list generation unit 1602 acquires meta information 1720 of a content of interest from a contents list information management unit 1605. In step S2602, the contents list generation unit 1602 acquires a sort condition 1710 of the contents list from the contents list information management unit 1605. In step S2603, the contents list generation unit 1602 acquires meta information of the content of interest, which corresponds to a sort key 1711 of the sort condition 1710. In this example, since the sort key 1711 is a date of creation, a date of creation 1723 of the content is acquired from meta information 1720.

The contents list generation unit 1602 then checks in step S2604 if a destination of movement of a point of interest instructed by the user is a content next to or before the current content of interest. That is, it is checked if a new content of interest is a content before or after the content of interest before movement of the point of interest. This checking process can be implemented based on an input signal received from the remote controller 2500.

If it is determined in step S2604 that the content next to the current content of interest is designated as a new content of interest, the process advances to step S2605. In step S2605, the contents list generation unit 1602 passes the sort condition and meta information to a content information management unit 1601, and acquires meta information of the content next to the content of interest from the content information management unit 1601. In this example, since the sort condition is the descending order based on the date of creation, the content information management unit 1601 searches contents on the network for a content having a date of creation next to the received date of creation, and passes its meta information to the contents list generation unit 1602.

The contents list generation unit 1602 checks in step S2606 if the meta information of the next content can be acquired in step S2605. This process is equivalent to checking if a referable content after the content of interest in the order of the contents list exists. If the meta information of the next content cannot be acquired in step S2605, that is, if no referable content after the content of interest in the order of the contents list exists, this process terminates from step S2606.

On the other hand, if the meta information of the next content can be acquired in step S2605, that is, if a referable content after the content of interest in the order of the contents list exists, the process advances from step S2606 to step S2607. In step S2607, the contents list generation unit 1602 acquires content of interest position information 1702 indicating the display position of the content of interest from the contents list information management unit 1605. The contents list generation unit 1602 checks in step S2608 if the display position of the content of interest is the last display position of a page. If the display position of the content of interest is not the last display position of a page, the contents list generation unit 1602 sets a position immediately after the current display position as that of the content of interest in step S2616. In step S2610, the contents list generation unit 1602 updates the content of interest position information 1702 accordingly. In this way, the content of interest is switched.

On the other hand, if the display position of the content of interest is the last display position of a page, the process advances from step S2608 to step S2609, and the contents list generation unit 1602 executes an update process of the entire page. This page update process will be described later. After that, in step S2610 the contents list generation unit 1602 updates the meta information 1720 by that of a new content of interest, thus terminating this process.

On the other hand, if it is determined in step S2604 that a content before the current content of interest is designated as a new content of interest, the process advances to step S2611. In step S2611, the contents list generation unit 1602 passes the sort condition and meta information to the content information management unit 1601, and acquires meta information of a content before the content of interest from the content information management unit 1601. The contents list generation unit 1602 checks in step S2612 if the meta information of the new content of interest can be acquired in step S2611. This process is equivalent to checking if a referable content before the content of interest in the order of the contents list exists.

If it is determined that the meta information of the immediately preceding content cannot be acquired, that is, if no referable content before the content of interest in the order of the contents list exists, the process terminates from step S2612. On the other hand, if the meta information of the immediately preceding content can be acquired, that is, if a referable content before the content of interest in the order of the contents list exists, the process advances from step S2612 to step S2613. In step S2613, the contents list generation unit 1602 acquires the displayed position (content of interest position information 1702) of the current content of interest from the contents list information management unit 1605. The contents list generation unit 1602 then checks in step S2614 if the display position of the current content of interest is the first display position of a page.

If the display position of the current content of interest is not the first display position of a page, the process advances from step S2614 to step S2617. In step S2617, the contents list generation unit 1602 updates the content of interest position information 1702 to a position immediately before the current display position. In step S2610, the contents list generation unit 1602 updates the meta information 1720 by that of a new content of interest designated by the content of interest position information 1702.

On the other hand, if it is determined in step S2614 if the display position is the first display position of a page, the process advances to step S2615. In step S2615, the contents list generation unit 1602 executes an update process of the entire page. This page update process will be described later. After that, in step S2610 the contents list generation unit 1602 updates the meta information 1720 by that corresponding to a new content of interest, thus terminating this process.

Figure 27A:
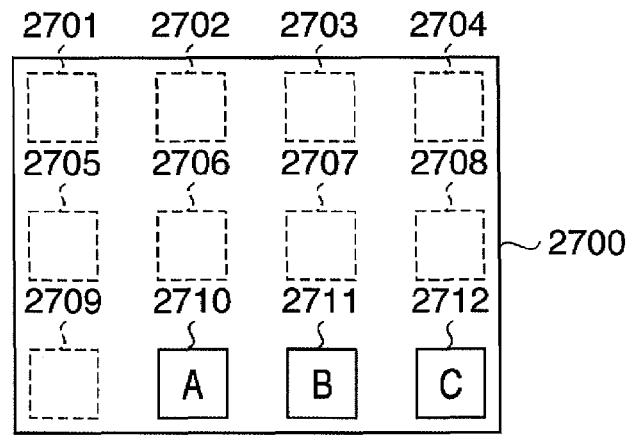
FIGS. 27A and 27B show display examples of a contents list by the contents list apparatus according to the fourth embodiment.
Figure 27B:
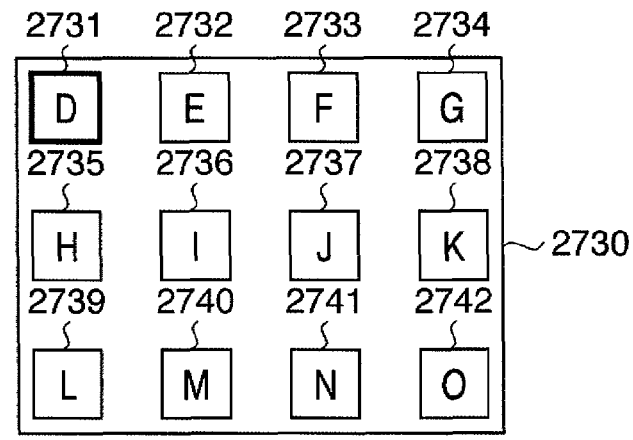

The page update process according to the fourth embodiment will be described below using display examples shown in FIGS. 27A and 27B and FIG. 28. FIGS. 27A and 27B show display examples of the contents list in the contents list apparatus according to the fourth embodiment.

Referring to FIG. 27B, reference numeral 2730 denotes a currently displayed page screen in the contents list. In the page 2730, reference numerals 2731 to 2742 respectively denote display positions each for displaying one content information (i.e., a thumbnail of each individual content in this example). As shown in FIG. 27B, respective pieces of content information are displayed in turn at the predetermined content information display positions 2731 to 2742 in the display region in the order of the contents list according to the sort condition 1710. When no content information corresponding to a certain display position in a page is available, that display position is displayed as a vacant area. Content D at the display position 2731 is displayed with an outer frame (bold frame) unlike other pieces of content information on the display region, so as to indicate that content D is the content of interest. Assume that the display region must include one and only one content of interest, as shown in FIG. 27B.

Referring to FIG. 27A, a page 2700 represents that immediately before the page 2730 that currently displays the contents list. The page 2700 is illustrated aiming at explaining what contents exist before the currently displayed page 2730 and is not displayed in practice, and no process for configuring this page is executed. Contents A to C are respectively displayed at display positions 2710 to 2712 on the page 2700. This indicates that contents A to C exist before those included in the currently displayed page 2730 in the order of the contents list. Since there exist only three contents A to C before content D, display positions 2701 to 2709 of the page 2700 are vacant.

Figure 28:
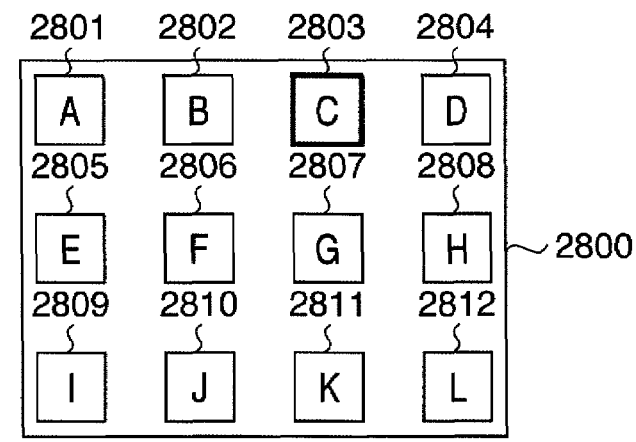
FIG. 28 shows a display example of the contents list by the contents list apparatus according to the fourth embodiment.

FIG. 28 shows a display example of the contents list after updating by the contents list apparatus according to the fourth embodiment.

Referring to FIG. 28, reference numeral 2800 denotes a currently displayed page in the contents list. The page 2800 represents an updated displayed page when the user presses the key 2514 of the remote controller 2500 from the state of the page 2730 to select a content immediately before the current content of interest as a new content of interest. When the content of interest is displayed at the first content position (display position 2731 in FIG. 27B) of a page like in the page 2730, the displayed page is updated by an instruction to select a content immediately before the content of interest as a new content of interest, and a page before the currently displayed page is displayed. In the example shown in FIGS. 27A and 27B and FIG. 28, the page 2700 as the previous page is to be displayed. However, the page 2700 is unnatural since it includes the vacant display positions 2701 to 2709 although the total number of contents to be displayed exceeds the number of displayable contents per page. Hence, in this embodiment, the page update process for obtaining the display like the page 2800 shown in FIG. 28 is executed upon such page switching.

Reference numerals 2801 to 2812 denote display positions each for displaying one content, and thumbnails of respective contents are displayed at these display positions. At the display positions 2801 to 2812, contents A to C assigned to the display positions 2710 to 2712 and contents D to L assigned to the display positions 2731 to 2739 are displayed. In accordance with an instruction to select a content immediately before the content of interest as a new content of interest, the content of interest position moves from content D displayed at the display position 2731 in FIG. 27B to content C, the display of which is assigned to the display position 2712. For this reason, a bold frame is displayed at the display position 2802 to indicate that content C is a content of interest.

Figure 29:
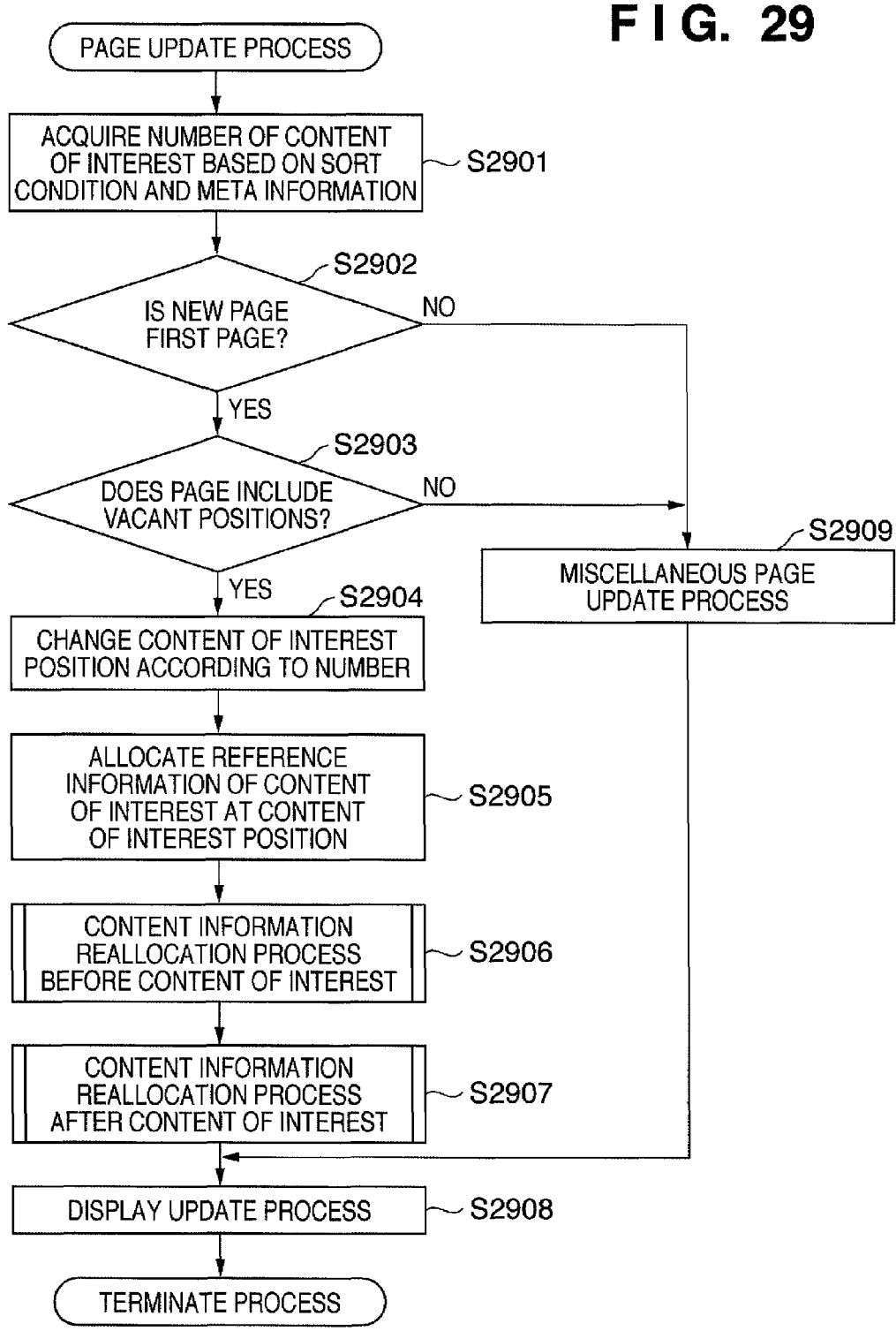
FIG. 29 is a flowchart showing a page update process of the contents list apparatus according to the fourth embodiment.

FIG. 29 is a flowchart showing the page update process (S2609, S2615) in the contents list apparatus according to the fourth embodiment.

In step S2901, the contents list generation unit 1602 acquires, from the content information management unit 1601, information indicating what number content from the first display position is a new content of interest. More specifically, the contents list generation unit 1602 passes the sort condition of the contents list acquired in step S2602 and the meta information of the content of interest corresponding to the sort condition acquired in step S2603 to the content information management unit 1601. The content information management unit 1601 specifies meta information of the new content of interest based on the received sort condition and meta information, and determines what number content from the first display position is the new content of interest. The contents list generation unit 1602 checks in step S2902 based on the number of the new content of interest acquired in step S2901 and the number of content display positions per page if the updated page is a first page.

If it is determined in step S2902 that the updated page is a first page, the process advances to step S2903. The contents list generation unit 1602 checks in step S2903 based on the number of the new content of interest acquired in step S2901 and the number of content display positions per page if the first page includes vacant content display positions. More specifically, the contents list generation unit 1602 checks if vacant content display positions are generated at the first display position side of the page when the new content of interest is allocated at the last display position of the page.

If it is determined in step S2903 that the first page includes vacant content display positions, the process advances to step S2904. In step S2904, the contents list generation unit 1602 changes the display position of the content of interest on the first page to a position corresponding to the number obtained in step S2901. The contents list generation unit 1602 instructs the contents list information management unit 1605 to update the content of interest position information 1702 by the changed display position. In step S2905, the contents list generation unit 1602 allocates the new content of interest at the changed content of interest position. The contents list generation unit 1602 executes the reallocation process of content information before the content of interest in the order of the contents list (FIG. 23) in step S2906, and the reallocation process of content information after the content of interest (FIG. 24) in step S2907. In step S2908, the contents list generation unit 1602 instructs a screen display unit 1603 to update the display by the page obtained by the aforementioned process, thus terminating the process.

If it is determined in step S2902 that the updated page is not the first page or if it is determined in step S2903 that the first page does not include any vacant content display position, the process advances to step S2909. In step S2909, the contents list generation unit 1602 executes a miscellaneous page update process, and the process advances to step S2908. In the miscellaneous page update process, the content of interest is displayed at the display position 2712 in FIG. 27A as the last display position of a page, and contents sorted before the content of interest are allocated at the display positions 2711 to 2701 according to the sort order.

As described above, in the contents list apparatus according to the fourth embodiment, even when the number of pieces of content information to be displayed on the first page is less than the number of pieces of displayable content information per page as a result of contents list updating by an external event, a display which is not unnatural can be made. Note that the display which is not unnatural is a display of a contents list without any vacant display position of content information. Furthermore, confusion by the user can be avoided.

Fifth Embodiment

In the fifth embodiment, in a contents list including a plurality of pages, when an unnatural list of the first page is displayed as a result of updating of the contents list by an external event, such unnatural display can be resolved upon page movement. Note that the arrangement of a contents list apparatus 101 of the fifth embodiment is the same as that described using FIG. 2. Also, the functional arrangement is the same as that described above in the third embodiment (FIG. 16) The fifth embodiment corresponds to a modification of the page update process in steps S2609 and S2615 in FIG. 26 of the fourth embodiment.

FIGS. 30A and 30B show an example of a contents list display on the contents list apparatus according to the fifth embodiment.

Referring to FIG. 30A, reference numeral 3000 denotes a currently displayed page in the contents list. Reference numeral 3001 to 3012 denote display positions (display areas) on each of which one content information (a thumbnail of each individual content in this example) is allocated. As shown in FIG. 30A, respective pieces of content information are displayed at the predetermined display positions 3001 to 3012 in the page display region in turn in accordance with the order of the contents list. When no content information corresponding to a certain display position in a page is available, that display position is vacant. Content L is displayed at the display position 3012 with an outer frame unlike other pieces of content information to indicate that content L is a content of interest. Assume that the display region must include one and only one content of interest, as shown in FIG. 30A.

Reference numeral 3030 denotes a page immediately after the page 3000 that currently displays the contents list. The page 3030 is illustrated with an aim to explain what contents exist after the currently displayed page 3000 and is not displayed in practice, and no process for configuring this page is executed. As shown in FIG. 30B, contents M to X exist after content L, and pieces of content information (icons or the like) of these contents are allocated one by one at display positions 3031 to 3042.

Figure 31A:
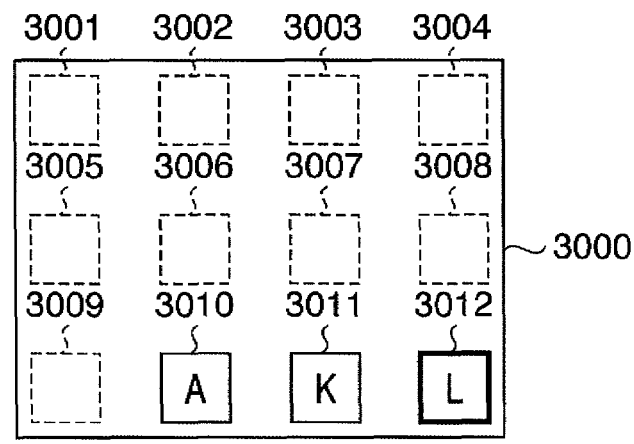
FIGS. 31A and 31B show display examples of the contents list by the contents list apparatus according to the fifth embodiment.
Figure 31B:
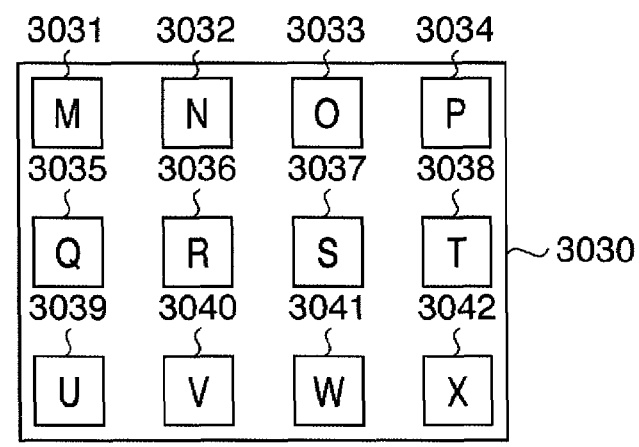

FIGS. 31A and 31B show an example of the contents list display after contents are deleted by external events in the contents list apparatus according to the fifth embodiment.

FIG. 31A shows the display state of the page 3000 which is updated after contents B to J corresponding to pieces of content information displayed at the display positions 3002 to 3010 are deleted on the page 3000 which currently displays the contents list. Such content deletion occurs, for example, when the user deletes contents held in storage apparatuses 102, 103, and 104.

The contents list display based on the page 3000 in FIG. 31A is obtained as a result of reallocating contents A, K, and L which remain undeleted on the page 3000 before update according to the process shown in FIG. 21. That is, these contents are reallocated so as not to move content L as the content of interest and its display position 3012, and contents A and K are displayed at the display positions 3010 and 3011. Also, the display positions 3001 to 3009 of the page 3000 are vacant areas as a result of reallocation.

Figure 32:
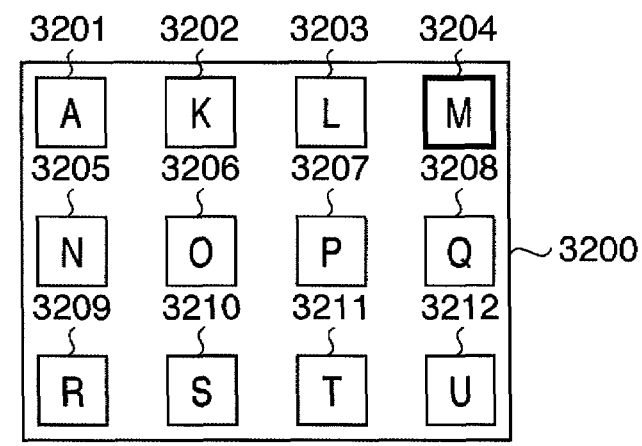
FIG. 32 shows a display example of the contents list by the contents list apparatus according to the fifth embodiment.

FIG. 32 shows an example of the contents list display after the display update process upon page movement in the contents list apparatus according to the fifth embodiment.

Referring to FIG. 32, reference numeral 3200 denotes an updated display page in the contents list. The page 3200 represents a display page after the update process executed when the user presses the key 2512 of the remote controller 2500 from the state of the page 3000 shown in FIG. 31A to select the next content as a new content of interest. When the content of interest is displayed at the last display position 3012 of the page like the page 3000, and when the user gives the instruction to select content information after the current content of interest as a new content of interest, the display page is updated, and a page next to the currently displayed page is displayed. In the example of FIGS. 31A and 31B, the page to be displayed next to the page 3000 is the page 3030. However, the page 3000 is unnatural since it includes the vacant content positions 3101 to 3109 although the total number of contents to be displayed exceeds that per page. For this reason, the page update process for eliminating vacant spaces of the first page is executed. The result of such page update process is the page 3200 shown in FIG. 32.

In FIG. 32, pieces of content information (thumbnails in this example) of contents A and K to U are respectively allocated and displayed at display positions 3201 to 3212. Contents A and K to U displayed at the display positions 3201 to 3212 are those displayed at the display positions 3010 to 3012 and 3031 to 3039. In this example, the instruction to select a content immediately after the content of interest as a new content of interest is received in the state (page 3000) in which the content of interest is content L displayed at the display position 3012. In response to this instruction, the content of interest position moves to content M immediately after content L. Therefore, the display is made to clearly specify that content M is a content of interest at the display position 3204 of the page 3200 in FIG. 32.

Figure 33:
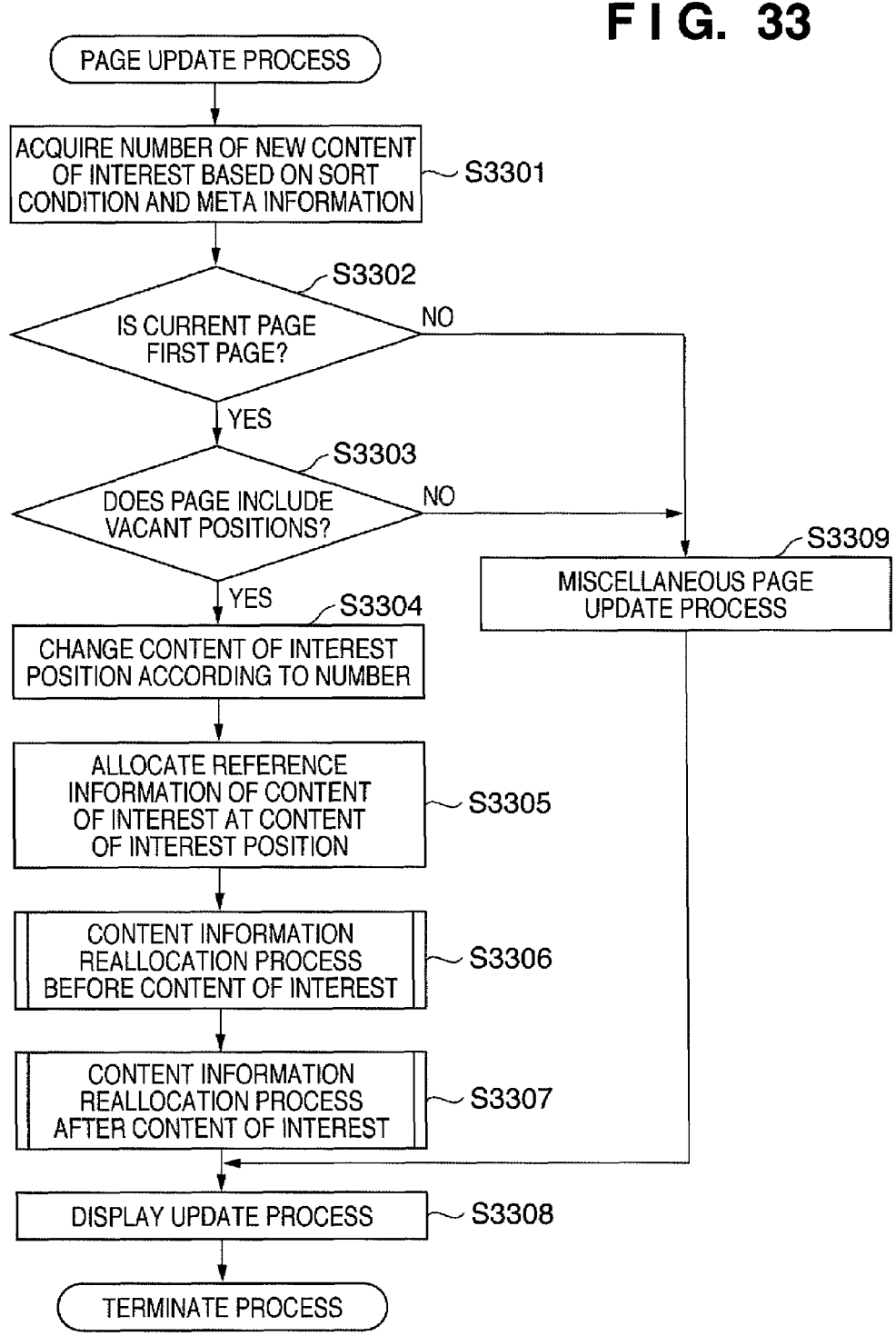
FIG. 33 is a flowchart showing a page update process by the contents list apparatus according to the fifth embodiment.

FIG. 33 is a flowchart showing the page update process in the contents list apparatus according to the fifth embodiment.

In step S3301, a contents list generation unit 1602 obtains information indicating what number content from the first display position is a new content of interest, based on a sort condition of the contents list and meta information of the content of interest corresponding to the sort condition. In this embodiment, such information is acquired when the contents list generation unit 1602 passes the sort condition of the content of interest acquired in step S2602 and the meta information of the content of interest acquired in step S2603 to a content information management unit 1601. The content information management unit 1601 checks in step S3302 if the current page, that is, the page before updating of the interest page is the first page. This checking is implemented based on the number of the content of interest acquired in step S3301, the number of content display positions per page, and the current position of the content of interest obtained in step S2607 or S2613.

If it is determined in step S3302 that the page before updating is the first page, the process advances to step S3303. The contents list generation unit 1602 checks in step S3303 based on the number of the content of interest acquired in step S3301 and the number of content display positions per page if the first page includes vacant content display positions.

If it is determined in step S3303 that the first page includes vacant content display positions, the process advances to step S3304. In step S3304, the contents list generation unit 1602 changes the position of the content of interest to a position corresponding to the number of the new content of interest acquired in step S3301, and instructs a contents list information management unit 1605 to update content of interest position information 1702. In step S3305, the contents list generation unit 1602 allocates the new content of interest at this new content of interest position. The contents list generation unit 1602 executes the reallocation process of content information before the content of interest in the order of the contents list in step S3306 and the allocation process of content information after the content of interest in step S3307. After that in step S3308 the page is displayed, thus terminating this process.

If it is determined in step S3302 that the updated page is not the first page or if it is determined in step S3303 that the first page does not include any vacant content display position, the process advances to step S3309. In step S3309, the contents list generation unit 1602 executes a miscellaneous page update process (the same process as in step S2616 or S2617). After that, the process advances to step S3308.

As described above, according to the contents list apparatus of the fourth and fifth embodiments, even when the displayed first page has an unnatural display as a result of the contents list update process due to an external event, contents can be reallocated to have a display which is not unnatural at the page switching timing. Note that the display which is not unnatural is a display of a contents list without any vacant display position of content information in place of moving to the second image upon moving from the first page to the second page. Furthermore, confusion by the user can be avoided.

Sixth Embodiment

In the sixth embodiment, an embodiment which displays contents together around a content of interest by moving over those which are excluded from contents to be displayed without changing the content of interest and its position upon refinement will be described hereinafter with reference to the accompanying drawings.

Figure 34:
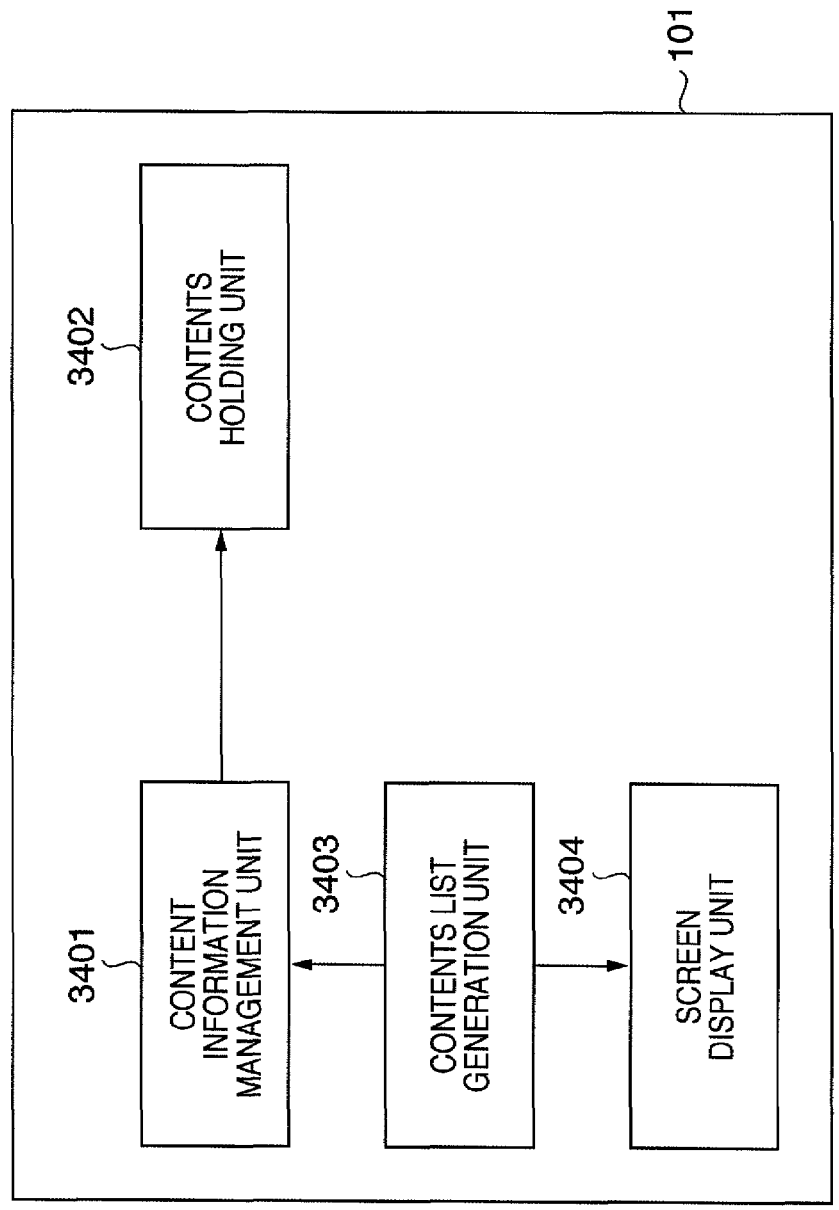
FIG. 34 is an exemplary block diagram showing the functional arrangement that implements a contents list process according to the sixth embodiment.

FIG. 34 is an exemplary block diagram showing the functional arrangement of a contents list apparatus according to the sixth embodiment. Referring to FIG. 34, a content information management unit 3401 holds reference information (information used to specify the location of each content such as a URL, file path, or the like) for each content. The content information management unit 3401 acquires meta information, an entity, thumbnail, and the like of each content from a contents holding unit 3402, an external storage apparatus 104 that holds contents, and the like in response to a request from another module. The content information management unit 3401 manages the states of respective contents. The content information management unit 3401 holds information indicating whether or not each content is in a state of interest, and holds the position on a screen display in association with the content in the state of interest. The contents holding unit 3402 is used to hold contents in a contents list apparatus 101 itself. A contents list generation unit 3403 recognizes the current positions of contents in the screen and sorts contents in a predetermined order so as to display the contents of contents on an output device 208. A screen display unit 3404 writes rendering data for, for example, a contents list display on a rendering RAM of the output device 208.

Figure 35:
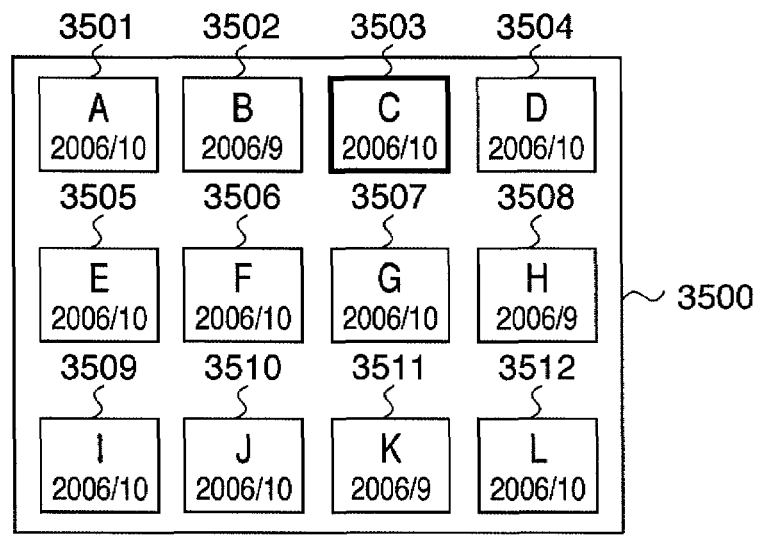
FIG. 35 shows a display example of a contents list according to the sixth embodiment.

FIG. 35 shows an example of the screen display contents of a contents list screen according to the sixth embodiment. Referring to FIG. 35, reference numeral 3500 denotes a whole contents display region. The contents list display 3500 is displayed on, for example, a display device of the output device 208. At each of display positions 3501 to 3512, one content information is displayed, and a thumbnail of a content is assumed as the content information to be displayed in this example. As shown in FIG. 35, respective contents are sorted according to a predetermined order (sort condition) and are displayed at predetermined display positions in the display region. Note that an outer frame is highlighted at the display position 3503, and this is an example in which a content (content C in FIG. 35) displayed there is a content of interest.

In all the embodiments, a display used to indicate a content of interest is not limited to that using a bold frame. As other examples indicating a content of interest, methods of displaying a cursor, displaying a content in a larger scale, flickering a content, displaying a content with its saturation, lightness, or tint changed, casting a shadow of a content on the background, and so forth may be used. In FIG. 35, a description "2006/10" or the like displayed in a lower portion of each content is an example that clearly specifies the date of creation of a content, which is used in refinement to be described later. In practice, the date of creation of each content need not be displayed in the list display 3500.

Figure 36:
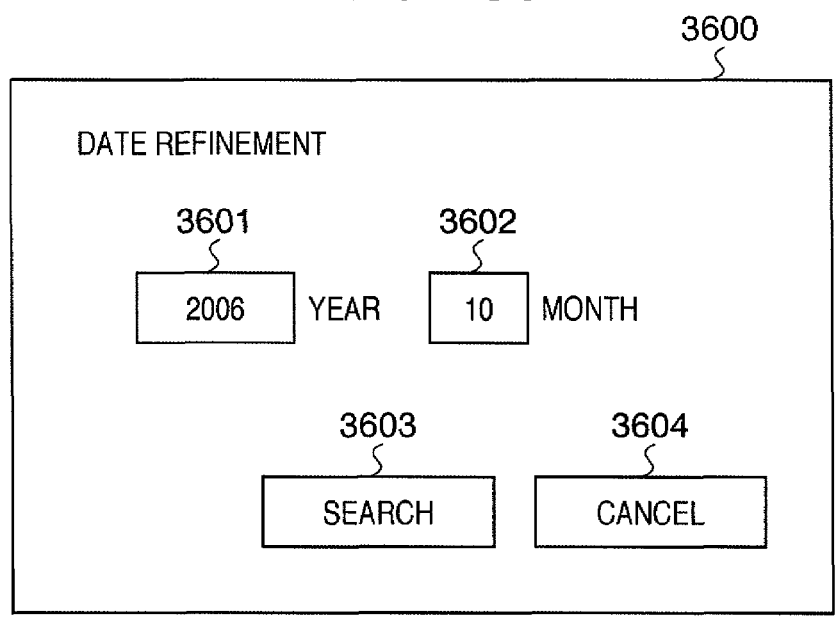
FIG. 36 shows an example of a dialog for a refinement manipulation.

FIG. 36 shows an example of a refinement dialog (user interface). Referring to FIG. 36, reference numeral 3600 denotes a whole refinement dialog. FIG. 36 will exemplify a case in which the dates of creation of contents are refined using "year" and "month" values. Reference numeral 3601 denotes a text box used to designate "year". Reference numeral 3602 denotes a text box used to designate "month". The user inputs "year" and "month" values to be retrieved in the text boxes 3601 and 3602 and presses a search button 3603, thus starting refinement. After the refinement, only contents having dates of creation that match the "year" and "month" values input to the text boxes 3601 and 3602 are to be displayed, and the list display screen is updated. Note that the refinement condition is not limited to the "year" and "month values of the dates of creation. For example, file names, file types, update dates, character strings in meta information, and the like may be used in the refinement.

Figure 37:
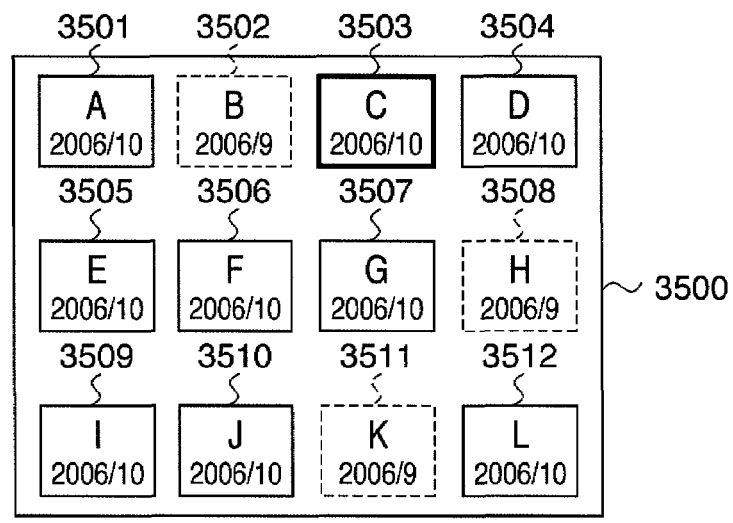
FIG. 37 visually shows a state in which contents which cease to display are generated as a result of the refinement.

FIG. 37 is a view for explaining the contents list display when some contents cease to display as a result of the refinement. FIG. 37 explains a state in which some contents cease to display when the dates of creation of contents are refined using the "year" and "month" values that match "2006/10", as shown in FIG. 36. In FIG. 37, contents B, H, and K cease to display. This is because contents with "2006/9" are excluded from those to be displayed since the refinement is made using "2006/10". The example of FIG. 37 assumes that one content (content B) located before content of interest C and two contents (contents H and K) located after content of interest C cease to be displayed. The display positions where contents cease to be displayed become vacant, and contents before and after these vacant display positions are displayed after they move over to these positions. Note that FIG. 37 illustrates contents which cease to be displayed using dotted lines to allow easy recognition. However, such display is not made in practice, and these contents disappear from the screen as those excluded from contents to be displayed.

Figure 38:
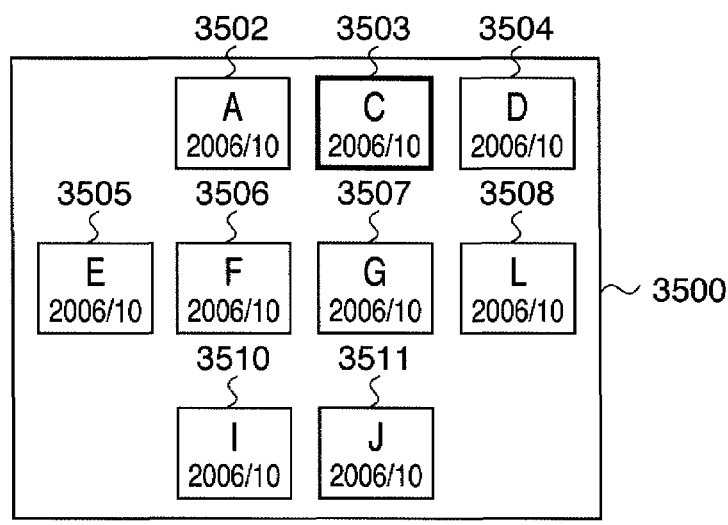
FIG. 38 shows a contents list display example after the refinement.

FIG. 38 shows an example of the screen display contents after the refinement according to this embodiment. Since content B ceases to be displayed in FIG. 37, the display position 3502 becomes a vacant area, and content A displayed at the display position 3501 moves to the right in FIG. 38. Also, since content H ceases to be displayed in FIG. 37, a display of content L at the display position 3512 moves upward to the display position 3508 in FIG. 38. Likewise, since content K ceases to be displayed in FIG. 37, displays of contents I and J displayed at the display positions 3509 and 3510 respectively move to the right in FIG. 38. In this way, the display is updated so that the position 3503 of the content of interest remains unchanged, and contents get together around this content of interest C. As a result, the user never misses the point of interest. The aforementioned list display update process is as has been described in the above embodiments.

Figure 39:
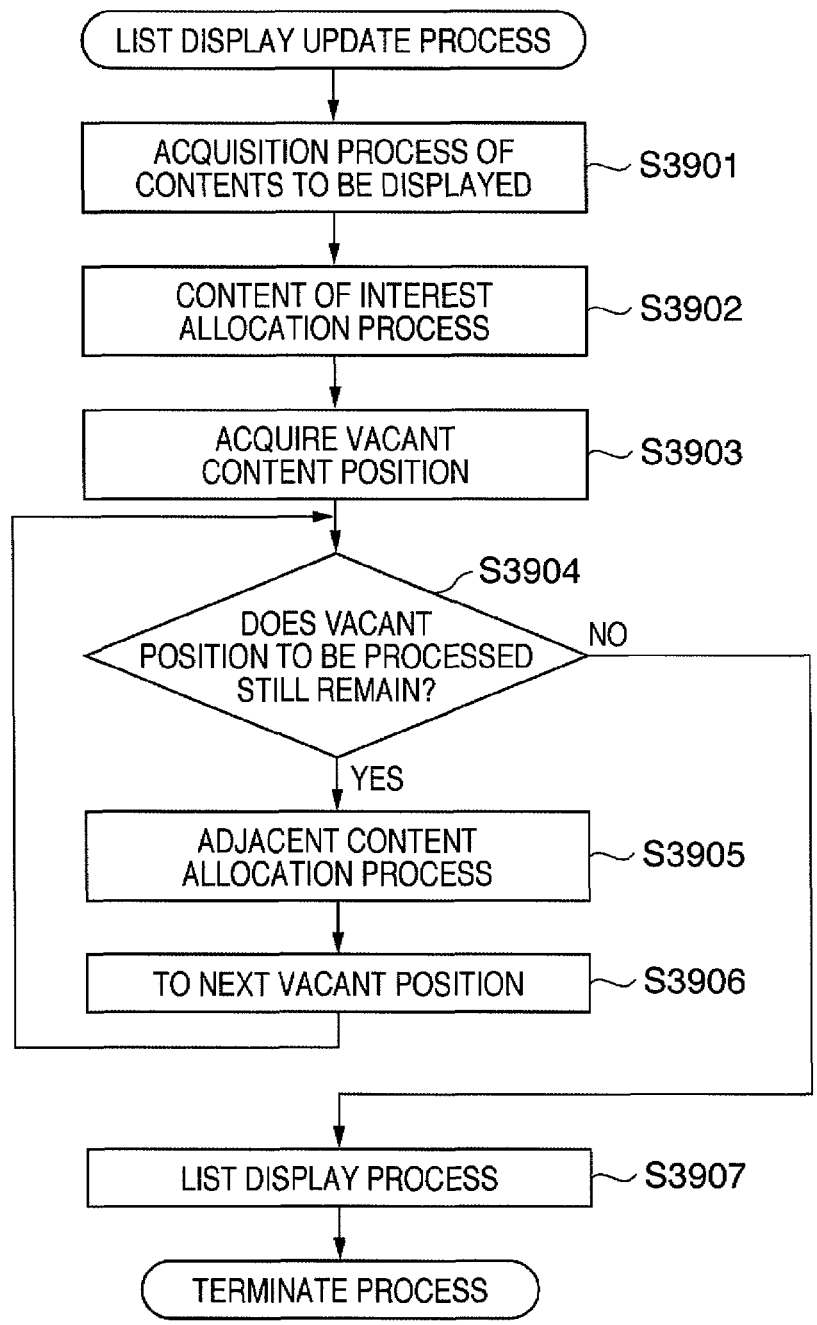
FIG. 39 is a flowchart showing a list display update process according to the sixth embodiment.

FIG. 39 is an exemplary flowchart showing the list display update process according to the sixth embodiment. This process is executed when the contents list generation unit 3403 rewrites rendering data of the screen upon making the aforementioned refinement.

In step S3901, the contents list generation unit 3403 acquires contents to be displayed on the screen after the refinement from the content information management unit 3401. In step S3902, the contents list generation unit 3403 allocates a content of interest at the current position. That is, the position of the content of interest is immovable. In step S3903, the contents list generation unit 3403 acquires positions where contents cease to be displayed as a result of the refinement. Taking FIG. 37 as an example, the display positions 3502, 3508, and 3511 of the contents which are excluded from those to be displayed are acquired. The subsequent processes in steps S3904 to S3906 process the positions where contents cease to be displayed acquired in step S3903 one by one, and are repeated as many as the acquired number of positions where contents cease to be displayed.

The contents list generation unit 3403 checks in step S3904 if the positions where contents cease to be displayed (vacant content positions) to be processed still remain. If the vacant content positions to be processed still remain, the process advances from step S3904 to step S3905. In step S3905, the contents list generation unit 3403 moves over a closest content to the currently processed vacant content position. A direction to move over is not limited to any of the up, down, right, and left directions. Upon executing this process, it is desirable to allocate contents farther from the content of interest to approach the content of interest, so that all contents get together around the content of interest. Furthermore, it is desirable to allocate contents by minimum required movements while keeping the current allocation as much as possible, while avoiding any drastic movements.

In the example of FIG. 38, a display of content A displayed at the adjacent display position 3501 is moved to the vacant display position 3502. To the display position 3508 which becomes vacant in FIG. 37, a display of content L at the display position 3512 immediately below the display position 3508 is moved. Also, to the display position 3511 which becomes vacant in FIG. 37, a display of content J displayed at the adjacent display position 3510 is moved. As the movement of a content to the display position 3511, a display of content E displayed at the display position 3505 far from the display position 3503 of content of interest C may be moved. However, since a large moving amount is required in this case, adjacent content J is moved. To the display position 3510 after content J has been moved, a display of content I displayed at the adjacent display position 3509 is moved. Note that such moving method is an example, and contents need only be allocated to get together around the content of interest without changing the position of the content of interest using, for example, the method described in the first embodiment.

In step S3906, the contents list generation unit 3403 returns the process to step S3904 to process the next vacant position. If it is determined in step S3904 that no vacant content position to be processed remains, the process jumps to step S3907. In step S3907, the contents list generation unit 3403 displays the contents reallocated by the aforementioned process on the screen as a list screen.

As described above, in the contents list apparatus of the sixth embodiment, even when contents displayed on the screen are rewritten after the refinement, since the content of interest and its position remain the same, unnecessary confusion can be avoided since the point of interest of the user is left unchanged. Since contents get together around the content of interest, the user can be prevented from losing the sight of the content of interest even on a large-screen television.

Seventh Embodiment

In the seventh embodiment, an embodiment for moving over positions where contents are excluded from those to be displayed and sorting and displaying in turn the contents without changing a content of interest and its position upon refinement will be described with reference to the accompanying drawings.

Figure 40:
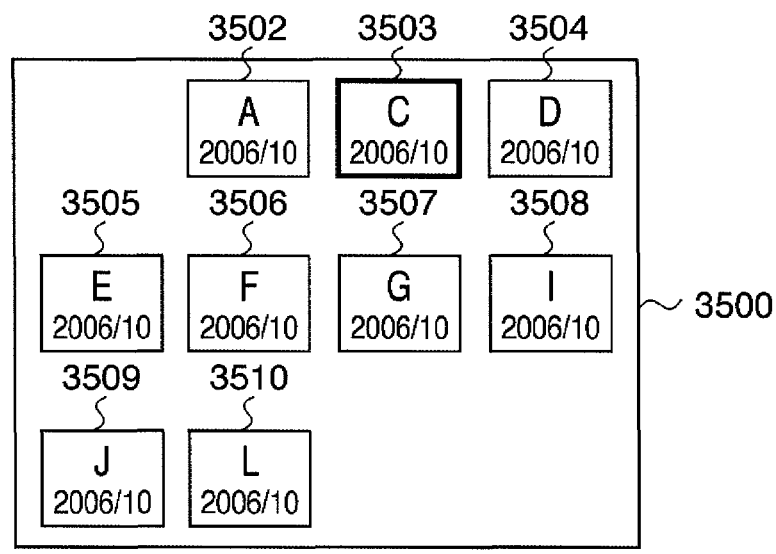
FIG. 40 shows a contents list display example after refinement according to the seventh embodiment.

FIG. 40 shows an example of the screen display contents after refinement according to the seventh embodiment. FIG. 40 shows a display example of a contents list upon refinement in the state of FIG. 35 based on the setting in FIG. 36. After the refinement is made using the setting shown in FIG. 36, some contents cease to be displayed, as indicated by dotted lines in FIG. 37. When content B is excluded from that to be displayed, and a vacant content position 3701 is generated, as shown in FIG. 37, content A at a display position 3501 moves to the right, and is displayed at a display position 3502, as shown in FIG. 40. Also, when contents H and K cease to be displayed, as shown in FIG. 37, contents after these contents move over in turn to vacant display positions 3508 and 3511 and are displayed, as shown in FIG. 40. In this way, the position of a content of interest at a display position 3503 remains the same, and contents before and after the content of interest move over to have this content of interest as an origin, so that they get together and are displayed around the content of interest.

Figure 41:
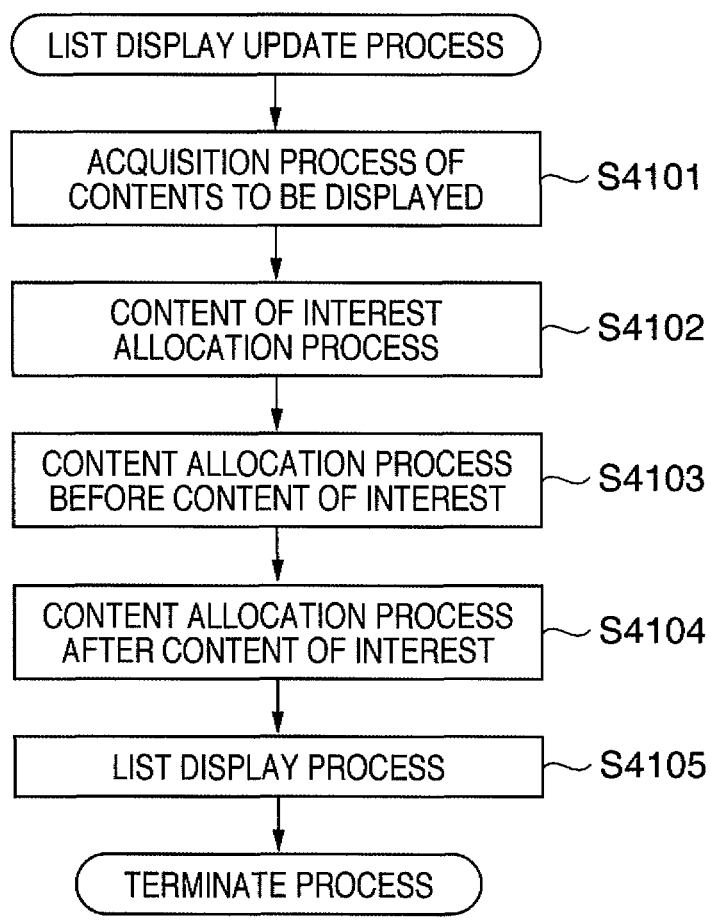
FIG. 41 is a flowchart showing a list display update process according to the seventh embodiment.

FIG. 41 is an exemplary flowchart showing a list display update process by a contents list apparatus according to the seventh embodiment. This process is executed when a contents list generation unit 3403 rewrites screen rendering data after refinement is made.

In step S4101, the contents list generation unit 3403 acquires contents to be displayed on the screen after the refinement from a content information management unit

3401. In step S4102, the contents list generation unit 3403 allocates a content of interest at the current position. That is, the position of the content of interest is immovable. In step S4103, the contents list generation unit 3403 arranges, in turn before the content of interest, contents located before the content of interest allocated in step S4102. As an example of this method, IDs may be assigned to contents in the order to be arranged, and contents which have IDs smaller than that of the content of interest and are to be displayed may be allocated in turn at positions closer to the content of interest in descending order of ID. For example, assume that indices of display positions are assigned from the left end of the list in the right direction and from the top end in the down direction. In this case, contents are allocated in descending order of ID from an index position defined by subtracting "1" from the index of the display position where the content of interest is allocated in turn to positions in descending order of index.

In step S4104, the contents list generation unit 3403 arranges, in turn after the content of interest, contents located after the content of interest. In this example, contents which have IDs larger than that of the content of interest and are to be displayed are allocated in ascending order of ID from an index position defined by adding "1" to the index of the position where the content of interest is allocated to positions in ascending order of index. In step S4105, the contents list generation unit 3403 displays the contents reallocated by the aforementioned process on the screen as a list screen. Note that the processes shown in FIGS. 23 and 24 can be applied as steps S4103 and S4104.

As described above, in the contents list apparatus of the seventh embodiment, even when contents displayed on the screen are rewritten as a result of the refinement, since the content of interest and its position are maintained, unnecessary confusion can be avoided since the point of interest of the user remains unchanged. When the user makes manipulations for contents in turn, since the content of interest is left unchanged, he or she can continue manipulations made in turn even after the refinement.

Eighth Embodiment

The sixth and seventh embodiments do not refer to a case in which the content of interest is excluded from that to be displayed as a result of a search. In the eighth embodiment, when the content of interest itself is excluded from that to be displayed after the refinement, an adjacent content is selected as a new content of interest, and contents are displayed while moving over positions where contents are excluded from those to be displayed. The eighth embodiment will be described below with reference to the accompanying drawings.

FIG. 42 visually shows an example in which the content of interest itself is excluded from that to be displayed as a result of the refinement. Assume that contents B, C, H, and K are those which cease to be displayed by the refinement operation shown in FIG. 36 from the list display state shown in FIG. 35. As in FIG. 37, display positions 3502, 3503, 3508, and 3511 become vacant. In FIG. 42, assume that content C as a content of interest at the display position 3503 has "2006/9" as its date of creation. Hence, in this embodiment, content C is excluded from that to be displayed by the refinement operation although it is a content of interest, and the display position 3503 becomes vacant.

FIG. 43 shows an example of the screen display contents after the refinement according to the eighth embodiment. FIG. 43 shows an example of a list display when the content of interest itself ceases to be displayed as a result of the refinement, as shown in FIG. 42.

Content C displayed at the display position 3503 before the refinement is a content of interest but it is excluded from contents to be displayed as a result of the refinement, and is replaced by an adjacent content as a new content of interest. In this case, the displayed position itself of the content of interest remains unchanged. In the example, content D which is the nearest content after content C, that is not excluded from those to be displayed, is set as a new content of interest, and is displayed at the display position of the content of interest so far. Note that a content before content C may be selected as a new content of interest. However, assuming that the user makes manipulations in turn to contents, it is desirable to select a content after the content of interest which is excluded from those to be displayed as a new content of interest.

FIG. 44 is an exemplary flowchart showing a content of interest allocation process as the time of the refinement according to the eighth embodiment. FIG. 44 explains details of the content of interest allocation process (S3902, S4102) included in the flowcharts of FIGS. 39 and 41.

A contents list generation unit 3403 checks in step S4401 if a content of interest is excluded from those to be displayed as a result of the refinement. If it is determined in step S4401 that the content of interest is excluded from those to be displayed, the process advances to step S4402. In step S4402, the contents list generation unit 3403 determines a new content of interest in place of the content of interest which is excluded from those to be displayed, and replaces the old content of interest by the new content of interest. As a method of determining a new content of interest, as has been described using FIG. 43, a closest content, which is not excluded from those to be displayed, before or after the content of interest that is excluded from those to be displayed, may be determined to be a new content of interest.

As described above, in the contents list apparatus of the eighth embodiment, even when the content of interest is excluded from those to be displayed as a result of the refinement, the displayed position of the content of interest is left unchanged, and an adjacent content is set as a new content of interest. For this reason, a change in appearance can be minimized, and user's confusion can be prevented without losing the position of interest.

Ninth Embodiment

In the ninth embodiment, when the user resets a refinement condition to that before refinement without any manipulations after the refinement is made, a point of interest is reverted to a content which was the content of interest before the refinement.

An operation example of the ninth embodiment will be described below based on the refinement described using FIGS. 42 and 43.

In the state shown in FIG. 42, information indicating that content C was the content of interest before the refinement is held. In this case, when information indicating a content of interest before refinement is held for each refinement condition, a state before the refinement can be restored when a specific refinement condition is reset. For example, the display state shown in FIG. 42 is obtained after the refinement is made under the condition of, for example, a date of creation="2006". In this case, at the time of the condition of the date of creation="2006", information indicating that content C is a content of interest is held. If the refinement is made under the condition of a date of creation="2006/10" by the manipulation shown in FIG. 36 in this display state, content C as the content of interest is excluded from those to be displayed, and the display state shown in FIG. 43 is obtained. Since content C in FIG. 42 is excluded from those to be displayed, content D adjacent to content C is selected as a new content of interest in FIG. 43. In this case, at the time of the condition of the date of creation="2006/10", information indicating that content D is a content of interest is held.

FIG. 45 shows an example of a dialog (user interface) used to return a refinement condition of "2006/10" set in FIG. 36 to that of "2006". FIG. 45 shows a display example when the refinement using a "month" value is not designated in a text box 3602. As a result, only contents which have dates of creation="2006" are displayed. Assume that a state before designation of the refinement condition of FIG. 36, that is, the display state shown in FIG. 42 is obtained as a result of the refinement based only on the "year" value="2006" of the date of creation. The following explanation will be given under the assumption that the refinement condition is returned to "2006" while a list display is made, shown in FIG. 43, under the refinement condition of "2006/10" set in FIG. 36.

FIG. 46 shows a contents list display state according to the ninth embodiment when the refinement condition is returned, as described above. FIG. 46 shows an example of screen display contents when the refinement condition is returned to that before the refinement after the refinement in the ninth embodiment.

When the user returns a refinement condition to that before refinement without any manipulations except for that to return the refinement condition in the display state shown in FIG. 43 after the refinement, the display state shown in FIG. 46 is obtained. The manipulations except for that to return the refinement condition includes a cursor movement, and manipulations for contents such as playback display, print, deletion, and the like of contents. These manipulations except for that to return the refinement condition are merely examples, and the present invention is not limited to such specific manipulations. In the contents list display (FIG. 43) after the refinement based on the refinement condition of the date of creation="2006/10", content D is a content of interest. However, in the contents list display after the refinement condition is returned to "2006" from the above list display state, the content of interest is restored to content C which was the content of interest before the refinement, as shown in FIG. 46. In this case, the display position where the content of interest is allocated remains unchanged, and the content of interest is displayed at the same position (display position 3503 in the example shown in FIG. 46).

FIG. 47 shows an example of the screen display contents when the refinement condition is returned after a manipulation for a content after the refinement according to the ninth embodiment. FIG. 47 is a view for explaining a list display when the user returns the refinement condition by the setting operation in FIG. 45 after he or she makes a manipulation such as playback, print, or the like for content D as the content of interest in the display state shown in FIG. 43 after the refinement. When the user makes a manipulation other than that to return the refinement condition after the refinement, content D as the current content of interest is kept as the content of interest. The display position of content D remains unchanged, and the display position 3503 of the content of interest in FIG. 43 is kept. This is the same operation as that when new refinement is made, as has been described in the sixth embodiment.

Figure 48A:
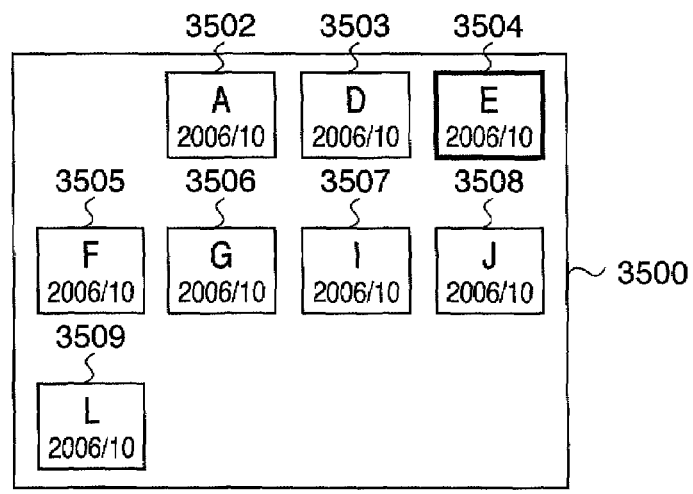
FIGS. 48A and 48B show contents list display examples upon returning the refinement condition after a cursor movement after the refinement according to the ninth embodiment.
Figure 48B:
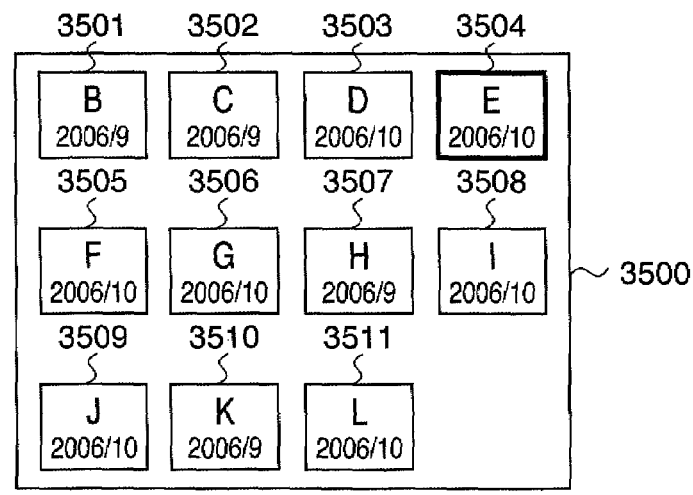

FIGS. 48A and 48B show an example of the screen display contents when the user returns the refinement condition after a cursor movement, after the refinement. FIG. 48A shows a display example when the user moves a cursor to the right adjacent position in the display state of FIG. 43 after the refinement. In FIG. 43, content D displayed at the display position 3503 is focused by the cursor, and it is a content of interest. When the user moves the cursor to the right adjacent position from this state, content E displayed at a display position 3504 becomes a new content of interest, as shown in FIG. 48A. When the user resets the refinement condition in this state, as shown in FIG. 45, a display state shown in FIG. 48B is obtained. Content E which becomes the new content of interest in FIG. 48A is kept as the current content of interest. This is the same operation as that when new refinement is made, as has been described in the sixth embodiment, and the content of interest at the time of execution of the refinement is kept after execution of the refinement.

Figure 49:
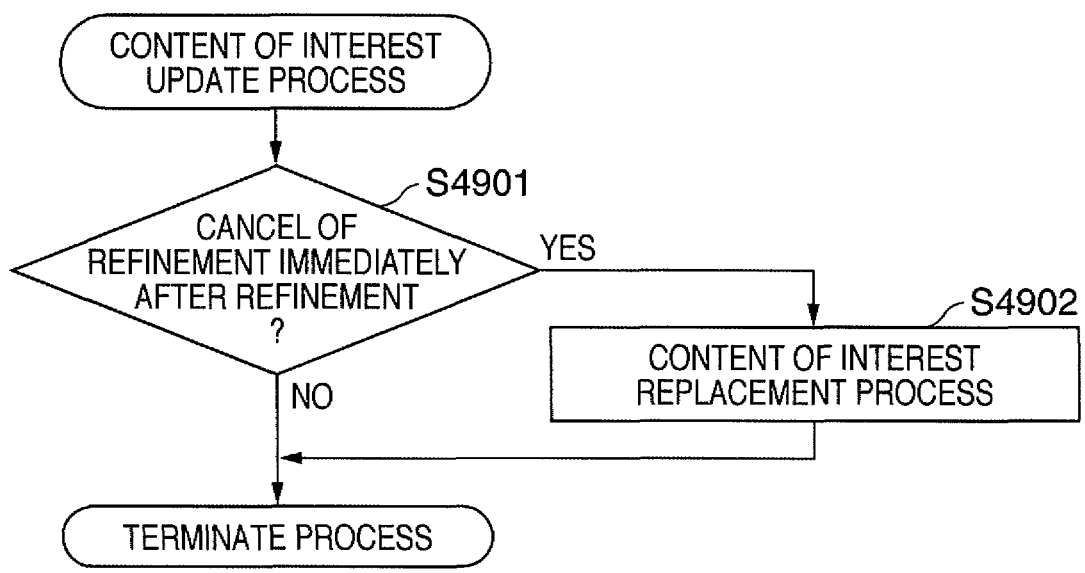
FIG. 49 is a flowchart showing a content of interest update process upon returning the refinement condition according to the ninth embodiment.

FIG. 49 is an exemplary flowchart showing a content of interest update process when the user returns the refinement condition according to the ninth embodiment.

A contents list generation unit 3403 checks in step S4901 if the user returns a refinement condition without any manipulations except for that to return the refinement condition after the refinement. If YES in step S4901, the process advances to step S4902. In step S4902, the contents list generation unit 3403 replaces the current content of interest by a content of interest before the refinement, which is stored together with the refinement condition. In this case, as the display position of the content of interest, the position of the content of interest before replacement is kept. On the other hand, if NO in step S4901, this process terminates. By executing the list display update process shown in FIG. 39 after this content of interest update process, a list display can be made to have a desired content of interest as an origin.

As described above, according to the contents list apparatus of the ninth embodiment, when the refinement condition is returned immediately after the refinement, the content of interest is automatically returned to that before the refinement. More specifically, when refinement using a second refinement condition is started from a state in which a list display is made based on the result of refinement using a first refinement condition, the contents list apparatus stores a content of interest at that time. When refinement using the first refinement condition is started from a state in which a list display is made based on the result of the refinement using the second refinement condition, the contents list apparatus returns the content of interest to the stored content of interest. For example, when a first manipulation after execution of the refinement shown in FIG. 36 is a refinement execution instruction shown in FIG. 45, the content of interest is returned to that before the refinement shown in FIG. 36. For this reason, when the user makes unintended refinement by mistake, the state before the refinement is restored, and the content of interest can also be restored to that before the refinement. Therefore, a point of interest can be prevented from being moved to an irrelevant content. As a result, when the user makes manipulations in turn to contents, he or she can easily make refinement and a manipulation to return the refinement condition without losing a content of interest.

10th Embodiment

In the ninth embodiment, whether or not a content of interest is returned to a state before refinement is determined by seeing if the user returns a refinement condition without any manipulations except for that to return the refinement condition after the refinement operation. The 10th embodiment will explain a contents list apparatus which allows the user to select as to whether or not to return a point of interest to a content which was the content of interest before the refinement, upon returning the refinement condition. Note that the following explanation will be given under the assumption that the refinement condition is returned, as described in the ninth embodiment.

Figure 50:
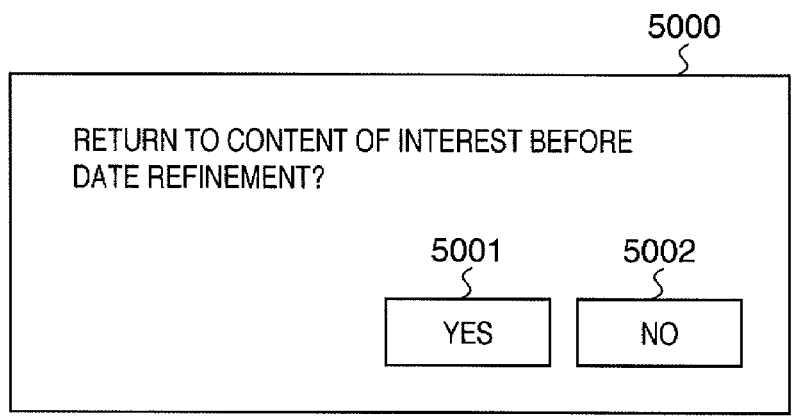
FIG. 50 shows an example of a dialog which allows the user to select as to whether or not to return to a content of interest before refinement according to the 10th embodiment.

FIG. 50 shows an example of a dialog which allows the user to select whether or not to return to a content of interest before the refinement when the refinement condition is returned in the contents list apparatus according to the 10th embodiment. Referring to FIG. 50, reference numeral 5000 denotes a whole selection dialog. The dialog 5000 is displayed when the user makes a manipulation to return a refinement condition, and allows the user to select whether or not to return to a content of interest before the refinement. When the user presses a "YES" button 5001, the current content of interest can be returned to that before the refinement. On the other hand, when the user presses a "NO" button 5002, the current content of interest is kept even after the refinement condition is returned.

Figure 51:
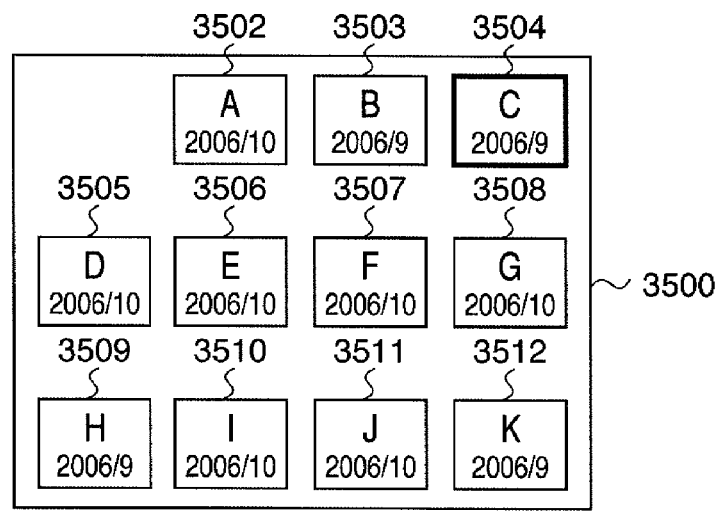
FIG. 51 shows a contents list display example when the user selects to return to a content of interest before the refinement on the dialog that selects as to whether or not to return the refinement condition according to the 10th embodiment.

FIG. 51 shows an example of the screen display contents when the user selects to return to a content of interest before the refinement using the dialog upon returning the refinement condition. Assume that the display state shown in FIG. 42 is turned to that shown in FIG. 43 by the refinement operation shown in FIG. 36, and the user then moves a cursor (content of interest) to the right adjacent position, thus obtaining the display state shown in FIG. 48A. After that, when the user makes a manipulation to return the refinement condition, as shown n FIG. 45, the dialog shown in FIG. 50 is displayed. When the user selects the "YES" button 5001 on this dialog, the content of interest returns to content C before the refinement, thus obtaining the display state shown in FIG. 51.

In FIG. 51, a display position 3504 is that where content of interest E existed in FIG. 48A, and content C in FIG. 42 which was the content of interest before the refinement is allocated at this display position 3504. In this way, according to the 10th embodiment, the content of interest is moved to a content in which the user has an interest before the refinement without changing the display position of the content of interest. In the sequence described in the ninth embodiment, since content E is kept as the content of interest, as shown in FIG. 48B, the user may lose the content of interest before the refinement although the refinement condition is returned. By contrast, according to the 10th embodiment, since the content of interest can be returned to that before the refinement, the user can recognize the content of interest before the refinement.

Figure 52:
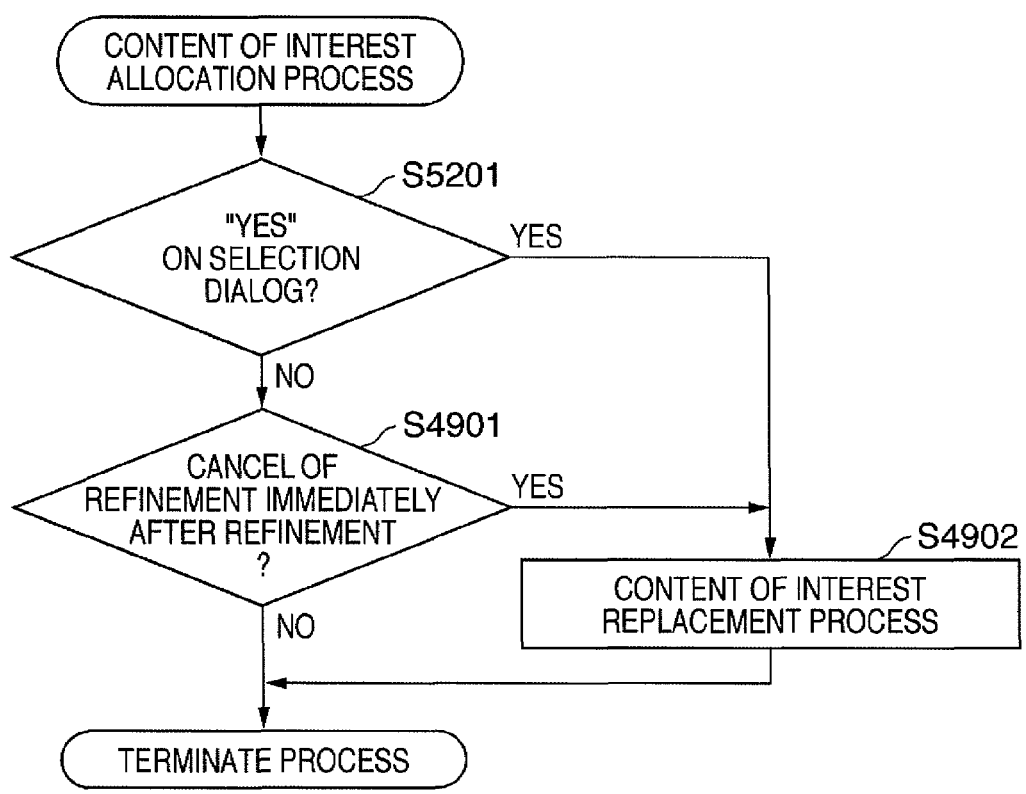
FIG. 52 is a flowchart showing a content of interest update processing upon returning the refinement condition according to the 10th embodiment.

FIG. 52 is an exemplary flowchart showing content of interest update process when the refinement condition is returned according to the 10th embodiment.

In FIG. 52, a checking step using the selection dialog is added to the flowchart in FIG. 49. In step S5201, a contents list generation unit 3403 displays the dialog 5000 shown in FIG. 50 and checks if the user presses the "YES" button 5001. If it is determined that the user presses the "YES" button 5001, the process advances to step S4902 to execute the process for returning the content of interest to that before the refinement. With this process, when the user selects the "YES" button 5001 on the selection dialog, the content of interest can be returned to that before the refinement operation even when he or she made a manipulation except for that to return the refinement condition after the refinement operation. If NO in step S5201, the process advances to step S4901. The subsequent operation is the same as that in the ninth embodiment (FIG. 49).

Even after YES is determined in step S4901, the dialog 5000 like in step S5201 may be presented to confirm the user's intention. With this process, even when the state before the refinement is returned immediately after the refinement operation, the content of interest is not automatically returned to that before the refinement, and the user can select as to whether or not to return the content of interest to that before the refinement.

As described above, in the contents list apparatus of the 10th embodiment, since the user can select as to whether or not to return to the content of interest before the refinement upon returning the refinement condition, a content in which the user wants to have an interest can be reflected more reliably.

As described above, according to the sixth to 10th embodiments, even when the screen is updated as a result of the refinement of contents, since the state of a content in which the user has an interest remains unchanged, the user can smoothly continue manipulations. That is, in a contents list display, even when the screen display contents are updated as a result of a search or refinement of contents, the user can smoothly continue manipulations without any confusion. Also, even when the number of contents becomes small on a large screen, contents get together to have a user's point of interest as an origin, thus allowing easy manipulations.

Other Embodiments

The embodiments have been explained in detail. The present invention can adopt embodiments in the forms of, for example, a system, apparatus, method, program, storage medium, and the like. The present invention may be applied to either a system constituted by a plurality of devices, or an apparatus consisting of a single device.

Note that the present invention includes a case wherein the functions of the embodiments are achieved by directly or remotely supplying a software program to a system or apparatus, and reading out and executing the supplied program code by a computer of that system or apparatus. The program to be supplied in this case is a control program corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of a program is not particularly limited, and an object code, a program to be executed by an interpreter, script data to be supplied to an OS, and the like may be used as long as they have the functions of the program.

As a computer-readable storage medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another program supply method, the user establishes a connection to a home page on the Internet using a browser on a client computer, and downloads the computer program of the present invention from the home page onto a recording medium such as a hard disk or the like. In this case, the program to be downloaded may be a compressed file including an automatic installation function. Also, the program code that forms the program of the present invention may be segmented into a plurality of files, which may be downloaded from different home pages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user. In this case, the user who has cleared a predetermined condition may be allowed to download key information used to decrypt the encrypted program from a home page via the Internet. The user executes the encrypted program using the downloaded key information to install the program on a computer.

The functions of the aforementioned embodiments can be implemented when the computer executes the readout program. Furthermore, the functions of the aforementioned embodiments can be implemented in collaboration with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the storage medium is written in a memory equipped on a function expansion board or a function expansion unit, which is inserted into or connected to the computer. In this case, after the program is written in the function expansion board or unit, a CPU equipped on the function expansion board or function expansion unit executes some or all of actual processes based on an instruction of that program.

According to the present invention, a contents list display with improved operability can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-105248, filed Apr. 12, 2007, which is hereby incorporated by reference herein in its entirety.

What is claimed is:

1. An object display apparatus connected to one or more storage apparatus storing a plurality of objects, comprising:
at least a processor and memory, functioning as:
an object display unit adapted to display a plurality of display objects corresponding to the plurality of objects stored in the storage apparatus, at respective display positions sorted under a predetermined sort condition in a two-dimensional display area;
a designation unit adapted to designate one of the plurality of display objects as a display object of interest;
a reception unit adapted to receive a notification indicating update of one or more of the plurality of objects from the storage apparatus;
an acquisition unit adapted to, when said reception unit receives a notification indicating deletion of an object, acquire a display position of a display object corresponding to the deleted object;
a determination unit adapted to determine that the display position acquired by the acquisition unit is located before or after the display position of the display object of interest; and
an update unit adapted to if the display position acquired by the acquisition unit is located before the display position of the display object of interest, update the display area by shifting the display positions of display objects located before the display position of the deleted object to the back side, and if the display position acquired by the acquisition unit is located after the display position of the display object of interest, update the display area by shifting the display positions of display objects located after the display position of the deleted object to the fore side without moving the display object of interest, wherein the size of the plurality of display objects after the updating of the display area remained the same size as before.

2. The apparatus according to claim 1, the at least a processor and memory further functioning as:
a sorting unit adapted to, when said reception unit receives a notification indicating addition of an object, acquire a sort position of an added object according to the predetermined sort condition,
wherein said determination unit determines that the sort position acquired by the sorting unit is located before or after the sort position of the display object of interest, and
wherein said update unit, if the sort position acquired by the sorting unit is located before the sort position of the display object of interest, updates the display area by shifting the display positions of objects located before the sort position of the added object to the fore side, and if the sort position acquired by the sorting unit is located after the sort position of the display object of interest, updates the display area by shifting the display positions of objects located after the sort position of the added object to the back side, without moving the display object of interest,
wherein said update unit displays the added object at a vacant display position generated by shifting of the display positions of objects.

3. The apparatus according to claim 1, the at least a processor and memory further functioning as:
a refinement unit adapted to refine the plurality of display objects displayed by said object display unit based on a designated refinement condition; and
a deletion unit adapted to delete, from the display area, display objects which are excluded from the plurality of display objects by said refinement unit.

4. The apparatus according to claim 1, the at least a processor and memory further functioning as a display change unit adapted to change a display state of the display object of interest which was designated by said designation unit,
wherein said update unit is adapted to update the display area while keeping the changed display state of the display object of interest.

5. An object display method of an object display apparatus connected to one or more storage apparatus storing a plurality of objects, said method comprising:
an object display step of displaying a plurality of display objects corresponding to the plurality of objects stored in the storage apparatus, at respective display positions sorted under a predetermined sort condition in a two-dimensional display area;
a designation step of designating one of the plurality of display objects as a display object of interest;
a reception step of receiving a notification indicating update of one or more of the plurality of objects from the storage apparatus;
an acquisition step of, when a notification indicating deletion of an object is received in said reception step, acquiring a display position of a display object corresponding to the deleted object;
a determination step of determining that the display position acquired by the acquisition unit is located before or after the display position of the display object of interest; and an update step of if the display position acquired in said acquisition step is located before the display position of the display object of interest, updating the display area by shifting the display positions of display objects located before the display position of the deleted object to the back side, and if the display position acquired in said acquisition step is located after the display position of the display object of interest, updating the display area by shifting the display positions of display objects located after the display position of the deleted object to the fore side, without moving the display object of interest, wherein the size of the plurality of display objects after the updating of the display area remained the same size as before.

6. An object display apparatus connected to a plurality of storage apparatus storing a plurality of objects, comprising:
at least a processor and memory, functioning as:
an object display unit configured to cause a display screen to display a list of a plurality of display objects corresponding to the plurality of objects stored in the plurality of storage apparatus, at respective display positions sorted under a predetermined sort condition in a two-dimensional display area;
a designation unit configured to designate one of the plurality of display objects as a display object of interest; and
a reception unit configured to receive a notification indicating disconnection of at least one of the plurality of storage apparatus from the at least one disconnected storage apparatus,
wherein said object display unit is further configured to, when said reception receives the notification indicating disconnection of at least one of the plurality of storage apparatus, cause the display screen to display the list of the plurality of objects that has been updated by deleting display objects corresponding to the plurality of objects stored in the at least one disconnected storage apparatus and moving display objects other than the object of interest without moving the display position of the object of interest, by shifting the display positions of display objects located before the display position of the object of interest to the back side, and by shifting the display positions of display objects located after the display position of the object of interest to the fore side.

7. The apparatus according to claim 6, wherein said reception unit is further configured to receive a notification indicating that a new storage apparatus is connected, and
said object display unit is further configured to, when said reception unit receives the notification indicating that the new storage apparatus is connected, cause the display screen to display a list which is updated by adding a display object corresponding to an object stored in the new storage apparatus and moving at least a display object other than the display object of interest.

8. The apparatus according to claim 6, the at least a processor and memory further functioning as a determination unit configured to determine a moving direction of a display object other than the display object of interest based on whether a display position of the display object is before or after a display position of the display object of interest.

9. An object display method of an object display apparatus connected to a plurality of storage apparatus storing a plurality of objects, said method comprising:
an object display step of displaying a list of a plurality of display objects corresponding to the plurality of objects stored in the plurality of storage apparatus, at respective display positions sorted under a predetermined sort condition in a two-dimensional display area;
a designation step of designating one of the plurality of display objects as a display object of interest; and
a reception step of receiving a notification indicating disconnection of at least one of the plurality of storage apparatus from the at least one disconnected storage apparatus,
wherein said object display step further includes, when the notification indicating disconnection of at least one of the plurality of storage apparatus is received in said reception step, displaying the list of the plurality of objects that has been updated by deleting display objects corresponding to the plurality of objects stored in the at least one disconnected storage apparatus and moving display objects other than the object of interest without moving a display position of the object of interest, by shifting the display positions of display objects located before the display position of the object of interest to the back side, and by shifting the display positions of display objects located after the display position of the object of interest to the fore side.

10. A non-transitory computer-readable medium storing a program for causing a computer to execute an object display method of an object display apparatus connected to a plurality of storage apparatus storing a plurality of objects, the method comprising:
an object display step of displaying a list of a plurality of display objects corresponding to the plurality of objects stored in the plurality of storage apparatus, at respective display positions sorted under a predetermined sort condition in a two-dimensional display area;
a designation step of designating one of the plurality of display objects as a display object of interest; and
a reception step of receiving a notification indicating disconnection of at least one of the plurality of storage apparatus from the at least one disconnected storage apparatus,
wherein said object display step further includes, when the notification indicating disconnection of at least one of the plurality of storage apparatus is received in said reception step, displaying the list of the plurality of objects that has been updated by deleting display objects corresponding to the plurality of objects stored in the at least one disconnected storage apparatus and moving display objects other than the object of interest without moving a display position of the object of interest, by shifting the display positions of display objects located before the display position of the object of interest to the back side, and by shifting the display positions of display objects located after the display position of the object of interest to the fore side.

* * * * *